United States Patent
Gladwin

(10) Patent No.: US 12,222,812 B2
(45) Date of Patent: Feb. 11, 2025

(54) DYNAMIC STORAGE OF ENCODED DATA SLICES IN MULTIPLE VAULTS

(71) Applicant: Pure Storage, Inc., Santa Clara, CA (US)

(72) Inventor: S. Christopher Gladwin, Chicago, IL (US)

(73) Assignee: Pure Storage, Inc., Santa Clara, CA (US)

( * ) Notice: Subject to any disclaimer, the term of this patent is extended or adjusted under 35 U.S.C. 154(b) by 7 days.

(21) Appl. No.: 18/333,780

(22) Filed: Jun. 13, 2023

(65) Prior Publication Data

US 2023/0333931 A1 Oct. 19, 2023

Related U.S. Application Data

(63) Continuation of application No. 17/807,360, filed on Jun. 16, 2022, now Pat. No. 11,714,720, which is a continuation of application No. 17/067,482, filed on Oct. 9, 2020, now Pat. No. 11,385,964, which is a continuation of application No. 16/392,126, filed on Apr. 23, 2019, now Pat. No. 10,802,915, which is a
(Continued)

(51) Int. Cl.
| | |
|---|---|
| G06F 11/10 | (2006.01) |
| G06F 3/06 | (2006.01) |
| G06F 16/27 | (2019.01) |

(52) U.S. Cl.
CPC ........ *G06F 11/1092* (2013.01); *G06F 3/0608* (2013.01); *G06F 3/0619* (2013.01); *G06F 3/0652* (2013.01); *G06F 3/067* (2013.01); *G06F 16/27* (2019.01)

(58) Field of Classification Search
CPC .. G06F 11/1092; G06F 11/1176; G06F 16/27; G06F 3/0608; G06F 3/0619; G06F 3/0652; G06F 3/067
See application file for complete search history.

(56) References Cited

U.S. PATENT DOCUMENTS

| | | |
|---|---|---|
| 4,092,732 A | 5/1978 | Ouchi |
| 5,454,101 A | 9/1995 | Mackay |
| (Continued) | | |

OTHER PUBLICATIONS

Chung; An Automatic Data Segmentation Method for 3D Measured Data Points; National Taiwan University; pp. 1-8; 1998.
(Continued)

*Primary Examiner* — Hiep T Nguyen
(74) *Attorney, Agent, or Firm* — Garlick & Markison; Timothy D. Taylor

(57) ABSTRACT

A method for execution by one or more computing devices of a storage network includes error encoding data into a set of encoded data slices. The method further includes storing the set of encoded data slices in first storage units of a first vault in accordance with first error encoding parameters. The method further includes initiating storage of the set of encoded data slices in second storage units of a second vault in accordance with second error encoding parameters. When a decode threshold number of encoded data slices of the set of encoded data slices are stored in the second vault, the method further includes deleting one or more encoded data slices of the set of encoded data slices stored in the first vault.

20 Claims, 57 Drawing Sheets

Related U.S. Application Data continuation-in-part of application No. 15/843,637, filed on Dec. 15, 2017, now Pat. No. 10,289,342, which is a continuation-in-part of application No. 15/671,746, filed on Aug. 8, 2017, now Pat. No. 10,740,180, which is a continuation-in-part of application No. 14/955,200, filed on Dec. 1, 2015, now Pat. No. 9,740,547.

(60) Provisional application No. 62/109,700, filed on Jan. 30, 2015.

(56) References Cited

U.S. PATENT DOCUMENTS

| | | |
|---|---|---|
| 5,485,474 A | 1/1996 | Rabin |
| 5,774,643 A | 6/1998 | Lubbers |
| 5,802,364 A | 9/1998 | Senator |
| 5,809,285 A | 9/1998 | Hilland |
| 5,890,156 A | 3/1999 | Rekieta |
| 5,987,622 A | 11/1999 | Lo Verso |
| 5,991,414 A | 11/1999 | Garay |
| 6,012,159 A | 1/2000 | Fischer |
| 6,058,454 A | 5/2000 | Gerlach |
| 6,128,277 A | 10/2000 | Bruck |
| 6,175,571 B1 | 1/2001 | Haddock |
| 6,192,472 B1 | 2/2001 | Garay |
| 6,256,688 B1 | 7/2001 | Suetaka |
| 6,272,658 B1 | 8/2001 | Steele |
| 6,301,604 B1 | 10/2001 | Nojima |
| 6,356,949 B1 | 3/2002 | Katsandres |
| 6,366,995 B1 | 4/2002 | Nikolaevich |
| 6,374,336 B1 | 4/2002 | Peters |
| 6,415,373 B1 | 7/2002 | Peters |
| 6,418,539 B1 | 7/2002 | Walker |
| 6,449,688 B1 | 9/2002 | Peters |
| 6,567,948 B2 | 5/2003 | Steele |
| 6,571,282 B1 | 5/2003 | Bowman-Amuah |
| 6,609,223 B1 | 8/2003 | Wolfgang |
| 6,718,361 B1 | 4/2004 | Basani |
| 6,760,808 B2 | 7/2004 | Peters |
| 6,785,768 B2 | 8/2004 | Peters |
| 6,785,783 B2 | 8/2004 | Buckland |
| 6,826,711 B2 | 11/2004 | Moulton |
| 6,879,596 B1 | 4/2005 | Dooply |
| 7,003,688 B1 | 2/2006 | Pittelkow |
| 7,024,451 B2 | 4/2006 | Jorgenson |
| 7,024,609 B2 | 4/2006 | Wolfgang |
| 7,080,101 B1 | 7/2006 | Watson |
| 7,103,824 B2 | 9/2006 | Halford |
| 7,103,915 B2 | 9/2006 | Redlich |
| 7,111,115 B2 | 9/2006 | Peters |
| 7,140,044 B2 | 11/2006 | Redlich |
| 7,146,644 B2 | 12/2006 | Redlich |
| 7,171,493 B2 | 1/2007 | Shu |
| 7,222,133 B1 | 5/2007 | Raipurkar |
| 7,240,236 B2 | 7/2007 | Cutts |
| 7,272,613 B2 | 9/2007 | Sim |
| 7,636,724 B2 | 12/2009 | De La Torre |
| 8,612,827 B2 | 12/2013 | Gladwin et al. |
| 9,229,772 B2 * | 1/2016 | Kojima ............... G06F 9/485 |
| 10,802,915 B2 | 10/2020 | Gladwin |
| 11,385,964 B1 | 7/2022 | Gladwin |
| 2002/0062422 A1 | 5/2002 | Butterworth |
| 2002/0166079 A1 | 11/2002 | Ulrich |
| 2003/0018927 A1 | 1/2003 | Gadir |
| 2003/0037261 A1 | 2/2003 | Meffert |
| 2003/0065617 A1 | 4/2003 | Watkins |
| 2003/0084020 A1 | 5/2003 | Shu |
| 2004/0024963 A1 | 2/2004 | Talagala |
| 2004/0122917 A1 | 6/2004 | Menon |
| 2004/0215998 A1 | 10/2004 | Buxton |
| 2004/0228493 A1 | 11/2004 | Ma |
| 2005/0100022 A1 | 5/2005 | Ramprashad |
| 2005/0114594 A1 | 5/2005 | Corbett |
| 2005/0125593 A1 | 6/2005 | Karpoff |
| 2005/0131993 A1 | 6/2005 | Fatula, Jr. |
| 2005/0132070 A1 | 6/2005 | Redlich |
| 2005/0144382 A1 | 6/2005 | Schmisseur |
| 2005/0229069 A1 | 10/2005 | Hassner |
| 2006/0047907 A1 | 3/2006 | Shiga |
| 2006/0136448 A1 | 6/2006 | Cialini |
| 2006/0156059 A1 | 7/2006 | Kitamura |
| 2006/0224603 A1 | 10/2006 | Correll, Jr. |
| 2007/0079081 A1 | 4/2007 | Gladwin |
| 2007/0079082 A1 | 4/2007 | Gladwin |
| 2007/0079083 A1 | 4/2007 | Gladwin |
| 2007/0088970 A1 | 4/2007 | Buxton |
| 2007/0174192 A1 | 7/2007 | Gladwin |
| 2007/0214285 A1 | 9/2007 | Au |
| 2007/0234110 A1 | 10/2007 | Soran |
| 2007/0283167 A1 | 12/2007 | Venters, III |
| 2009/0094251 A1 | 4/2009 | Gladwin |
| 2009/0094318 A1 | 4/2009 | Gladwin |
| 2010/0023524 A1 | 1/2010 | Gladwin |
| 2011/0311051 A1 | 12/2011 | Resch |
| 2012/0198537 A1 | 8/2012 | Grube |
| 2013/0117560 A1 | 5/2013 | Resch |
| 2015/0127902 A1 | 5/2015 | Shah |
| 2016/0255150 A1 | 9/2016 | Dhuse |
| 2016/0328296 A1 | 11/2016 | Abhijeet et al. |
| 2017/0019466 A1 | 1/2017 | Dhuse et al. |
| 2017/0310754 A1 | 10/2017 | Baptist |
| 2019/0026304 A1 | 1/2019 | Jenkins |
| 2020/0034339 A1 | 1/2020 | Gershaneck |

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 4511; Jun. 2006; pp. 1-68.

Shamir; How to Share a Secret; Communications of the ACM; vol. 22, No. 11; Nov. 1979; pp. 612-613.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Wildi; Java iSCSi Initiator; Master Thesis; Department of Computer and Information Science, University of Konstanz; Feb. 2007; 60 pgs.

Xin, et al.; Evaluation of Distributed Recovery in Large-Scale Storage Systems; 13th IEEE International Symposium on High Performance Distributed Computing; Jun. 2004; pp. 172-181.

Zeilenga; Lightweight Directory Access Protocol (LDAP): Directory Information Models; IETF Network Working Group; RFC 4512; Jun. 2006; pp. 1-49.

(56) References Cited

OTHER PUBLICATIONS

Zeilenga; Lightweight Directory Access Protocol (LDAP): Internationalized String Preparation; IETF Network Working Group; RFC 4518; Jun. 2006; pp. 1-14.

Zeilenga; Lightweight Directory Access Protocol (LDAP): String Representation of Distinguished Names; IETF Network Working Group; RFC 4514; Jun. 2006; pp. 1-15.

Zeilenga; Lightweight Directory Access Protocol (LDAP): Technical Specification Road Map; IETF Network Working Group; RFC 4510; Jun. 2006; pp. 1-8.

* cited by examiner

DST allocation info 242: data partition info 320: data ID; No. of partitions; Addr. info for each partition; format conversion indication task execution info 322

| task 326 | task ordering 328 | data partition 330 | set of DT EX mods 332 | Name 334 | interm. result processing 336 | scratch pad storage 338 | intermediate result storage 340 |
|---|---|---|---|---|---|---|---|
| 1_1 | none | 2_1 - 2_z | 1_1, 2_1, 3_1, 4_1, & 5_1 | R1-1 | DST unit 1 | DST unit 1 | DST units 1-5 |
| 1_2 | none | 2_1 - 2_4 | 1_1, 2_1, 3_1, 4_1, & 5_1 | R1-2 | DST unit 1 | DST unit 1 | DST units 1-5 |
| 1_3 | none | 2_1 - 2_4<br>2_5 - 2_z | 1_1, 2_1, 3_1, 4_1, & 5_1<br>1_2, 2_2, 3_2, 4_2, & 5_2 | R1-3 | DST unit 2 | DST unit 2 | DST units 2-6 |
| 1_4 | after 1_3 | R1-3_1 - R1-3_4<br>R1-3_5 - R1-3_z | 1_1, 2_1, 3_1, 4_1, & 5_1<br>1_2, 2_2, 6_1, 7_1, & 7_2 | R1_4 | DST unit 3 | DST unit 3 | DST units 3-7 |
| 1_5 | after 1_4 | R1-4_1 - R1-4_z &<br>2_1 - 2_z | 1_1, 2_1, 3_1, 4_1, & 5_1 | R1-5 | DST unit 1 | DST unit 1 | DST units 1-5 |
| 1_6 | after 1_1 &<br>1_5 | R1-1_1 - R1-1_z &<br>R1-5_1 - R1-5_z | 1_1, 2_1, 3_1, 4_1, & 5_1 | R1-6 | DST unit 2 | DST unit 2 | DST units 2-6 |
| 1_7 | after 1_2 &<br>1_5 | R1-2_1 - R1-2_z &<br>R1-5_1 - R1-5_z | 1_2, 2_2, 3_2, 4_2, & 5_2 | R1-7 | DST unit 3 | DST unit 3 | DST units 3-7 |
| 2 | none | 2_1 - 2_z | 3_1, 4_1, 5_1, 6_1, & 7_1 | R2 | DST unit 7 | DST unit 7 | DST units 7, 1-4 |
| 3_1 | none (same as 1_3) | use R1_3 | | R1-1 | | | |
| 3_2 | after 3_1 | R1-3_1 - R1-3_z | 1_2, 2_2, 3_2, 4_2, & 5_2 | R3-2 | DST unit 5 | DST unit 5 | DST units 5,6, 1-3 | intermediate result info 324

FIG. 32

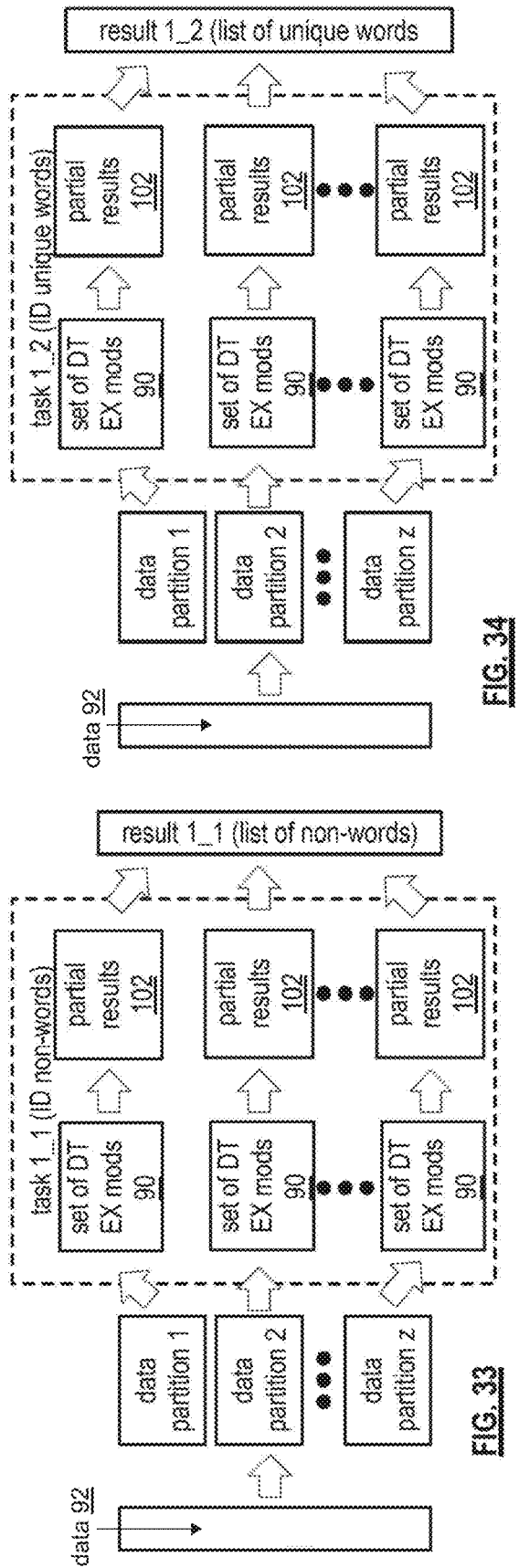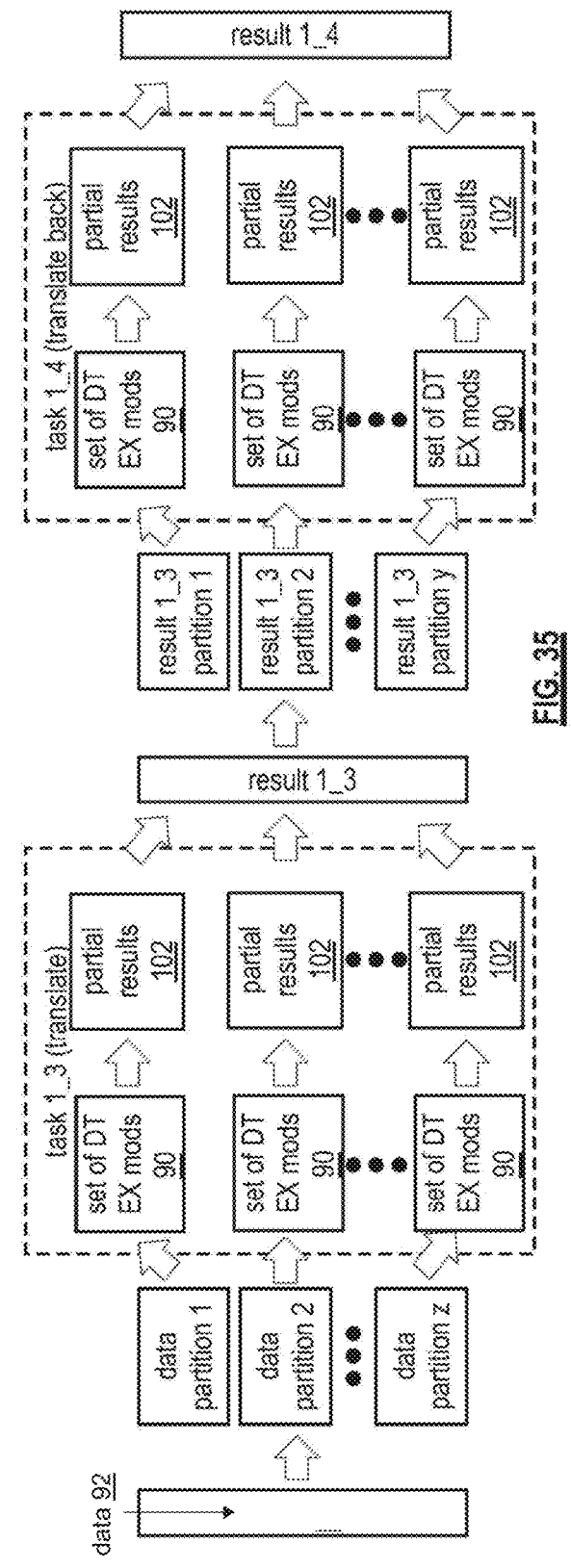

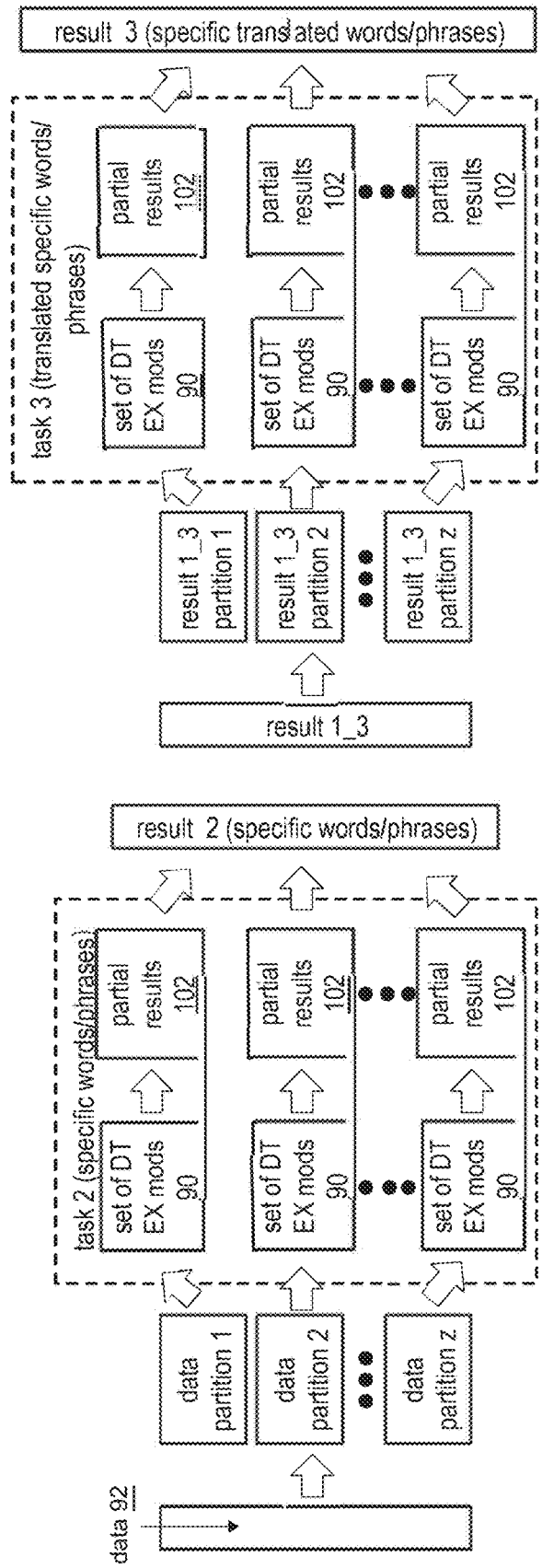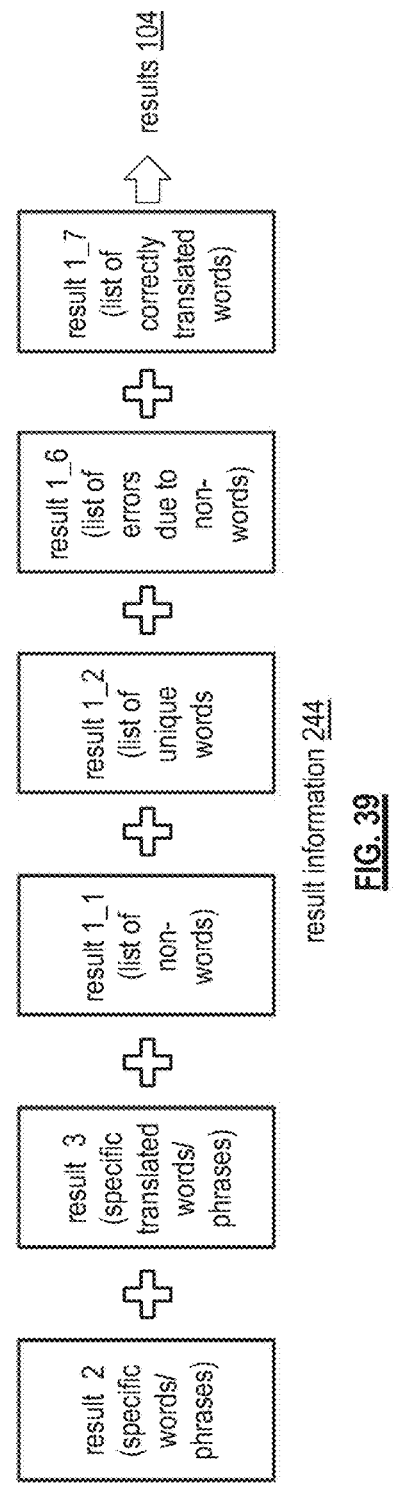

DYNAMIC STORAGE OF ENCODED DATA SLICES IN MULTIPLE VAULTS

CROSS-REFERENCE TO RELATED APPLICATIONS

The present U.S. Utility Patent Applications claims priority pursuant to 35 U.S.C. § 120 as a continuation of co-pending U.S. Utility application Ser. No. 17/807,360 entitled "MAINTAINING STORAGE OF ENCODED DATA SLICES IN ACCORDANCE WITH A SLICE REDUCTION SCHEME," filed Jun. 16, 2022, allowed, which is a continuation of U.S. Utility application Ser. No. 17/067,482 entitled "MAINTAINING STORAGE OF ENCODED DATA SLICES," filed Oct. 9, 2020, issued as U.S. Pat. No. 11,385,964 on Jul. 12, 2022, which is a continuation of U.S. Utility application Ser. No. 16/392,126 entitled "DATA ACCESS OPTIMIZATION PROTOCOL IN A DISPERSED STORAGE NETWORK," filed Apr. 23, 2019, issued as U.S. Pat. No. 10,802,915 on Oct. 13, 2020, which is a continuation-in-part of U.S. Utility application Ser. No. 15/843,637, entitled "DATA ACCESS OPTIMIZATION PROTOCOL IN A DISPERSED STORAGE NETWORK," filed Dec. 15, 2017, issued as U.S. Pat. No. 10,289,342 on May 14, 2019, which is a continuation-in-part of U.S. Utility application Ser. No. 15/671,746, entitled "STORING AND RETRIEVING DATA USING PROXIES," filed Aug. 8, 2017, issued as U.S. Pat. No. 10,740,180 on Aug. 11, 2020, which is a continuation-in-part of U.S. Utility application Ser. No. 14/955,200, entitled "STORING DATA USING A DUAL PATH STORAGE APPROACH," filed Dec. 1, 2015, issued as U.S. Pat. No. 9,740,547 on Aug. 22, 2017, which claims priority pursuant to 35 U.S.C. § 119(e) to U.S. Provisional Application No. 62/109,700, entitled "REDUNDANTLY STORING DATA IN A DISPERSED STORAGE NETWORK," filed Jan. 30, 2015, expired, all of which are hereby incorporated herein by reference in their entirety and made part of the present U.S. Utility Patent Application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Technical Field of the Invention

This invention relates generally to computer networks and more particularly to dispersed storage of data and distributed task processing of data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 32 is a diagram of an example of DST allocation information for the example of FIG. 30 in accordance with the present invention;

FIGS. 33-38 are schematic block diagrams of the DSTN module performing the example of FIG. 30 in accordance with the present invention;

FIG. 39 is a diagram of an example of combining result information into final results for the example of FIG. 30 in accordance with the present invention;

Figure 40A:
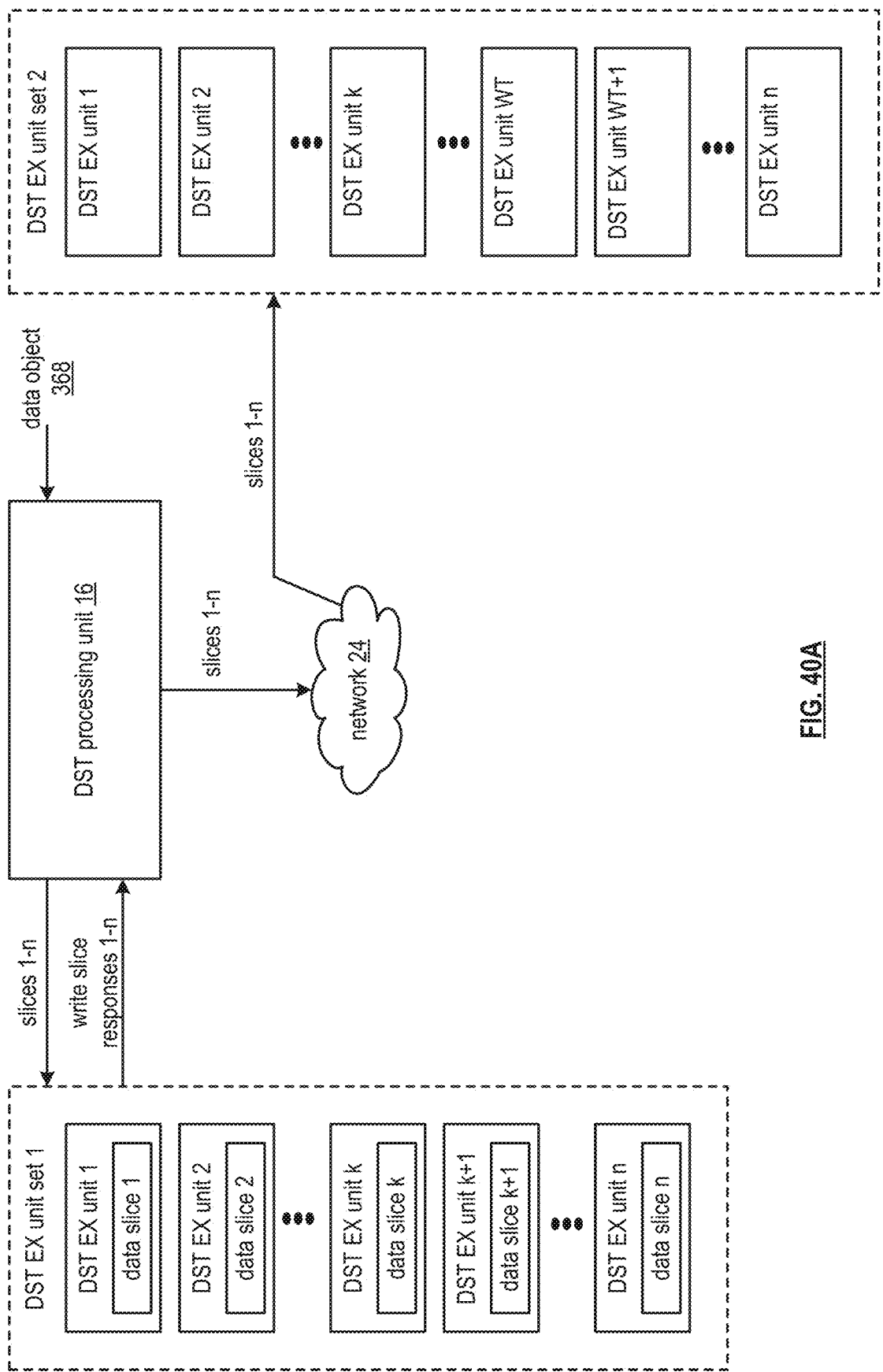
Figure 40B:
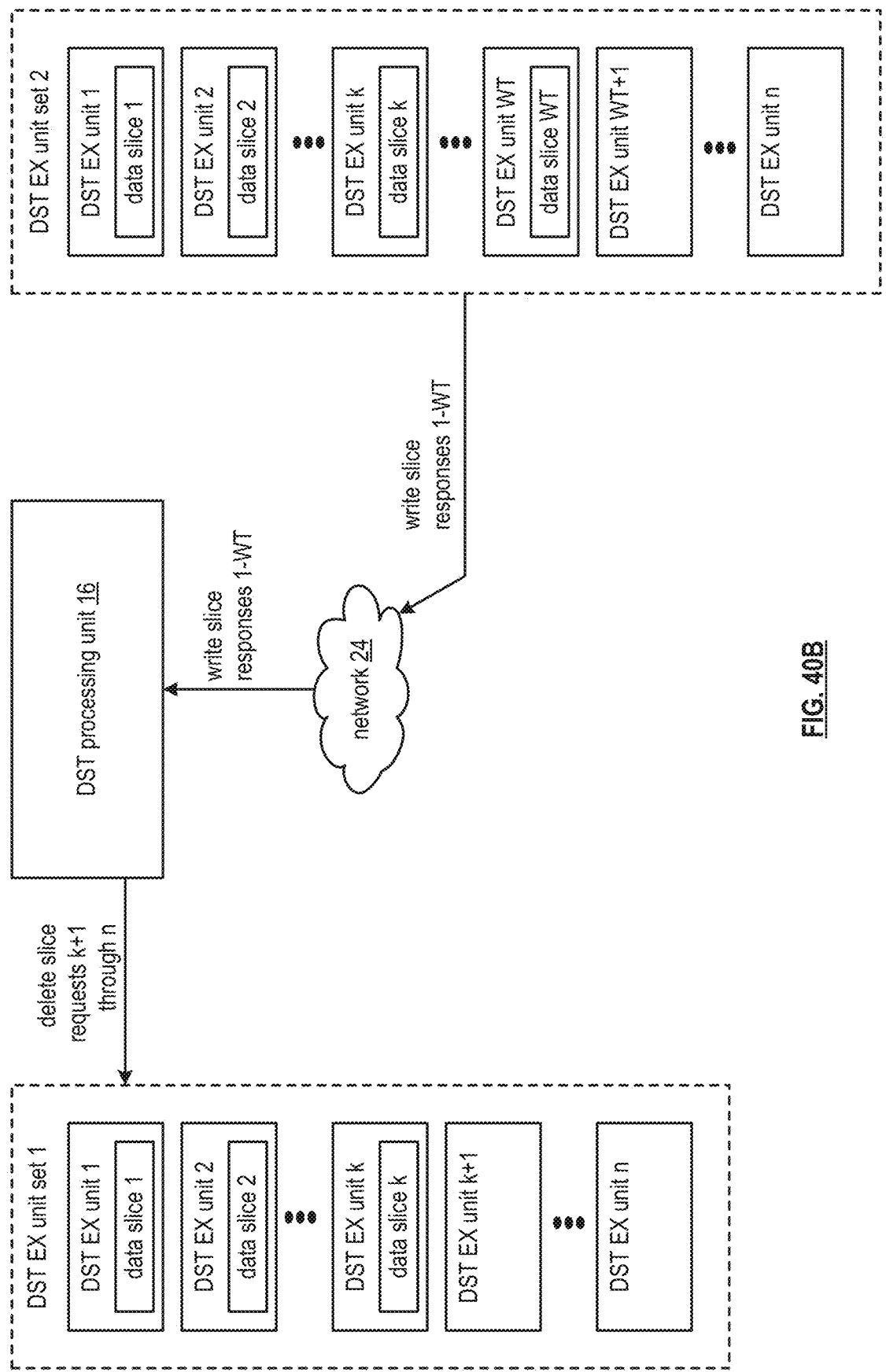
Figure 40C:
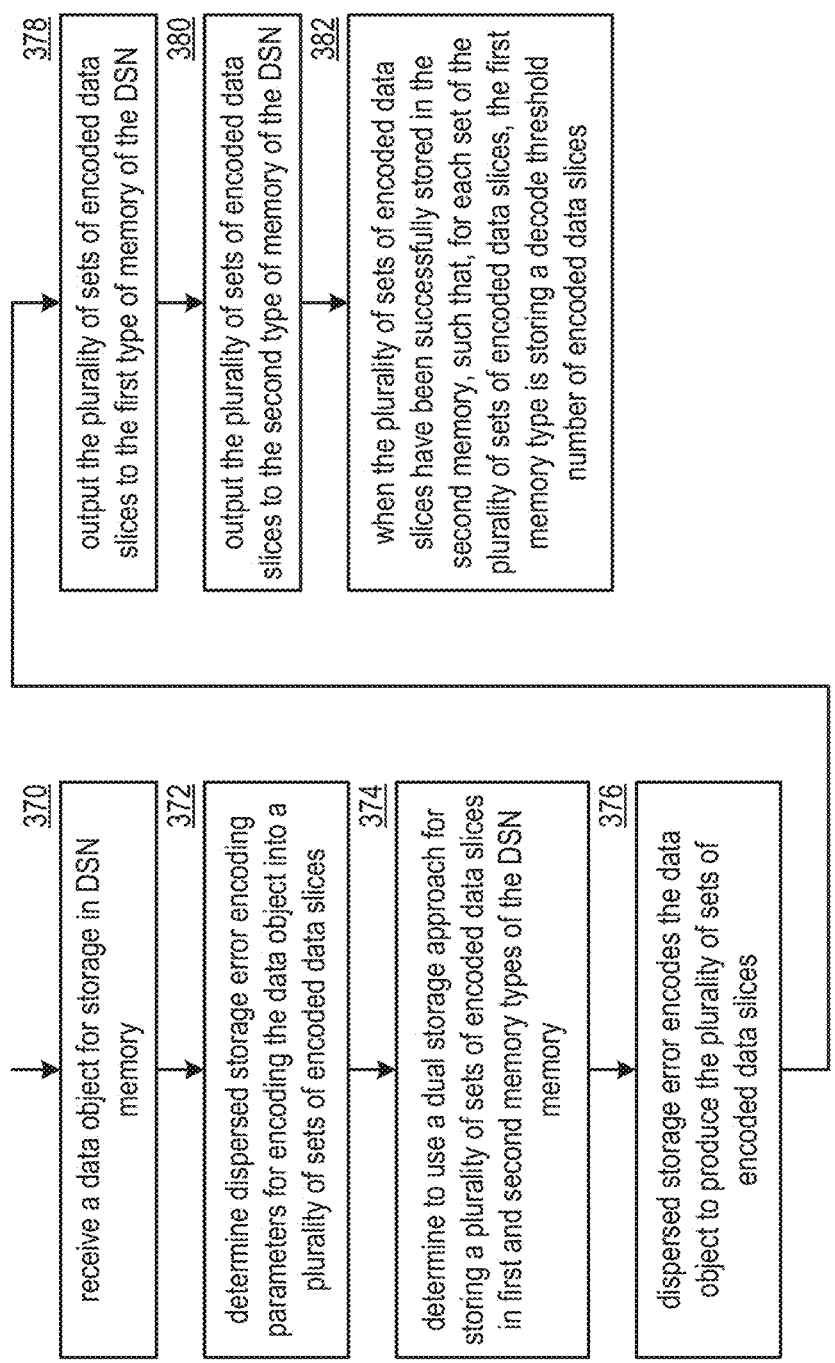
Figure 41A:
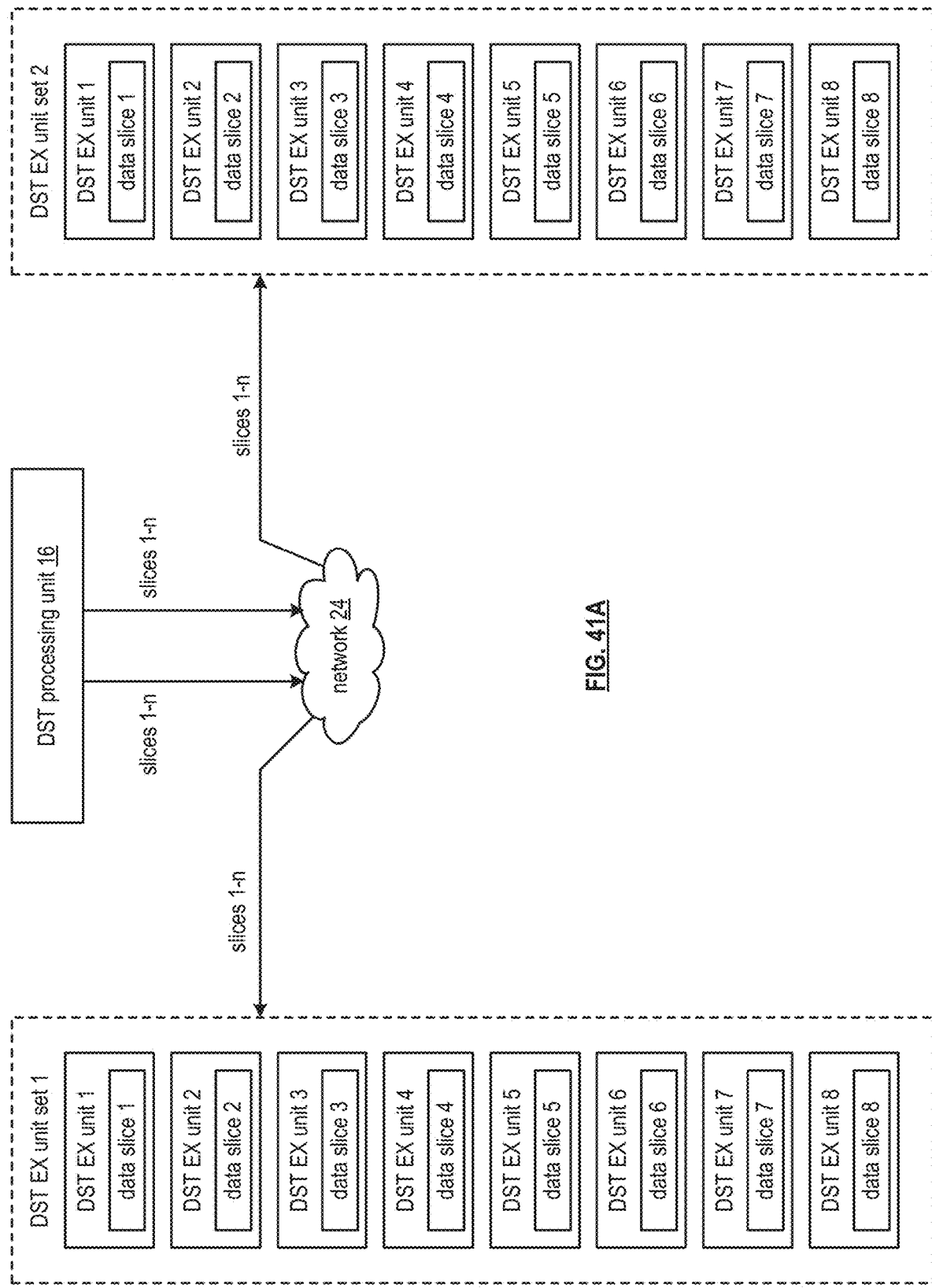
Figure 41B:
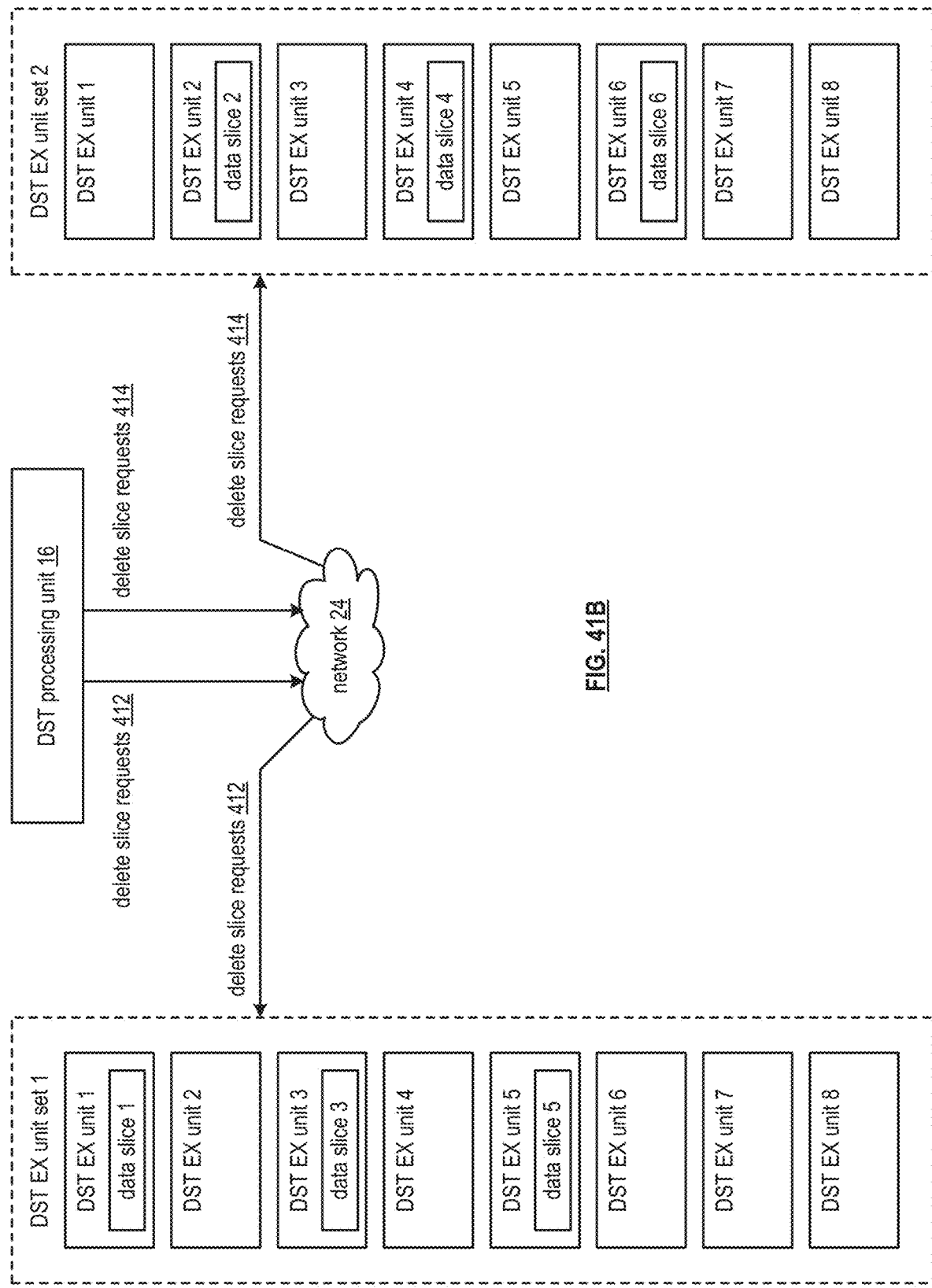
Figure 41C:
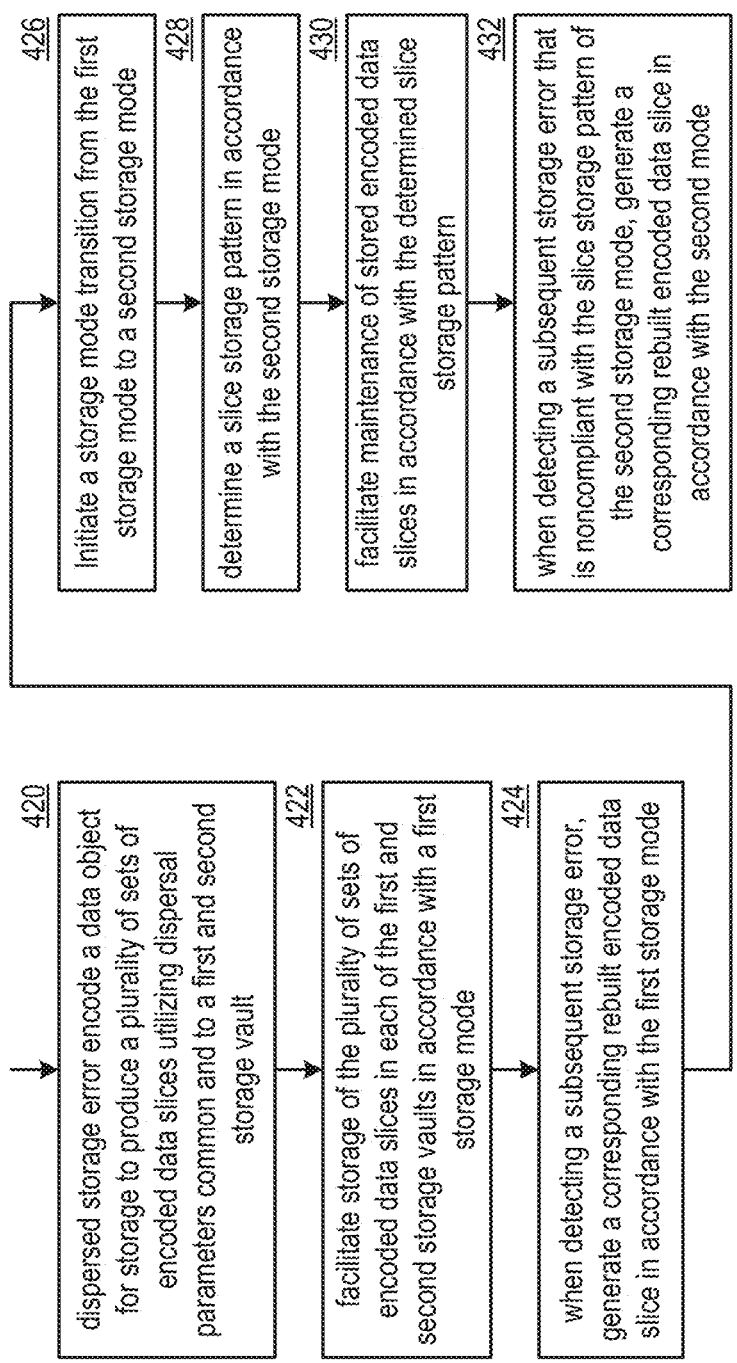
Figure 42A:
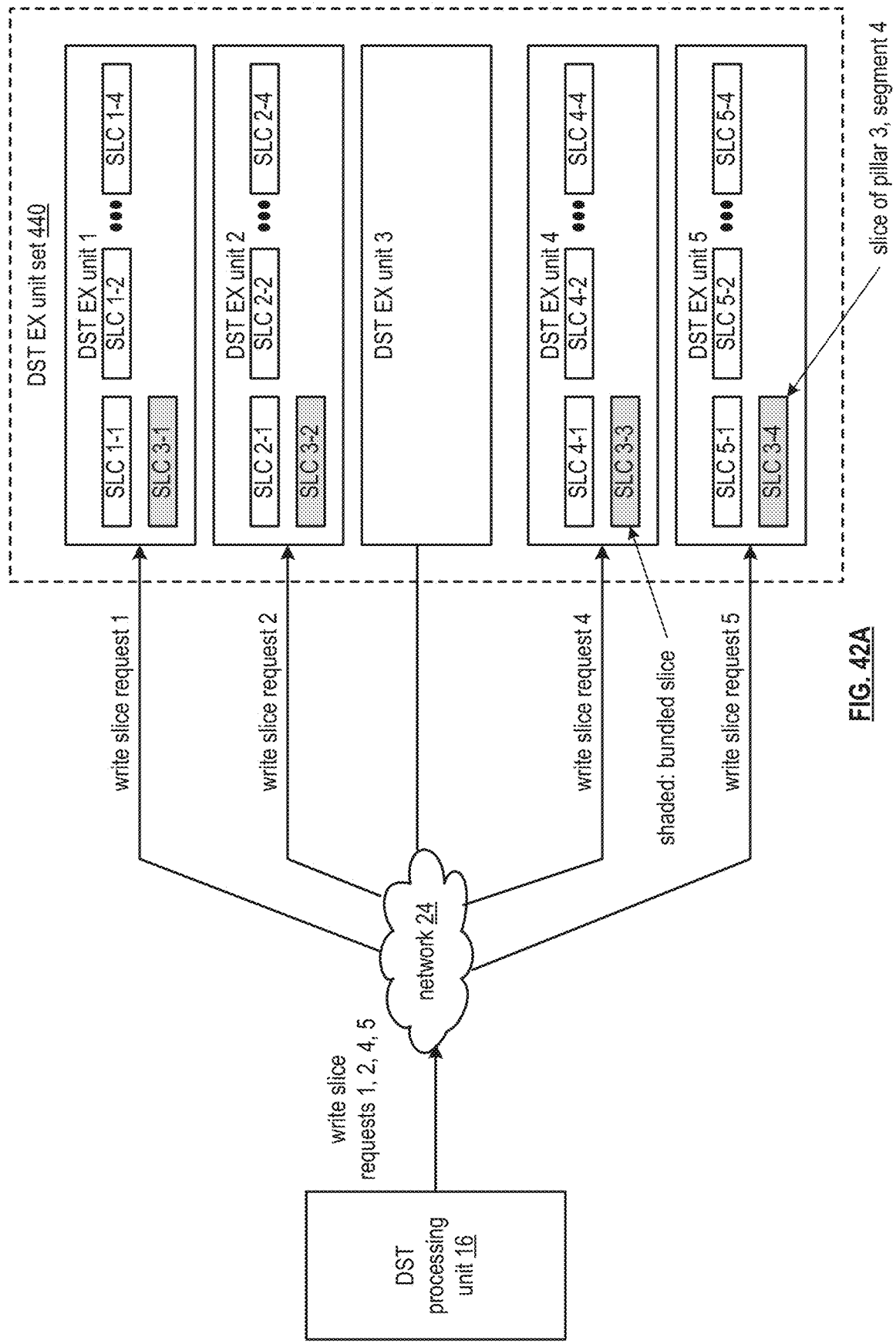
Figure 42B:
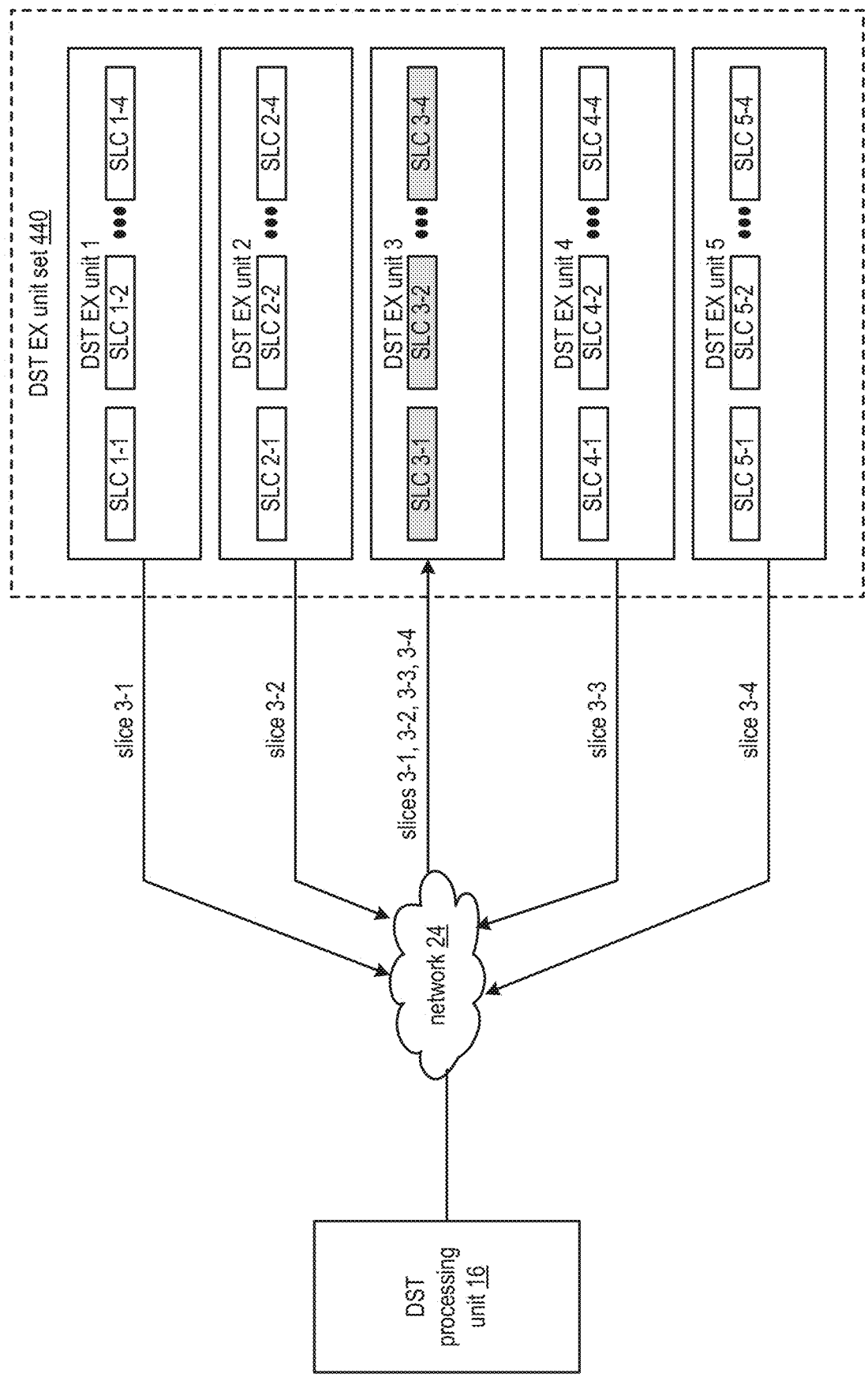
Figure 42C:
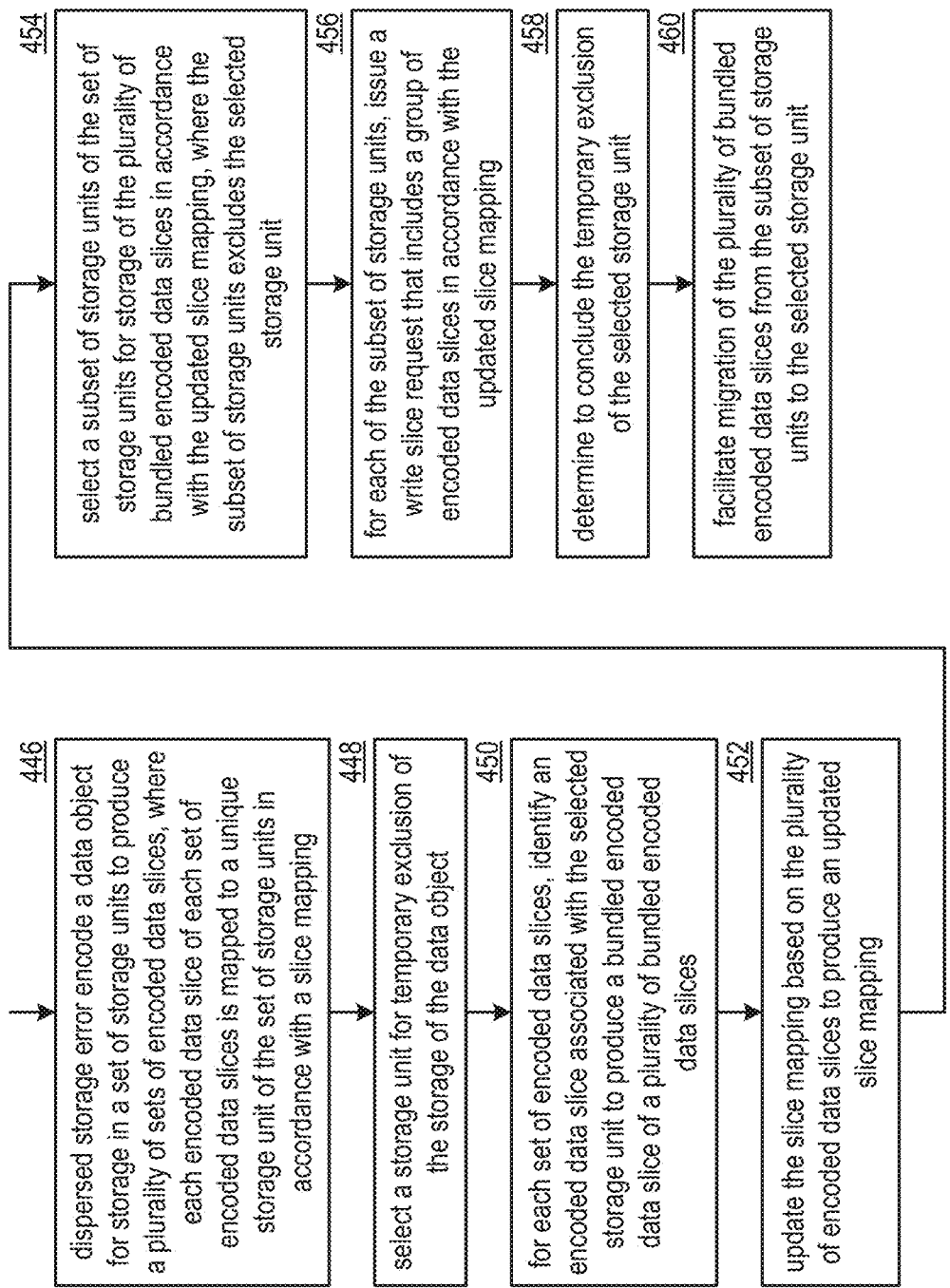
Figure 43A:
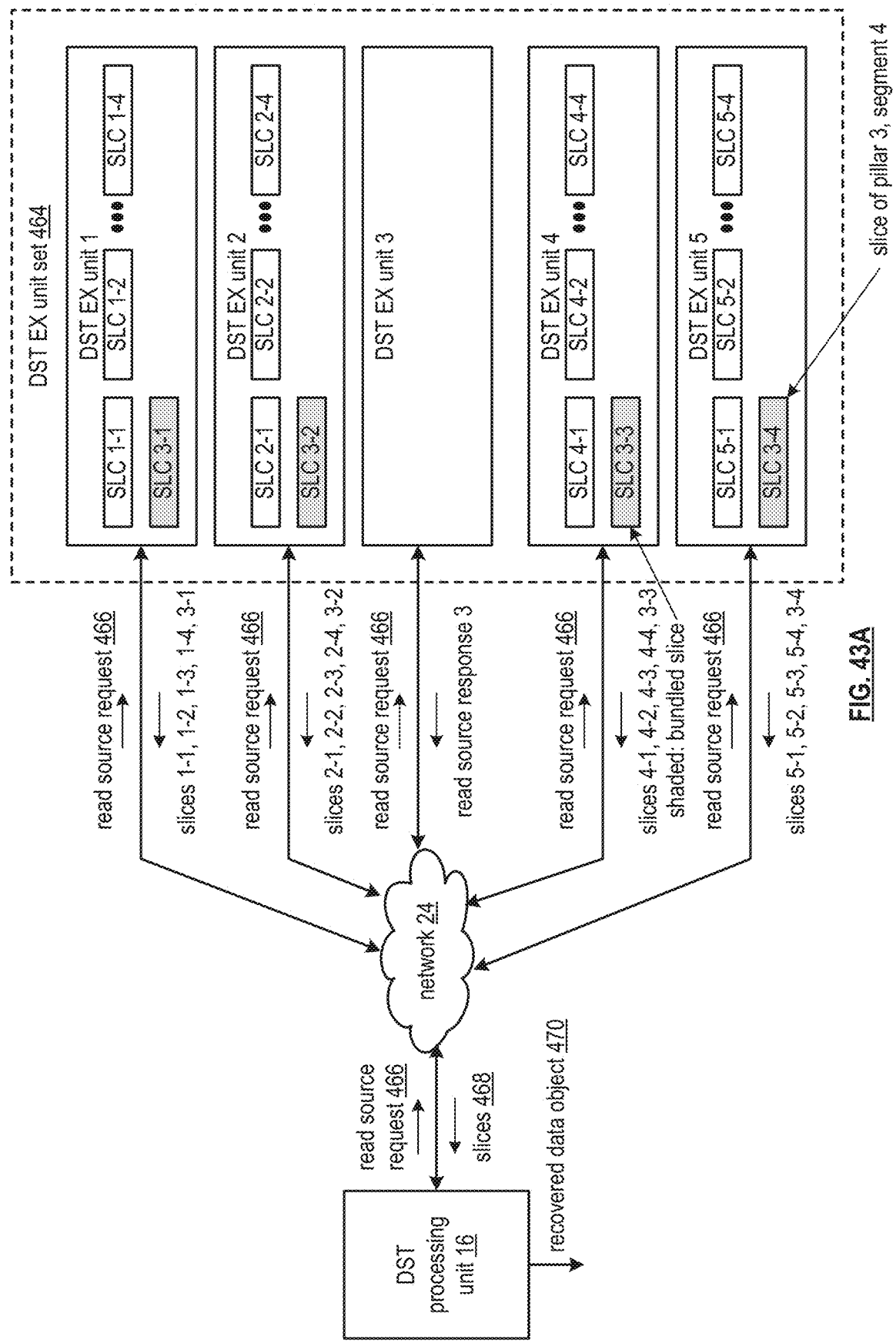
Figure 43B:
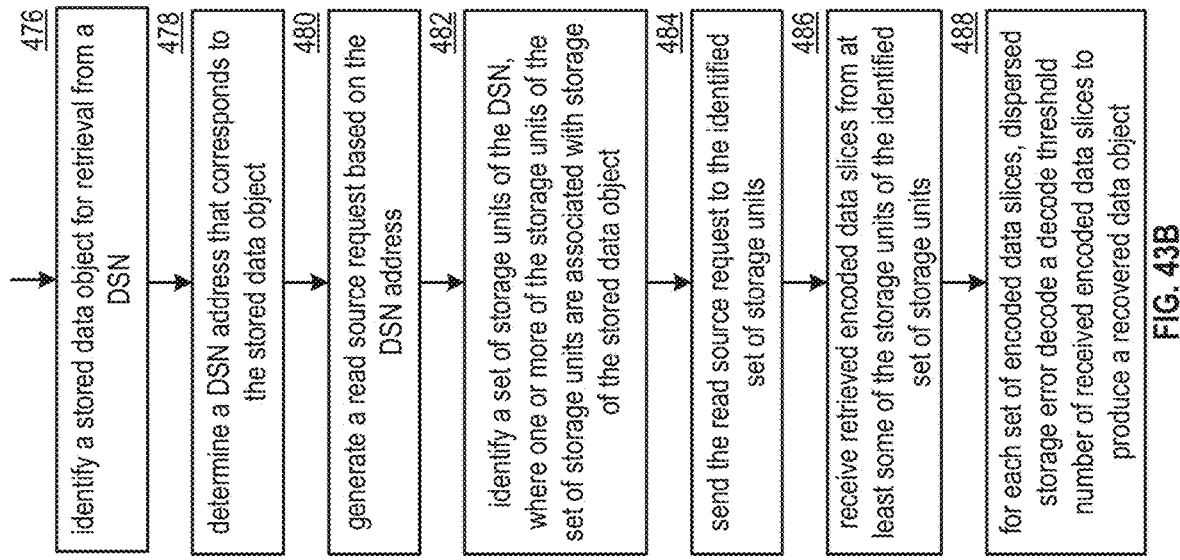
Figure 44A:
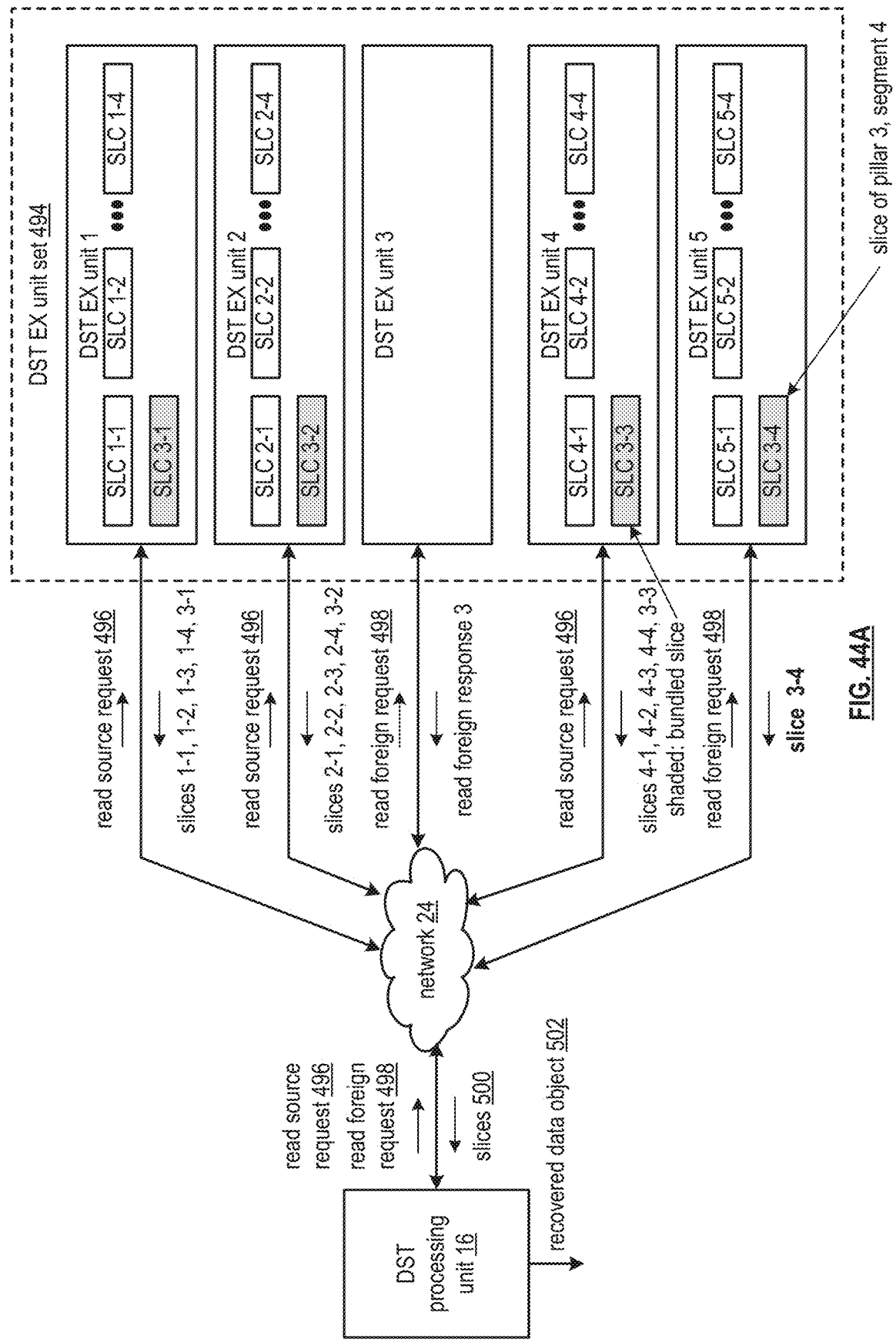
Figure 44B:
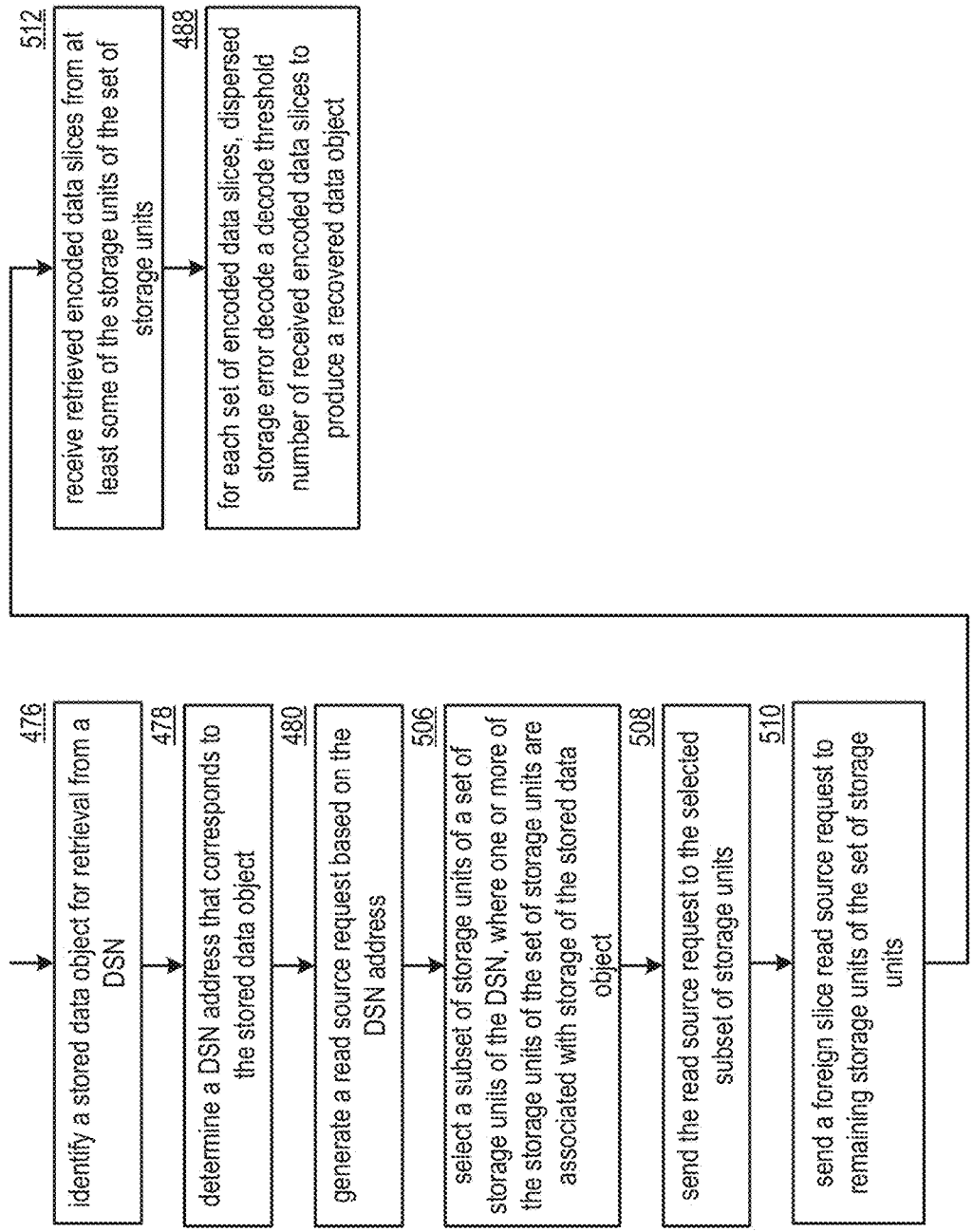
Figure 45A:
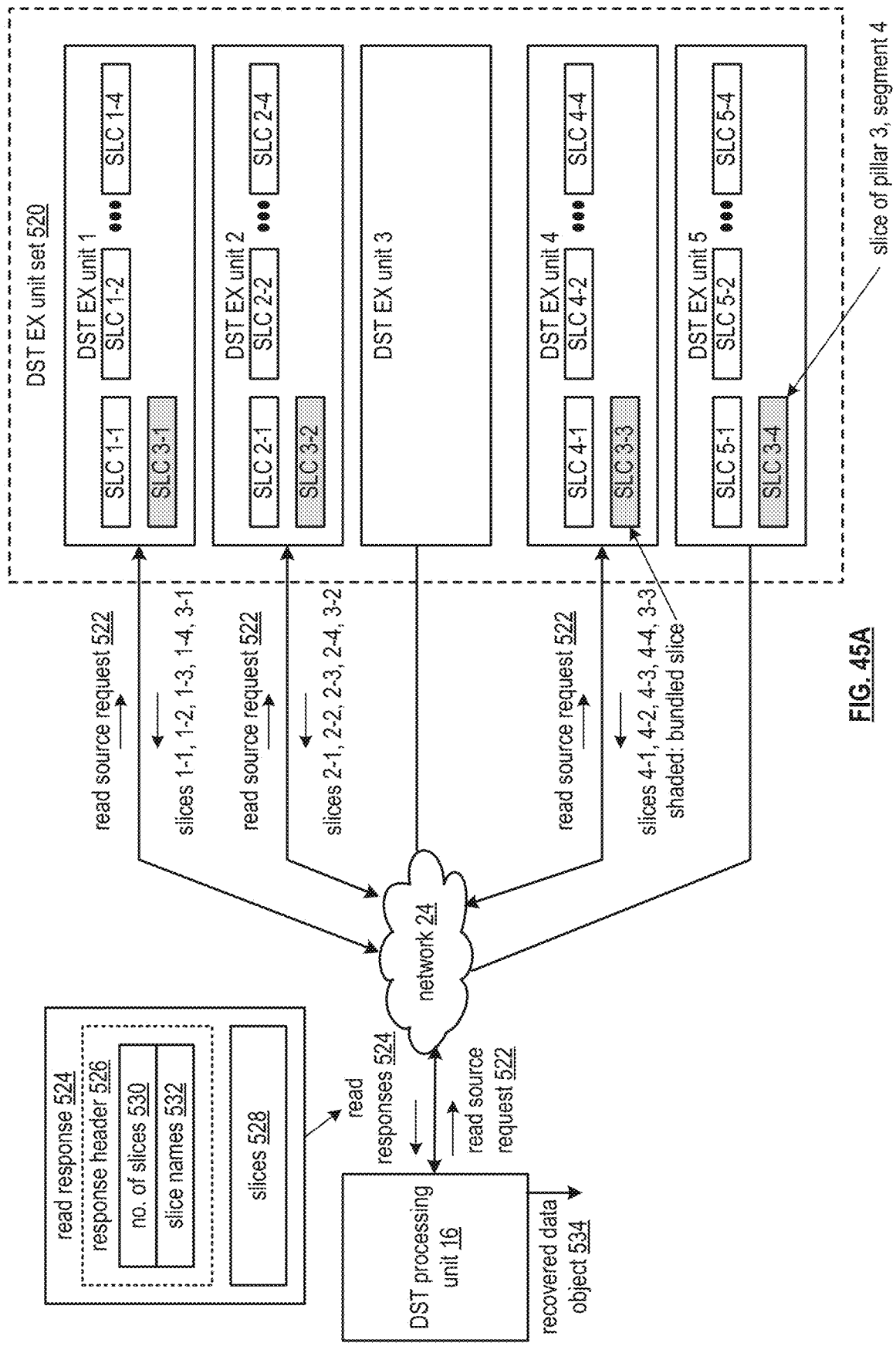
Figure 45B:
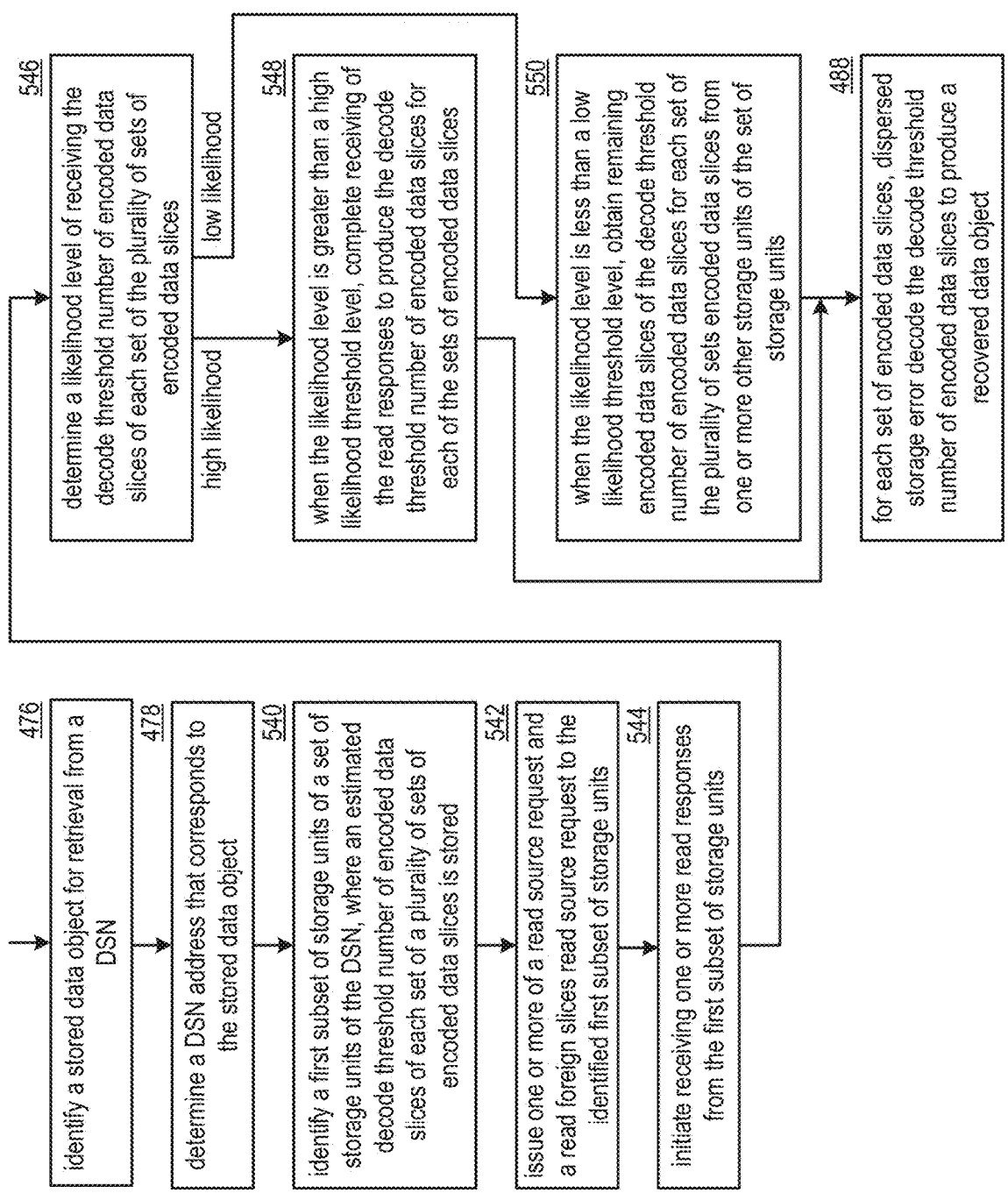
Figure 46A:
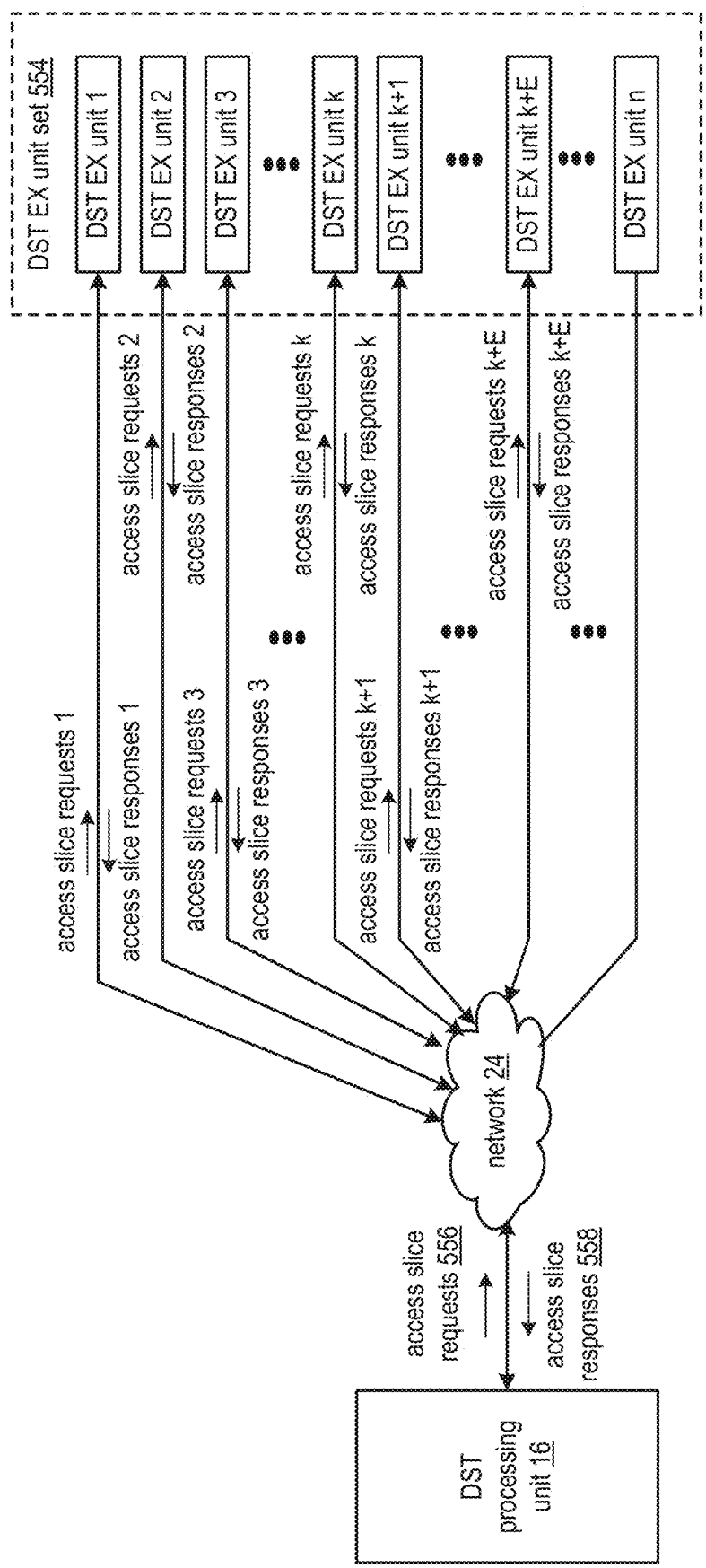
Figure 46B:
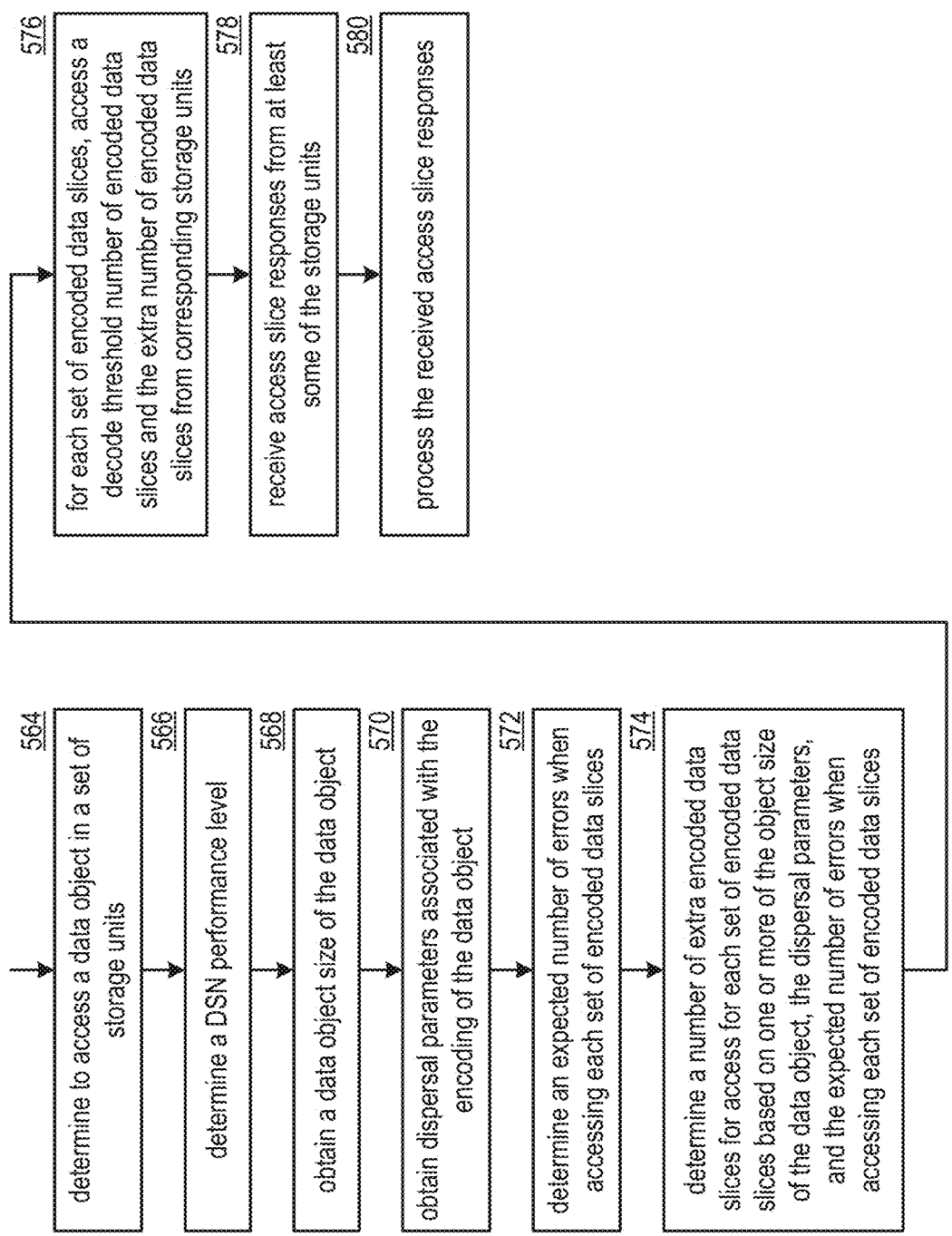
Figure 47A:
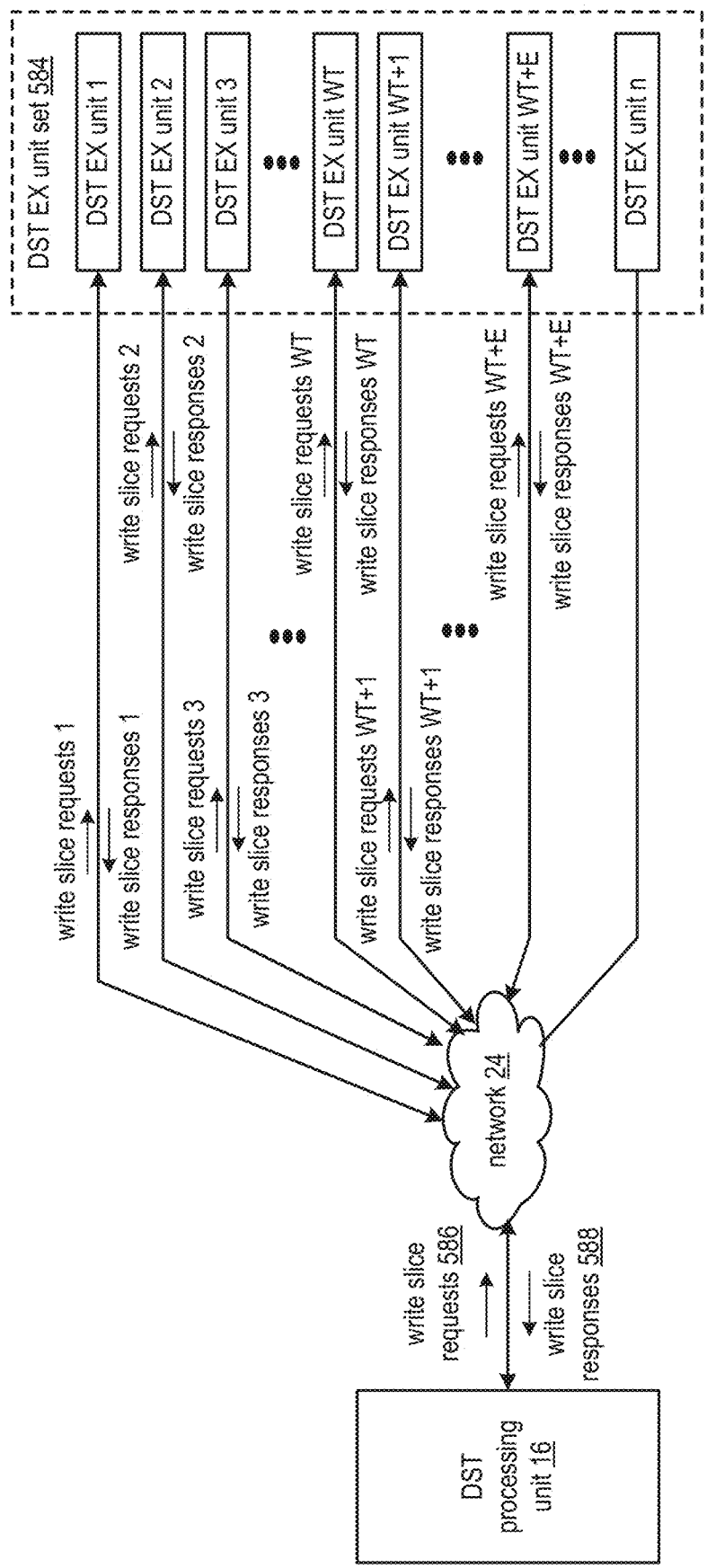
Figure 47B:
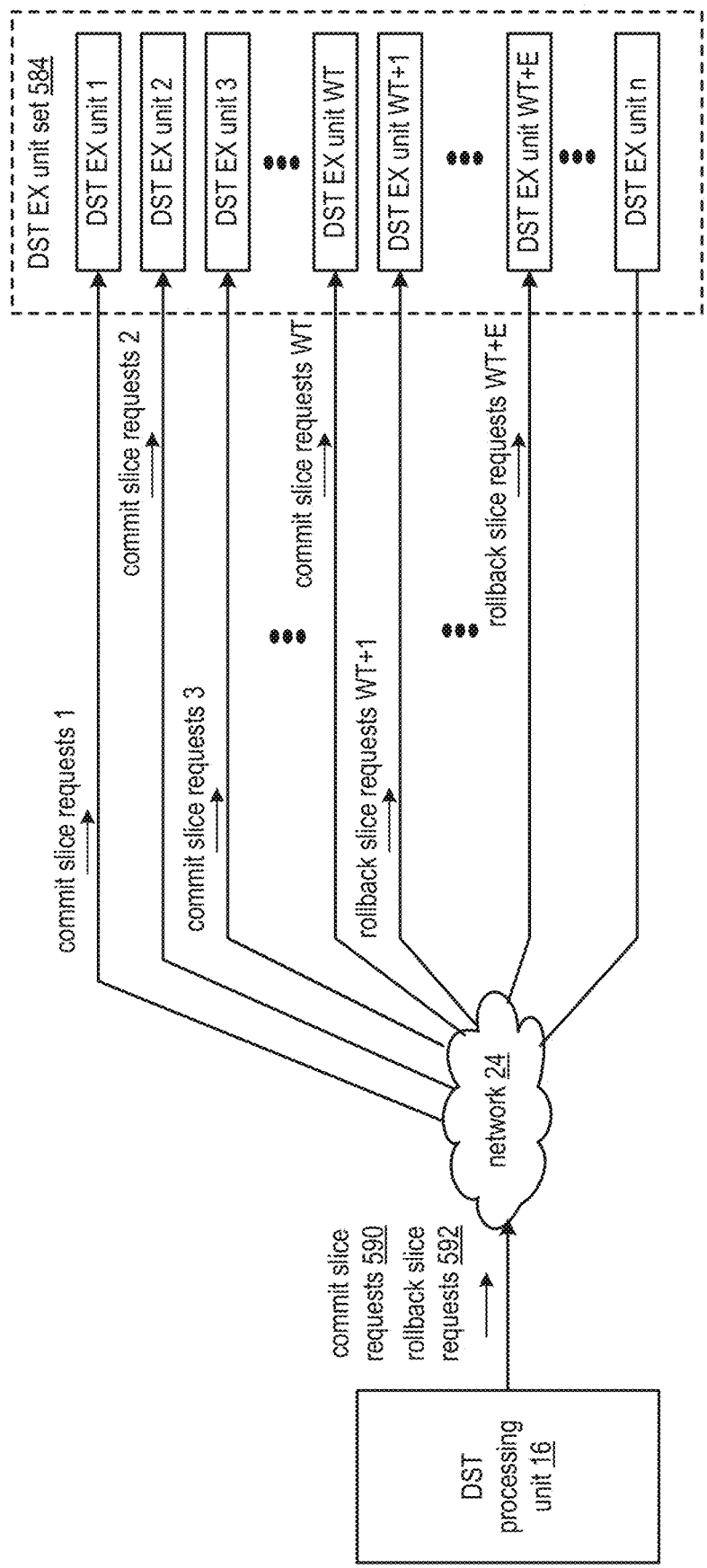
Figure 47C:
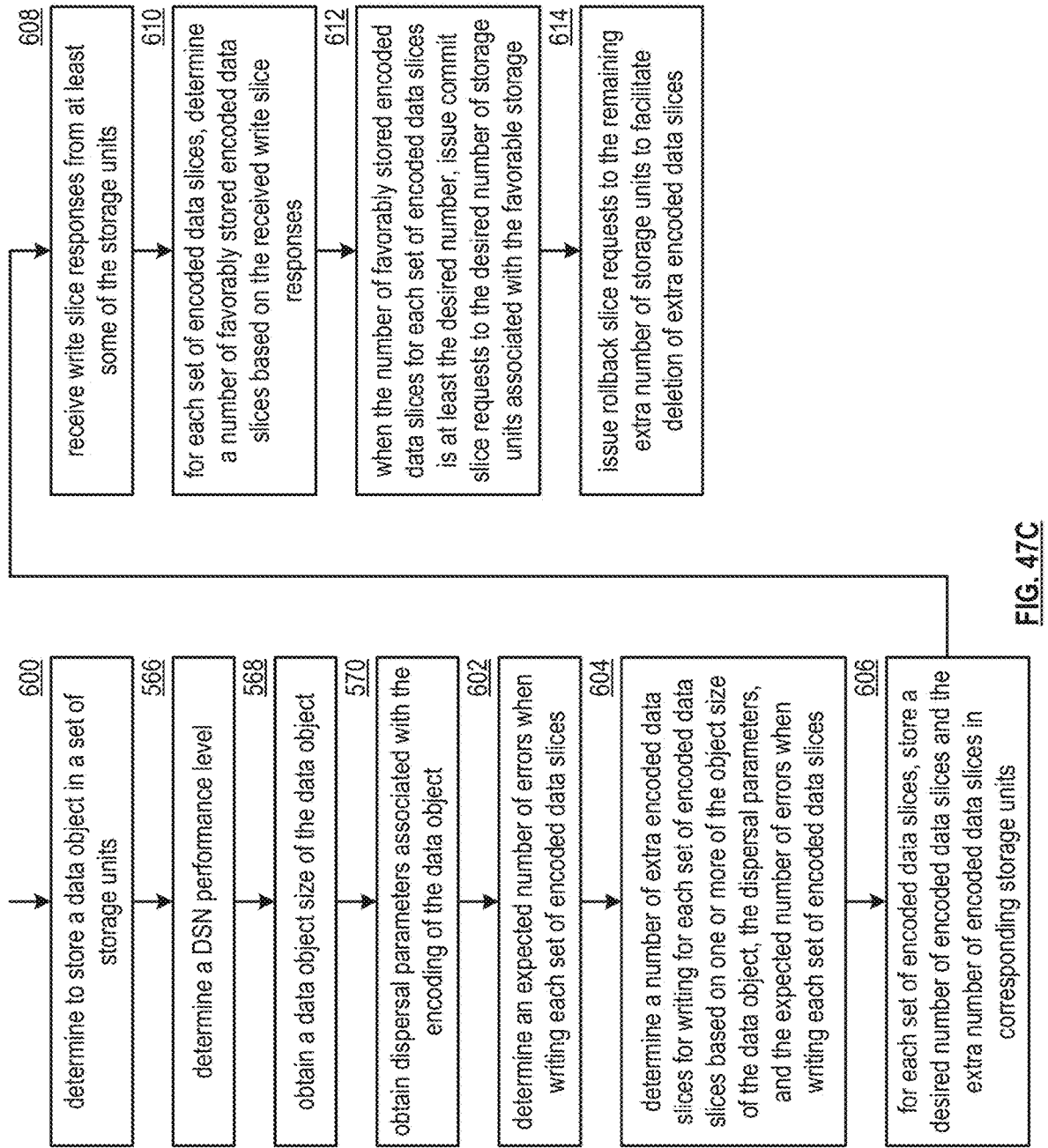
Figure 48A:
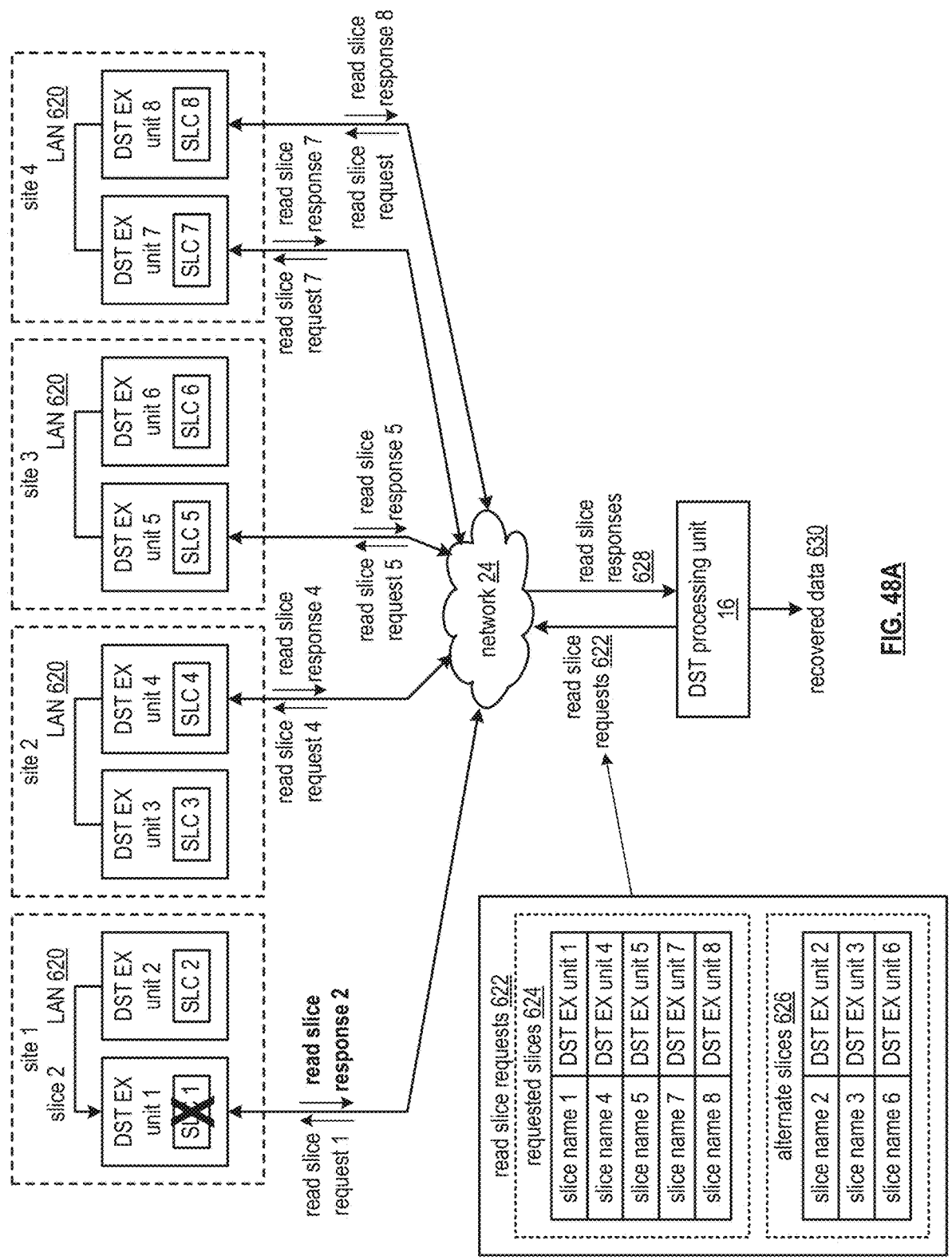
Figure 48B:
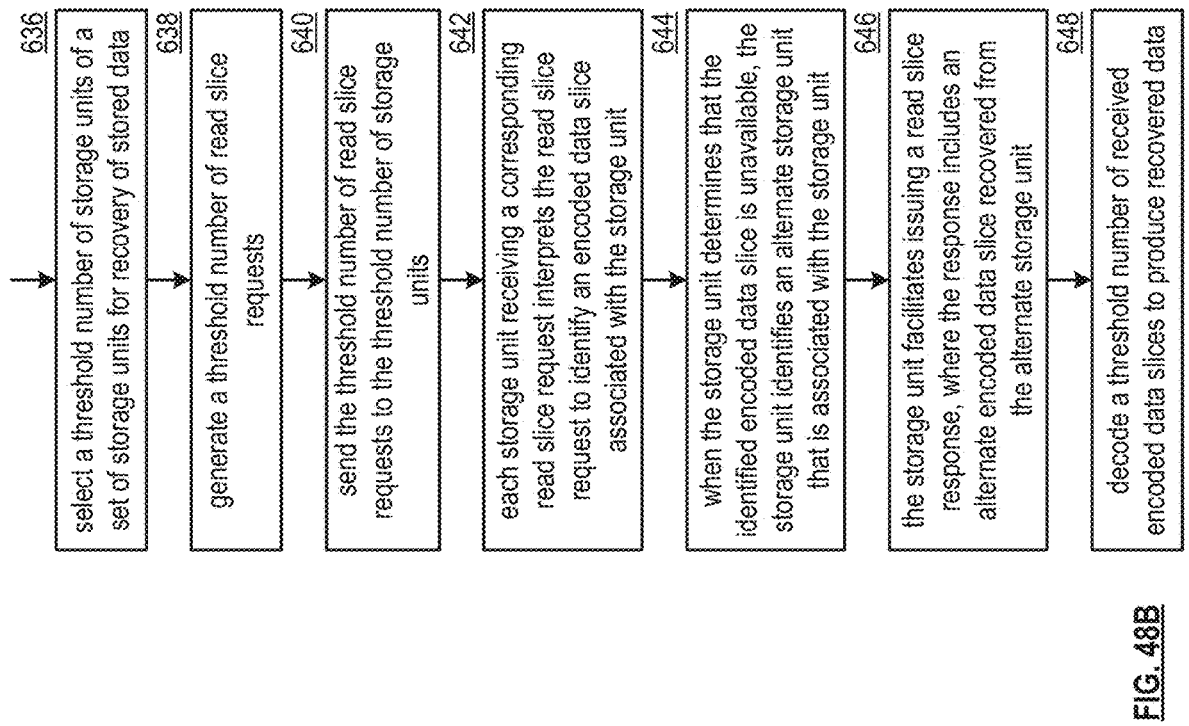

FIGS. 40A-B are schematic block diagrams of an embodiment of a dispersed storage network (DSN) in accordance with the present invention;

FIG. 40C is a flowchart illustrating an example of storing data in accordance with the present invention;

FIGS. 41A-B are schematic block diagrams of another embodiment of a dispersed storage network (DSN) in accordance with the present invention;

FIG. 41C is a flowchart illustrating another example of storing data in accordance with the present invention;

FIGS. 42A-B are schematic block diagrams of another embodiment of a dispersed storage network (DSN) in accordance with the present invention;

FIG. 42C is a flowchart illustrating another example of storing data in accordance with the present invention;

FIG. 43A is a schematic block diagram of another embodiment of a dispersed storage network (DSN) in accordance with the present invention;

FIG. 43B is a flowchart illustrating an example of recovering data in accordance with the present invention;

FIG. 44A is a schematic block diagram of another embodiment of a dispersed storage network (DSN) in accordance with the present invention;

FIG. 44B is a flowchart illustrating another example of recovering data in accordance with the present invention;

FIG. 45A is a schematic block diagram of another embodiment of a dispersed storage network (DSN) in accordance with the present invention;

FIG. 45B is a flowchart illustrating another example of recovering data in accordance with the present invention;

FIG. 46A is a schematic block diagram of another embodiment of a dispersed storage network (DSN) in accordance with the present invention;

FIG. 46B is a flowchart illustrating an example of accessing data in accordance with the present invention;

FIGS. 47A-B are schematic block diagrams of another embodiment of a dispersed storage network (DSN) in accordance with the present invention;

FIG. 47C is a flowchart illustrating another example of storing data in accordance with the present invention;

FIG. 48A is a schematic block diagram of another embodiment of a dispersed storage network (DSN) in accordance with the present invention; and FIG. 48B is a flowchart illustrating another example of recovering data in accordance with the present invention.

DETAILED DESCRIPTION OF THE INVENTION

Figure 1:
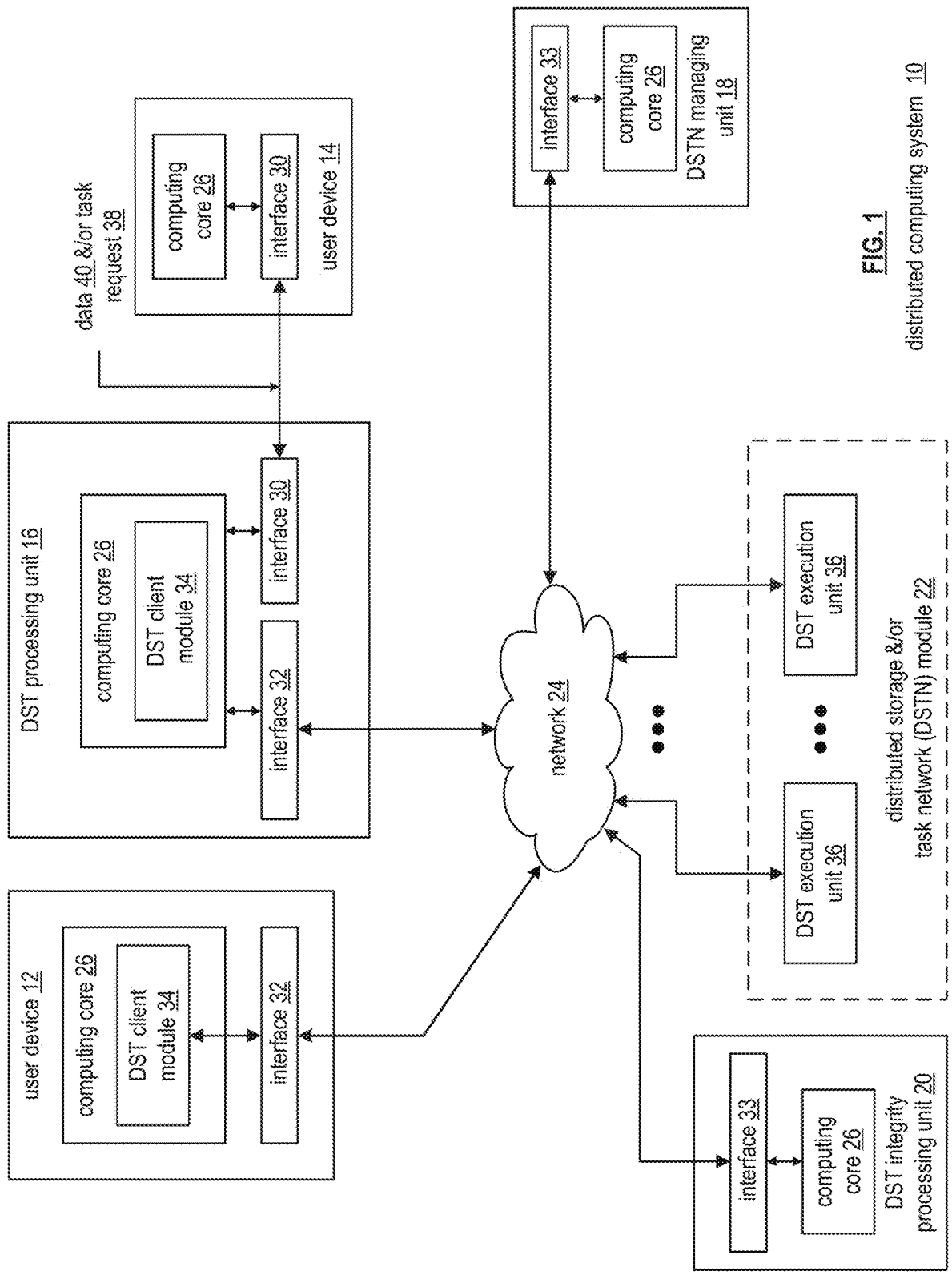
FIG. 1 is a schematic block diagram of an embodiment of a distributed computing system in accordance with the present invention.

FIG. 1 is a schematic block diagram of an embodiment of a distributed computing system 10 that includes a user device 12 and/or a user device 14, a distributed storage and/or task (DST) processing unit 16, a distributed storage and/or task network (DSTN) managing unit 18, a DST integrity processing unit 20, and a distributed storage and/or task network (DSTN) module 22. The components of the distributed computing system 10 are coupled via a network 24, which may include one or more wireless and/or wire lined communication systems; one or more private intranet systems and/or public internet systems; and/or one or more local area networks (LAN) and/or wide area networks (WAN).

The DSTN module 22 includes a plurality of distributed storage and/or task (DST) execution units 36 that may be located at geographically different sites (e.g., one in Chicago, one in Milwaukee, etc.). Each of the DST execution units is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc.

Each of the user devices 12-14, the DST processing unit 16, the DSTN managing unit 18, and the DST integrity processing unit 20 include a computing core 26 and may be a portable computing device and/or a fixed computing device. A portable computing device may be a social networking device, a gaming device, a cell phone, a smart phone, a personal digital assistant, a digital music player, a digital video player, a laptop computer, a handheld computer, a tablet, a video game controller, and/or any other portable device that includes a computing core. A fixed computing device may be a personal computer (PC), a computer server, a cable set-top box, a satellite receiver, a television set, a printer, a fax machine, home entertainment equipment, a video game console, and/or any type of home or office computing equipment. User device 12 and DST processing unit 16 are configured to include a DST client module 34.

With respect to interfaces, each interface 30, 32, and 33 includes software and/or hardware to support one or more communication links via the network 24 indirectly and/or directly. For example, interface 30 supports a communication link (e.g., wired, wireless, direct, via a LAN, via the network 24, etc.) between user device 14 and the DST processing unit 16. As another example, interface 32 supports communication links (e.g., a wired connection, a wireless connection, a LAN connection, and/or any other type of connection to/from the network 24) between user device 12 and the DSTN module 22 and between the DST processing unit 16 and the DSTN module 22. As yet another example, interface 33 supports a communication link for each of the DSTN managing unit 18 and DST integrity processing unit 20 to the network 24.

The distributed computing system 10 is operable to support dispersed storage (DS) error encoded data storage and retrieval, to support distributed task processing on received data, and/or to support distributed task processing on stored data. In general and with respect to DS error encoded data storage and retrieval, the distributed computing system 10 supports three primary operations: storage management, data storage and retrieval (an example of which will be discussed with reference to FIGS. 20-26), and data storage integrity verification. In accordance with these three primary functions, data can be encoded, distributedly stored in physically different locations, and subsequently retrieved in a reliable and secure manner. Such a system is tolerant of a significant number of failures (e.g., up to a failure level, which may be greater than or equal to a pillar width minus a decode threshold minus one) that may result from individual storage device failures and/or network equipment failures without loss of data and without the need for a redundant or backup copy. Further, the system allows the data to be stored for an indefinite period of time without data loss and does so in a secure manner (e.g., the system is very resistant to attempts at hacking the data). The second primary function (i.e., distributed data storage and retrieval) begins and ends with a user device 12-14. For instance, if a second type of user device 14 has data 40 to store in the DSTN module 22, it sends the data 40 to the DST processing unit 16 via its interface 30. The interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data 40.

To support storage management, the DSTN managing unit 18 performs DS management services. One such DS management service includes the DSTN managing unit 18 establishing distributed data storage parameters (e.g., vault creation, distributed storage parameters, security parameters, billing information, user profile information, etc.) for a user device 12-14 individually or as part of a group of user devices. For example, the DSTN managing unit 18 coordinates creation of a vault (e.g., a virtual memory block) within memory of the DSTN module 22 for a user device, a group of devices, or for public access and establishes per vault dispersed storage (D S) error encoding parameters for a vault. The DSTN managing unit 18 may facilitate storage of DS error encoding parameters for each vault of a plurality of vaults by updating registry information for the distributed computing system 10. The facilitating includes storing updated registry information in one or more of the DSTN module 22, the user device 12, the DST processing unit 16, and the DST integrity processing unit 20.

The DS error encoding parameters (e.g., or dispersed storage error coding parameters) include data segmenting information (e.g., how many segments data (e.g., a file, a group of files, a data block, etc.) is divided into), segment security information (e.g., per segment encryption, compression, integrity checksum, etc.), error coding information (e.g., pillar width, decode threshold, read threshold, write threshold, etc.), slicing information (e.g., the number of encoded data slices that will be created for each data segment); and slice security information (e.g., per encoded data slice encryption, compression, integrity checksum, etc.).

The DSTN managing unit 18 creates and stores user profile information (e.g., an access control list (ACL)) in local memory and/or within memory of the DSTN module 22. The user profile information includes authentication information, permissions, and/or the security parameters. The security parameters may include encryption/decryption scheme, one or more encryption keys, key generation scheme, and/or data encoding/decoding scheme.

The DSTN managing unit 18 creates billing information for a particular user, a user group, a vault access, public vault access, etc. For instance, the DSTN managing unit 18 tracks the number of times a user accesses a private vault and/or public vaults, which can be used to generate a per-access billing information. In another instance, the DSTN managing unit 18 tracks the amount of data stored and/or retrieved by a user device and/or a user group, which can be used to generate a per-data-amount billing information.

Another DS management service includes the DSTN managing unit 18 performing network operations, network administration, and/or network maintenance. Network operations includes authenticating user data allocation requests (e.g., read and/or write requests), managing creation of vaults, establishing authentication credentials for user devices, adding/deleting components (e.g., user devices, DST execution units, and/or DST processing units) from the distributed computing system 10, and/or establishing authentication credentials for DST execution units 36. Network administration includes monitoring devices and/or units for failures, maintaining vault information, determining device and/or unit activation status, determining device and/or unit loading, and/or determining any other system level operation that affects the performance level of the system 10. Network maintenance includes facilitating replacing, upgrading, repairing, and/or expanding a device and/or unit of the system 10.

To support data storage integrity verification within the distributed computing system 10, the DST integrity processing unit 20 performs rebuilding of 'bad' or missing encoded data slices. At a high level, the DST integrity processing unit 20 performs rebuilding by periodically attempting to retrieve/list encoded data slices, and/or slice names of the encoded data slices, from the DSTN module 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in memory of the DSTN module 22. Note that the DST integrity processing unit 20 may be a separate unit as shown, it may be included in the DSTN module 22, it may be included in the DST processing unit 16, and/or distributed among the DST execution units 36.

To support distributed task processing on received data, the distributed computing system 10 has two primary operations: DST (distributed storage and/or task processing) management and DST execution on received data (an example of which will be discussed with reference to FIGS. 3-19). With respect to the storage portion of the DST management, the DSTN managing unit 18 functions as previously described. With respect to the tasking processing of the DST management, the DSTN managing unit 18 performs distributed task processing (DTP) management services. One such DTP management service includes the DSTN managing unit 18 establishing DTP parameters (e.g., user-vault affiliation information, billing information, user-task information, etc.) for a user device 12-14 individually or as part of a group of user devices.

Another DTP management service includes the DSTN managing unit 18 performing DTP network operations, network administration (which is essentially the same as described above), and/or network maintenance (which is essentially the same as described above). Network operations include, but are not limited to, authenticating user task processing requests (e.g., valid request, valid user, etc.), authenticating results and/or partial results, establishing DTP authentication credentials for user devices, adding/deleting components (e.g., user devices, DST execution units, and/or DST processing units) from the distributed computing system, and/or establishing DTP authentication credentials for DST execution units.

To support distributed task processing on stored data, the distributed computing system 10 has two primary operations: DST (distributed storage and/or task) management and DST execution on stored data. With respect to the DST execution on stored data, if the second type of user device 14 has a task request 38 for execution by the DSTN module 22, it sends the task request 38 to the DST processing unit 16 via its interface 30. An example of DST execution on stored data will be discussed in greater detail with reference to FIGS. 27-39. With respect to the DST management, it is substantially similar to the DST management to support distributed task processing on received data.

Figure 2:
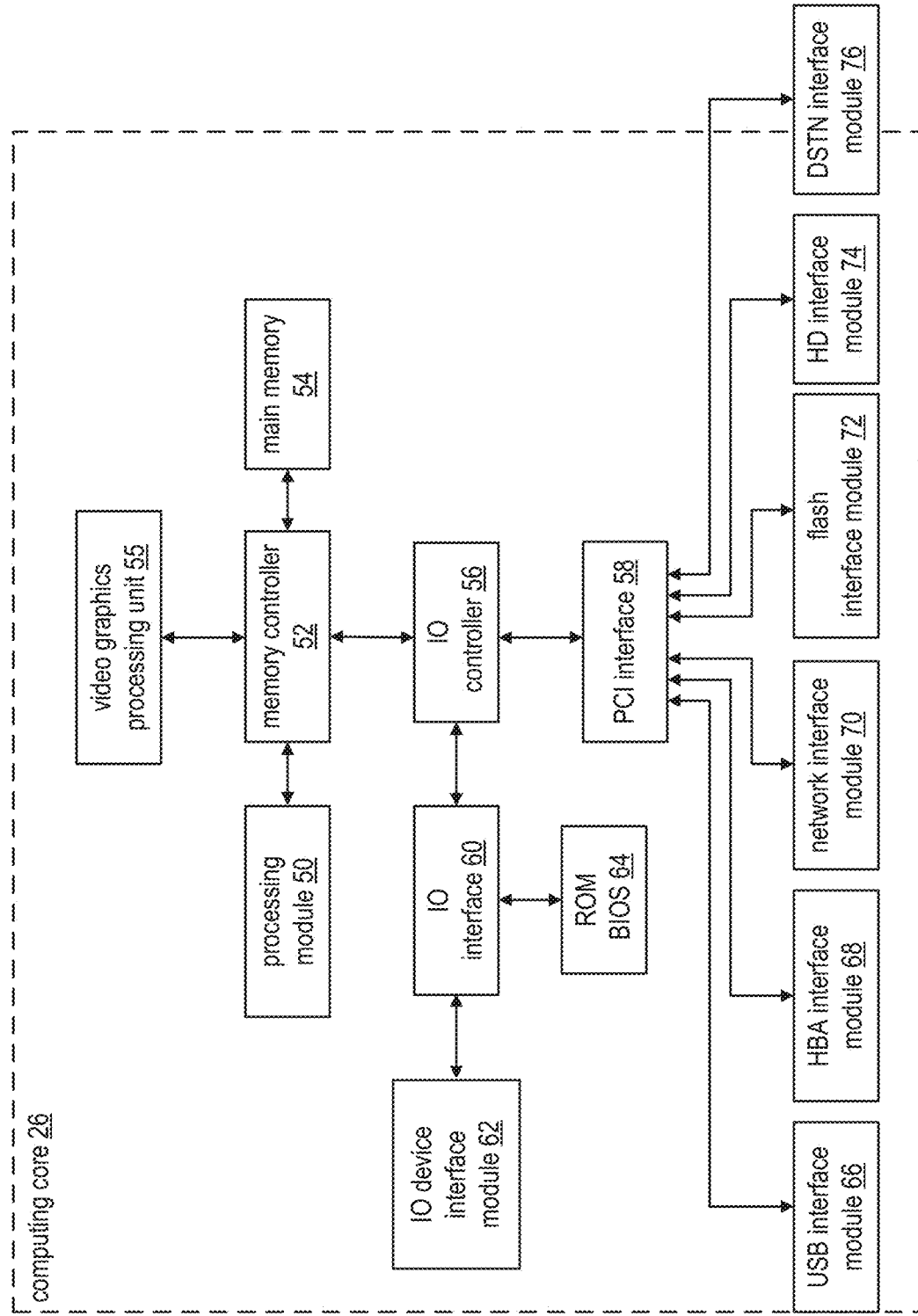
FIG. 2 is a schematic block diagram of an embodiment of a computing core in accordance with the present invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an 10 interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSTN interface module 76.

The DSTN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSTN interface module 76 and/or the network interface module 70 may function as the interface 30 of the user device 14 of FIG. 1. Further note that the 10 device interface module 62 and/or the memory interface modules may be collectively or individually referred to as IO ports.

Figure 3:
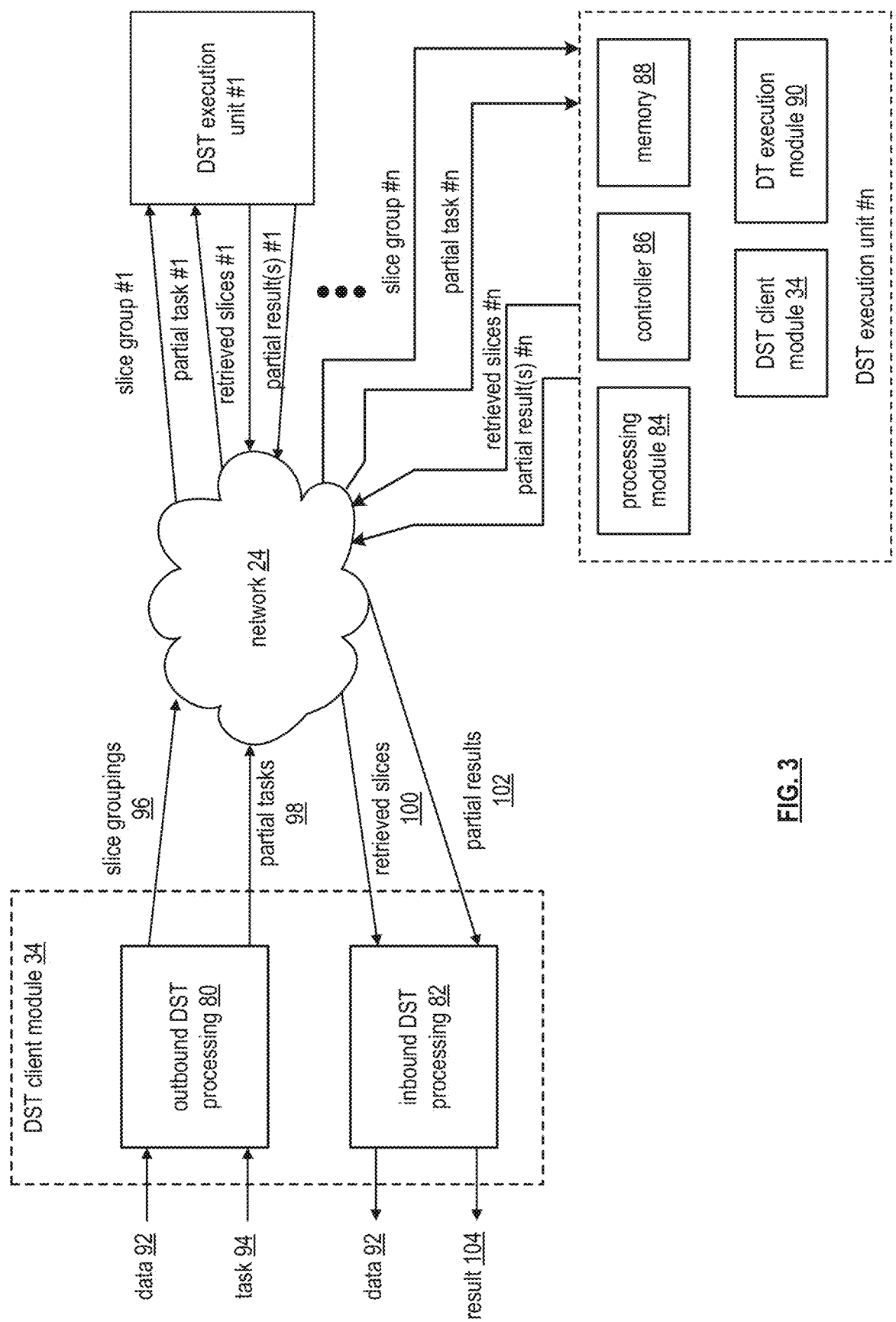
FIG. 3 is a diagram of an example of a distributed storage and task processing in accordance with the present invention.

FIG. 3 is a diagram of an example of the distributed computing system performing a distributed storage and task processing operation. The distributed computing system includes a DST (distributed storage and/or task) client module 34 (which may be in user device 14 and/or in DST processing unit 16 of FIG. 1), a network 24, a plurality of DST execution units 1-n that includes two or more DST execution units 36 of FIG. 1 (which form at least a portion of DSTN module 22 of FIG. 1), a DST managing module (not shown), and a DST integrity verification module (not shown). The DST client module 34 includes an outbound DST processing section 80 and an inbound DST processing section 82. Each of the DST execution units 1-n includes a controller 86, a processing module 84, memory 88, a DT (distributed task) execution module 90, and a DST client module 34.

In an example of operation, the DST client module 34 receives data 92 and one or more tasks 94 to be performed upon the data 92. The data 92 may be of any size and of any content, where, due to the size (e.g., greater than a few Terabytes), the content (e.g., secure data, etc.), and/or task(s) (e.g., MIPS intensive), distributed processing of the task(s) on the data is desired. For example, the data 92 may be one or more digital books, a copy of a company's emails, a large-scale Internet search, a video security file, one or more entertainment video files (e.g., television programs, movies, etc.), data files, and/or any other large amount of data (e.g., greater than a few Terabytes).

Within the DST client module 34, the outbound DST processing section 80 receives the data 92 and the task(s) 94. The outbound DST processing section 80 processes the data 92 to produce slice groupings 96. As an example of such processing, the outbound DST processing section 80 partitions the data 92 into a plurality of data partitions. For each data partition, the outbound DST processing section 80 dispersed storage (DS) error encodes the data partition to produce encoded data slices and groups the encoded data slices into a slice grouping 96. In addition, the outbound DST processing section 80 partitions the task 94 into partial tasks 98, where the number of partial tasks 98 may correspond to the number of slice groupings 96.

The outbound DST processing section 80 then sends, via the network 24, the slice groupings 96 and the partial tasks 98 to the DST execution units 1-n of the DSTN module 22 of FIG. 1. For example, the outbound DST processing section 80 sends slice group 1 and partial task 1 to DST execution unit 1. As another example, the outbound DST processing section 80 sends slice group #n and partial task #n to DST execution unit #n.

Each DST execution unit performs its partial task 98 upon its slice group 96 to produce partial results 102. For example, DST execution unit #1 performs partial task #1 on slice group #1 to produce a partial result #1, for results. As a more specific example, slice group #1 corresponds to a data partition of a series of digital books and the partial task #1 corresponds to searching for specific phrases, recording where the phrase is found, and establishing a phrase count. In this more specific example, the partial result #1 includes information as to where the phrase was found and includes the phrase count.

Upon completion of generating their respective partial results 102, the DST execution units send, via the network 24, their partial results 102 to the inbound DST processing section 82 of the DST client module 34. The inbound DST processing section 82 processes the received partial results 102 to produce a result 104. Continuing with the specific example of the preceding paragraph, the inbound DST processing section 82 combines the phrase count from each of the DST execution units 36 to produce a total phrase count. In addition, the inbound DST processing section 82 combines the 'where the phrase was found' information from each of the DST execution units 36 within their respective data partitions to produce 'where the phrase was found' information for the series of digital books.

In another example of operation, the DST client module 34 requests retrieval of stored data within the memory of the DST execution units 36 (e.g., memory of the DSTN module). In this example, the task 94 is retrieve data stored in the memory of the DSTN module. Accordingly, the outbound DST processing section 80 converts the task 94 into a plurality of partial tasks 98 and sends the partial tasks 98 to the respective DST execution units 1-n. In response to the partial task 98 of retrieving stored data, a DST execution unit 36 identifies the corresponding encoded data slices 100 and retrieves them. For example, DST execution unit #1 receives partial task #1 and retrieves, in response thereto, retrieved slices #1. The DST execution units 36 send their respective retrieved slices 100 to the inbound DST processing section 82 via the network 24.

The inbound DST processing section 82 converts the retrieved slices 100 into data 92. For example, the inbound DST processing section 82 de-groups the retrieved slices 100 to produce encoded slices per data partition. The inbound DST processing section 82 then DS error decodes the encoded slices per data partition to produce data partitions. The inbound DST processing section 82 de-partitions the data partitions to recapture the data 92.

Figure 4:
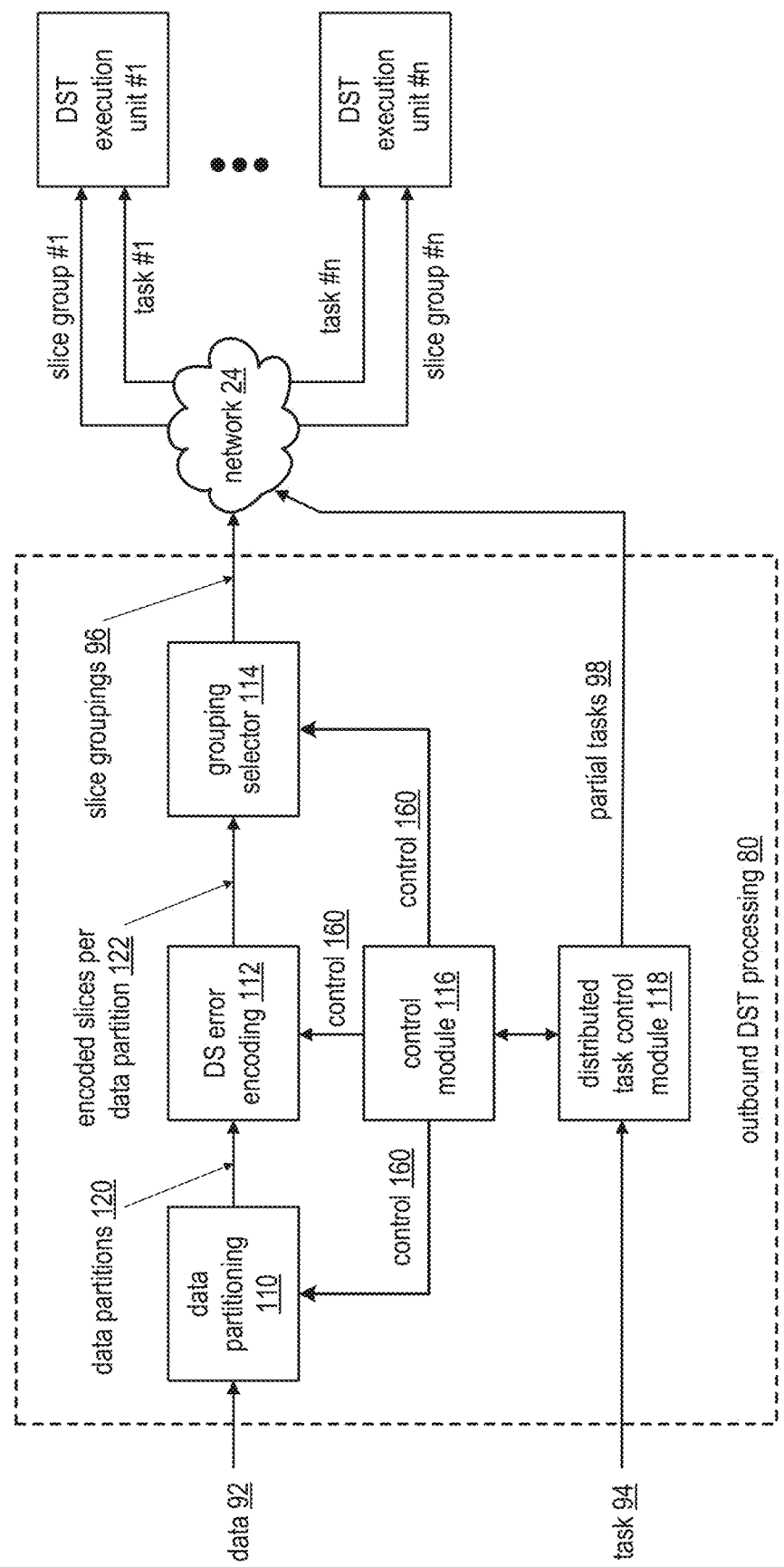
FIG. 4 is a schematic block diagram of an embodiment of an outbound distributed storage and/or task (DST) processing in accordance with the present invention.

FIG. 4 is a schematic block diagram of an embodiment of an outbound distributed storage and/or task (DST) processing section 80 of a DST client module 34 FIG. 1 coupled to a DSTN module 22 of a FIG. 1 (e.g., a plurality of n DST execution units 36) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 partitions data 92 into a plurality of data partitions 120. The number of partitions and the size of the partitions may be selected by the control module 116 via control 160 based on the data 92 (e.g., its size, its content, etc.), a corresponding task 94 to be performed (e.g., simple, complex, single step, multiple steps, etc.), DS encoding parameters (e.g., pillar width, decode threshold, write threshold, segment security parameters, slice security parameters, etc.), capabilities of the DST execution units 36 (e.g., processing resources, availability of processing recourses, etc.), and/or as may be inputted by a user, system administrator, or other operator (human or automated). For example, the data partitioning module 110 partitions the data 92 (e.g., 100 Terabytes) into 100,000 data segments, each being 1 Gigabyte in size. Alternatively, the data partitioning module 110 partitions the data 92 into a plurality of data segments, where some of data segments are of a different size, are of the same size, or a combination thereof.

The DS error encoding module 112 receives the data partitions 120 in a serial manner, a parallel manner, and/or a combination thereof. For each data partition 120, the DS error encoding module 112 DS error encodes the data partition 120 in accordance with control information 160 from the control module 116 to produce encoded data slices 122. The DS error encoding includes segmenting the data partition into data segments, segment security processing (e.g., encryption, compression, watermarking, integrity check (e.g., CRC), etc.), error encoding, slicing, and/or per slice security processing (e.g., encryption, compression, watermarking, integrity check (e.g., CRC), etc.). The control information 160 indicates which steps of the DS error encoding are active for a given data partition and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 122 of a data partition into a set of slice groupings 96. The number of slice groupings corresponds to the number of DST execution units 36 identified for a particular task 94. For example, if five DST execution units 36 are identified for the particular task 94, the grouping selector module groups the encoded slices 122 of a data partition into five slice groupings 96. The grouping selector module 114 outputs the slice groupings 96 to the corresponding DST execution units 36 via the network 24.

The distributed task control module 118 receives the task 94 and converts the task 94 into a set of partial tasks 98. For example, the distributed task control module 118 receives a task to find where in the data (e.g., a series of books) a phrase occurs and a total count of the phrase usage in the data. In this example, the distributed task control module 118 replicates the task 94 for each DST execution unit 36 to produce the partial tasks 98. In another example, the distributed task control module 118 receives a task to find where in the data a first phrase occurs, where in the data a second phrase occurs, and a total count for each phrase usage in the data. In this example, the distributed task control module 118 generates a first set of partial tasks 98 for finding and counting the first phase and a second set of partial tasks for finding and counting the second phrase. The distributed task control module 118 sends respective first and/or second partial tasks 98 to each DST execution unit 36.

Figure 5:
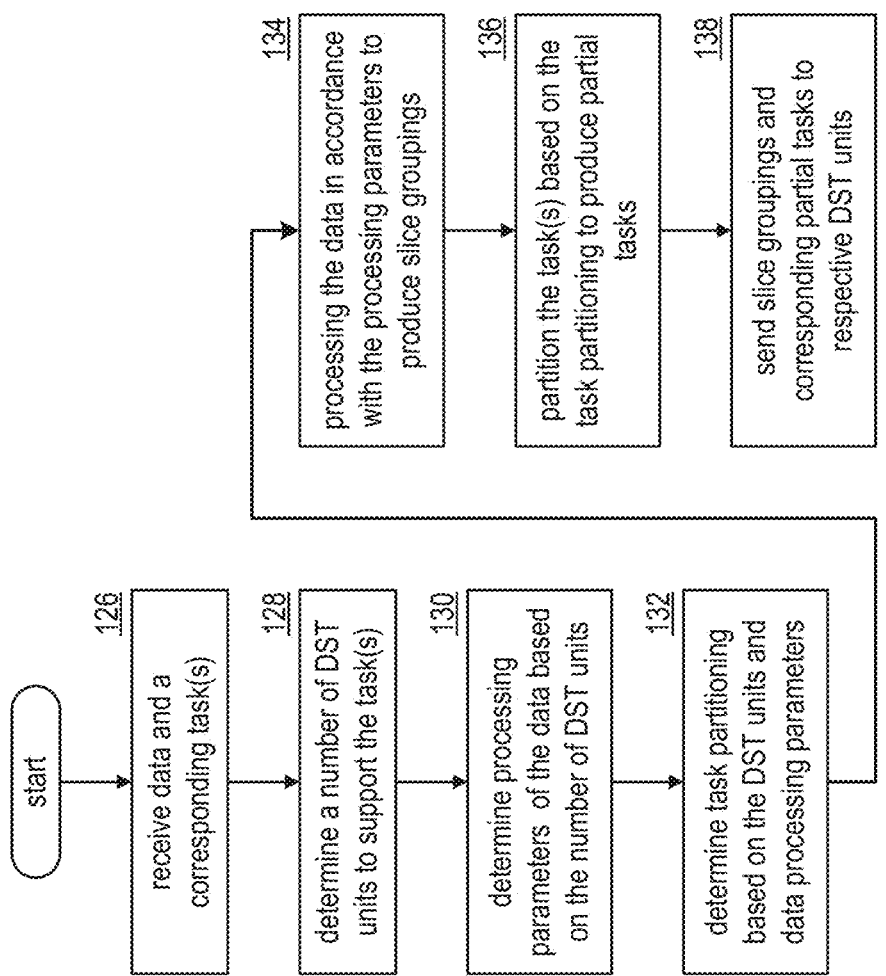
FIG. 5 is a logic diagram of an example of a method for outbound DST processing in accordance with the present invention.

FIG. 5 is a logic diagram of an example of a method for outbound distributed storage and task (DST) processing that begins at step 126 where a DST client module receives data and one or more corresponding tasks. The method continues at step 128 where the DST client module determines a number of DST units to support the task for one or more data partitions. For example, the DST client module may determine the number of DST units to support the task based on the size of the data, the requested task, the content of the data, a predetermined number (e.g., user indicated, system administrator determined, etc.), available DST units, capability of the DST units, and/or any other factor regarding distributed task processing of the data. The DST client module may select the same DST units for each data partition, may select different DST units for the data partitions, or a combination thereof.

The method continues at step 130 where the DST client module determines processing parameters of the data based on the number of DST units selected for distributed task processing. The processing parameters include data partitioning information, DS encoding parameters, and/or slice grouping information. The data partitioning information includes a number of data partitions, size of each data partition, and/or organization of the data partitions (e.g., number of data blocks in a partition, the size of the data blocks, and arrangement of the data blocks). The DS encoding parameters include segmenting information, segment security information, error encoding information (e.g., dispersed storage error encoding function parameters including one or more of pillar width, decode threshold, write threshold, read threshold, generator matrix), slicing information, and/or per slice security information. The slice grouping information includes information regarding how to arrange the encoded data slices into groups for the selected DST units. As a specific example, if the DST client module determines that five DST units are needed to support the task, then it determines that the error encoding parameters include a pillar width of five and a decode threshold of three.

The method continues at step 132 where the DST client module determines task partitioning information (e.g., how to partition the tasks) based on the selected DST units and data processing parameters. The data processing parameters include the processing parameters and DST unit capability information. The DST unit capability information includes the number of DT (distributed task) execution units, execution capabilities of each DT execution unit (e.g., MIPS capabilities, processing resources (e.g., quantity and capability of microprocessors, CPUs, digital signal processors, co-processor, microcontrollers, arithmetic logic circuitry, and/or and the other analog and/or digital processing circuitry), availability of the processing resources, memory information (e.g., type, size, availability, etc.)), and/or any information germane to executing one or more tasks.

The method continues at step 134 where the DST client module processes the data in accordance with the processing parameters to produce slice groupings. The method continues at step 136 where the DST client module partitions the task based on the task partitioning information to produce a set of partial tasks. The method continues at step 138 where the DST client module sends the slice groupings and the corresponding partial tasks to respective DST units.

Figure 6:
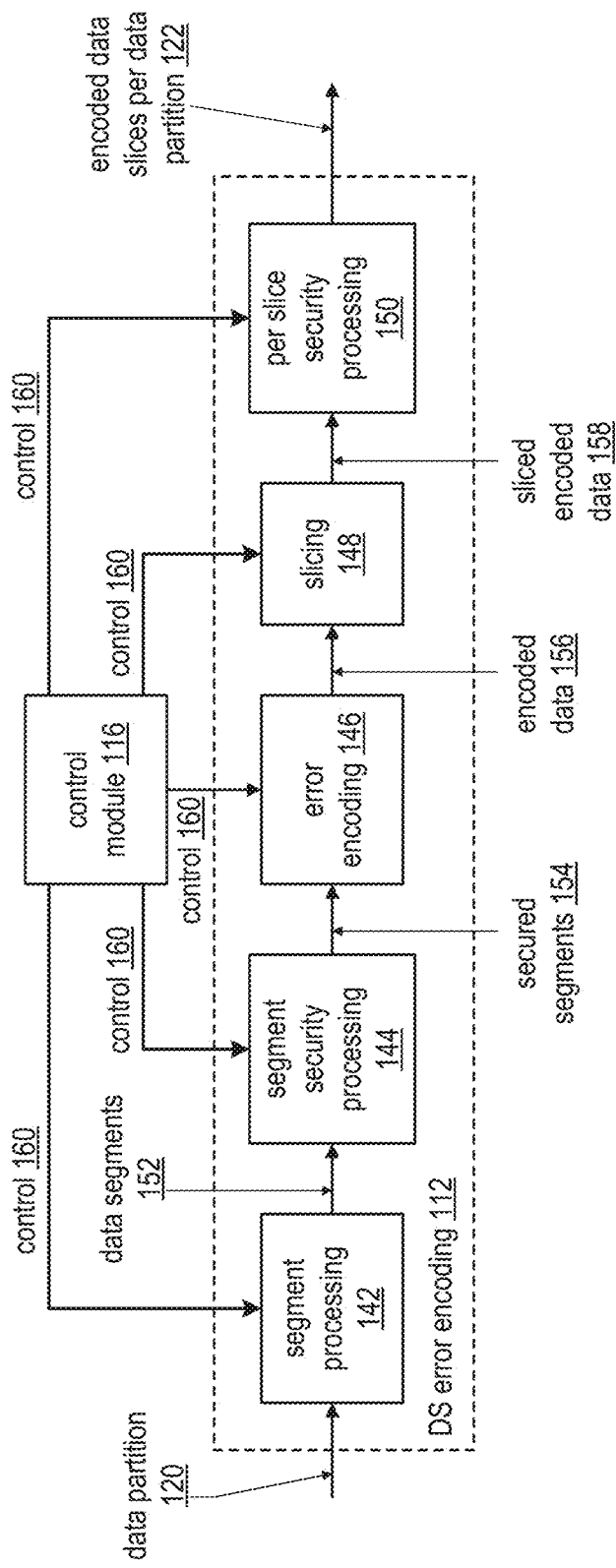
FIG. 6 is a schematic block diagram of an embodiment of a dispersed error encoding in accordance with the present invention.

FIG. 6 is a schematic block diagram of an embodiment of the dispersed storage (DS) error encoding module 112 of an outbound distributed storage and task (DST) processing section. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives a data partition 120 from a data partitioning module and receives segmenting information as the control information 160 from the control module 116. The segmenting information indicates how the segment processing module 142 is to segment the data partition 120. For example, the segmenting information indicates how many rows to segment the data based on a decode threshold of an error encoding scheme, indicates how many columns to segment the data into based on a number and size of data blocks within the data partition 120, and indicates how many columns to include in a data segment 152. The segment processing module 142 segments the data 120 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., cyclic redundancy check (CRC), etc.), and/or any other type of digital security. For example, when the segment security processing module 144 is enabled, it may compress a data segment 152, encrypt the compressed data segment, and generate a CRC value for the encrypted data segment to produce a secure data segment 154. When the segment security processing module 144 is not enabled, it passes the data segments 152 to the error encoding module 146 or is bypassed such that the data segments 152 are provided to the error encoding module 146.

The error encoding module 146 encodes the secure data segments 154 in accordance with error correction encoding parameters received as control information 160 from the control module 116. The error correction encoding parameters (e.g., also referred to as dispersed storage error coding parameters) include identifying an error correction encoding scheme (e.g., forward error correction algorithm, a Reed-Solomon based algorithm, an online coding algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment 154 to produce an encoded data segment 156.

The slicing module 148 slices the encoded data segment 156 in accordance with the pillar width of the error correction encoding parameters received as control information 160. For example, if the pillar width is five, the slicing module 148 slices an encoded data segment 156 into a set of five encoded data slices. As such, for a plurality of encoded data segments 156 for a given data partition, the slicing module outputs a plurality of sets of encoded data slices 158.

The per slice security processing module 150, when enabled by the control module 116, secures each encoded data slice 158 based on slice security information received as control information 160 from the control module 116. The slice security information includes data compression, encryption, watermarking, integrity check (e.g., CRC, etc.), and/or any other type of digital security. For example, when the per slice security processing module 150 is enabled, it compresses an encoded data slice 158, encrypts the compressed encoded data slice, and generates a CRC value for the encrypted encoded data slice to produce a secure encoded data slice 122. When the per slice security processing module 150 is not enabled, it passes the encoded data slices 158 or is bypassed such that the encoded data slices 158 are the output of the DS error encoding module 112.

Note that the control module 116 may be omitted and each module stores its own parameters.

Figure 7:
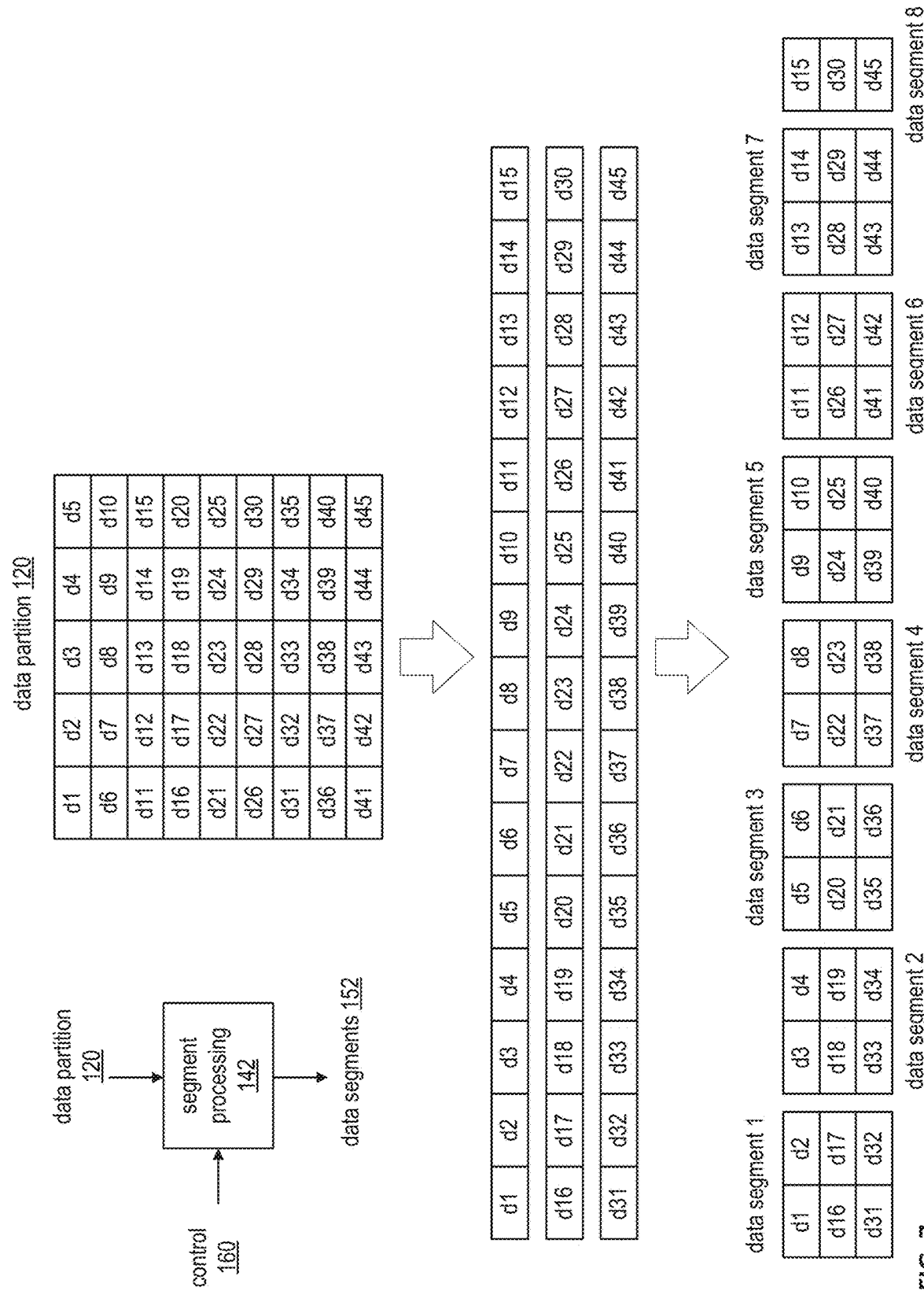
FIG. 7 is a diagram of an example of a segment processing of the dispersed error encoding in accordance with the present invention.

FIG. 7 is a diagram of an example of a segment processing of a dispersed storage (DS) error encoding module. In this example, a segment processing module 142 receives a data partition 120 that includes 45 data blocks (e.g., d1-d45), receives segmenting information (i.e., control information 160) from a control module, and segments the data partition 120 in accordance with the control information 160 to produce data segments 152. Each data block may be of the same size as other data blocks or of a different size. In addition, the size of each data block may be a few bytes to megabytes of data. As previously mentioned, the segmenting information indicates how many rows to segment the data partition into, indicates how many columns to segment the data partition into, and indicates how many columns to include in a data segment.

In this example, the decode threshold of the error encoding scheme is three; as such the number of rows to divide the data partition into is three. The number of columns for each row is set to 15, which is based on the number and size of data blocks. The data blocks of the data partition are arranged in rows and columns in a sequential order (i.e., the first row includes the first 15 data blocks; the second row includes the second 15 data blocks; and the third row includes the last 15 data blocks).

With the data blocks arranged into the desired sequential order, they are divided into data segments based on the segmenting information. In this example, the data partition is divided into 8 data segments; the first 7 include 2 columns of three rows and the last includes 1 column of three rows. Note that the first row of the 8 data segments is in sequential order of the first 15 data blocks; the second row of the 8 data segments in sequential order of the second 15 data blocks; and the third row of the 8 data segments in sequential order of the last 15 data blocks. Note that the number of data blocks, the grouping of the data blocks into segments, and size of the data blocks may vary to accommodate the desired distributed task processing function.

Figure 8:
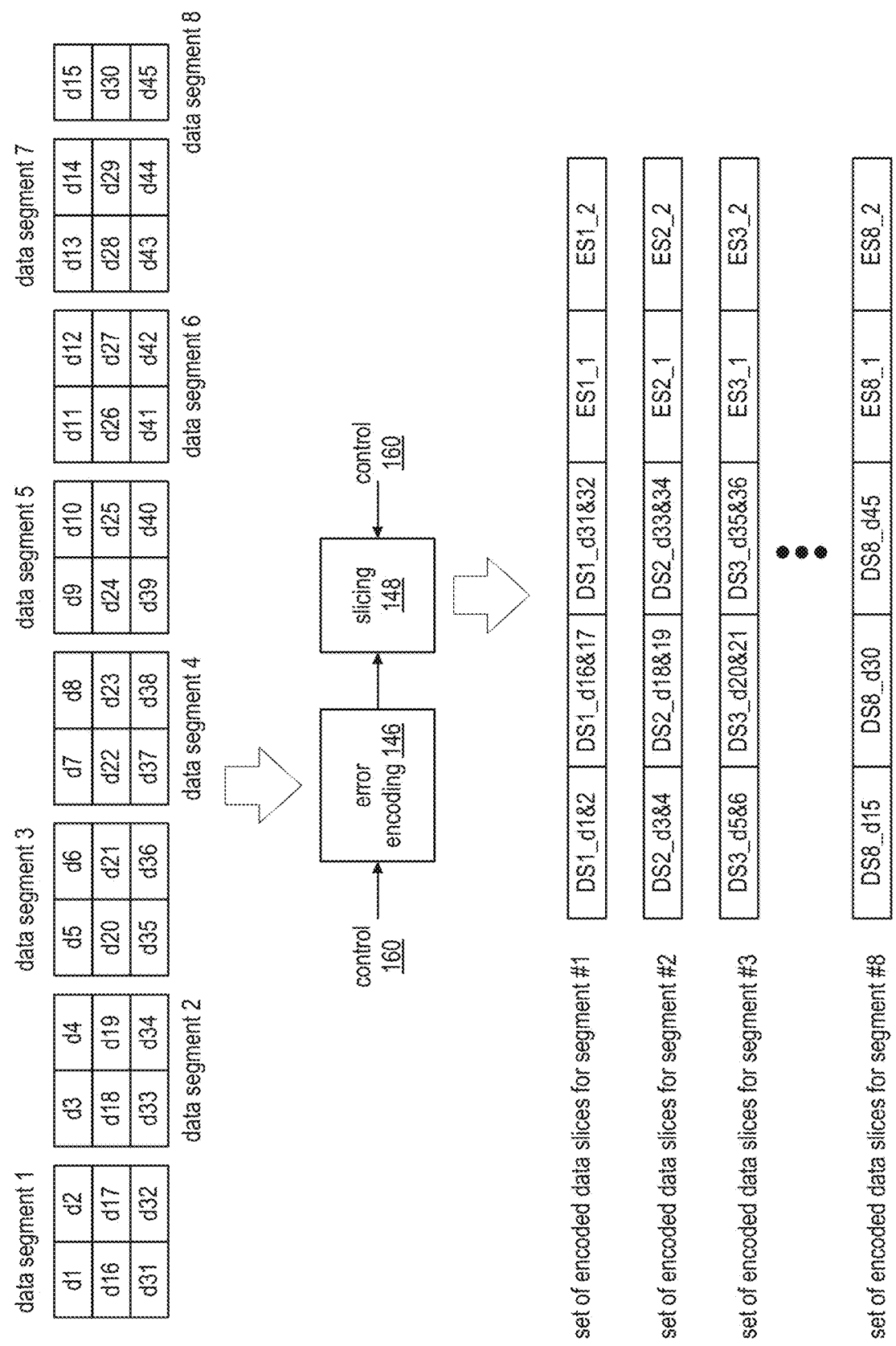
FIG. 8 is a diagram of an example of error encoding and slicing processing of the dispersed error encoding in accordance with the present invention.

FIG. 8 is a diagram of an example of error encoding and slicing processing of the dispersed error encoding processing the data segments of FIG. 7. In this example, data segment 1 includes 3 rows with each row being treated as one word for encoding. As such, data segment 1 includes three words for encoding: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

In operation, an error encoding module 146 and a slicing module 148 convert each data segment into a set of encoded data slices in accordance with error correction encoding parameters as control information 160. More specifically, when the error correction encoding parameters indicate a unity matrix Reed-Solomon based encoding algorithm, 5 pillars, and decode threshold of 3, the first three encoded data slices of the set of encoded data slices for a data segment are substantially similar to the corresponding word of the data segment. For instance, when the unity matrix Reed-Solomon based encoding algorithm is applied to data segment 1, the content of the first encoded data slice (DS1_d1&2) of the first set of encoded data slices (e.g., corresponding to data segment 1) is substantially similar to content of the first word (e.g., d1 & d2); the content of the second encoded data slice (DS1_d16&17) of the first set of encoded data slices is substantially similar to content of the second word (e.g., d16 & d17); and the content of the third encoded data slice (DS1_d31&32) of the first set of encoded data slices is substantially similar to content of the third word (e.g., d31 & d32).

The content of the fourth and fifth encoded data slices (e.g., ES1_1 and ES1_2) of the first set of encoded data slices include error correction data based on the first—third words of the first data segment. With such an encoding and slicing scheme, retrieving any three of the five encoded data slices allows the data segment to be accurately reconstructed.

The encoding and slices of data segments 2-7 yield sets of encoded data slices similar to the set of encoded data slices of data segment 1. For instance, the content of the first encoded data slice (DS2_d3&4) of the second set of encoded data slices (e.g., corresponding to data segment 2) is substantially similar to content of the first word (e.g., d3 & d4); the content of the second encoded data slice (DS2_d18&19) of the second set of encoded data slices is substantially similar to content of the second word (e.g., d18 & d19); and the content of the third encoded data slice (DS2_d33&34) of the second set of encoded data slices is substantially similar to content of the third word (e.g., d33 & d34). The content of the fourth and fifth encoded data slices (e.g., ES1_1 and ES1_2) of the second set of encoded data slices includes error correction data based on the first—third words of the second data segment.

Figure 9:
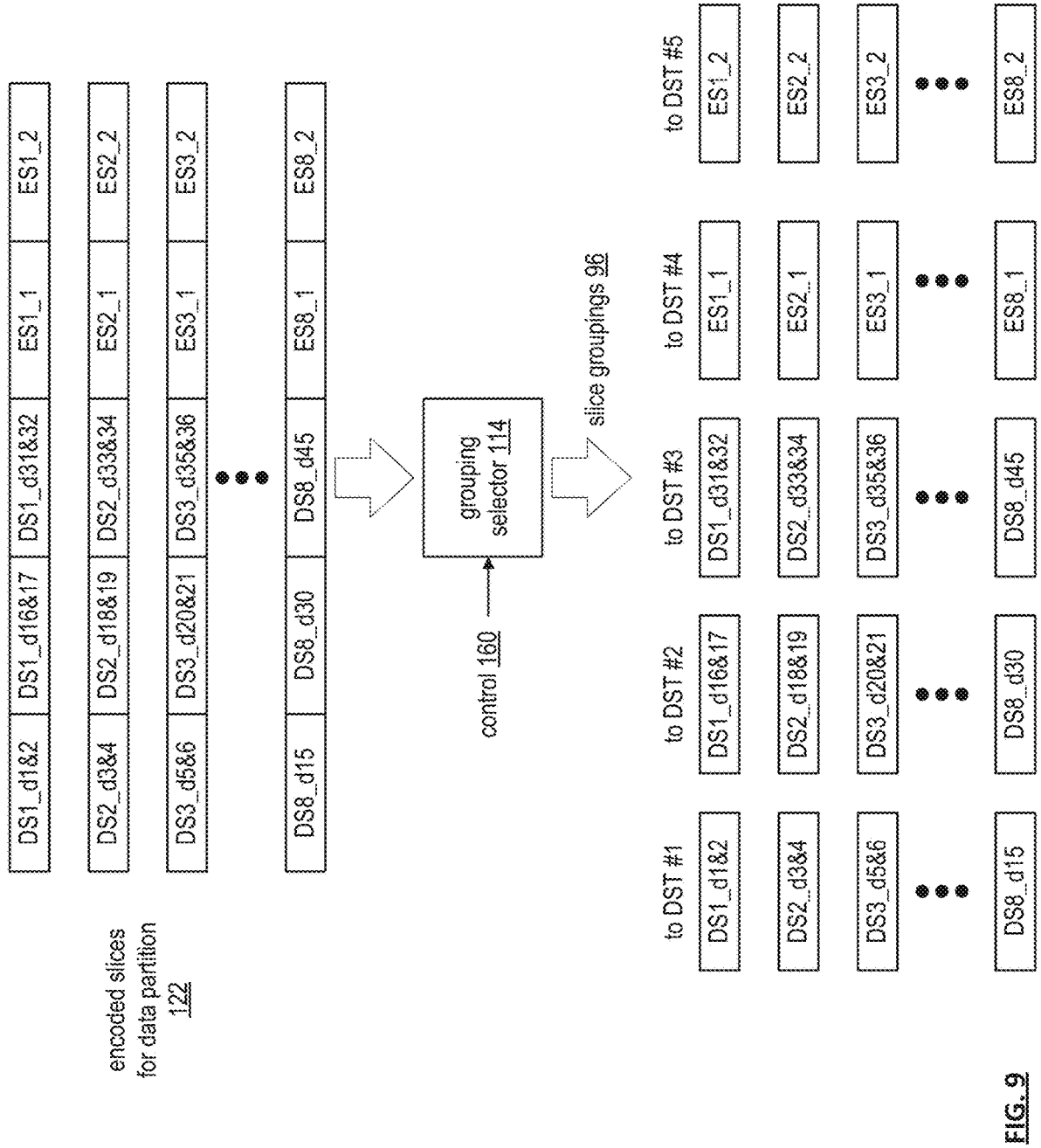
FIG. 9 is a diagram of an example of grouping selection processing of the outbound DST processing in accordance with the present invention.

FIG. 9 is a diagram of an example of grouping selection processing of an outbound distributed storage and task (DST) processing in accordance with grouping selector information as control information 160 from a control module. Encoded slices for data partition 122 are grouped in accordance with the control information 160 to produce slice groupings 96. In this example, a grouping selection module 114 organizes the encoded data slices into five slice groupings (e.g., one for each DST execution unit of a distributed storage and task network (DSTN) module). As a specific example, the grouping selection module 114 creates a first slice grouping for a DST execution unit #1, which includes first encoded slices of each of the sets of encoded slices. As such, the first DST execution unit receives encoded data slices corresponding to data blocks 1-15 (e.g., encoded data slices of contiguous data). The grouping selection module 114 also creates a second slice grouping for a DST execution unit #2, which includes second encoded slices of each of the sets of encoded slices. As such, the second DST execution unit receives encoded data slices corresponding to data blocks 16-30. The grouping selection module 114 further creates a third slice grouping for DST execution unit #3, which includes third encoded slices of each of the sets of encoded slices. As such, the third DST execution unit receives encoded data slices corresponding to data blocks 31-45. The grouping selection module 114 creates a fourth slice grouping for DST execution unit #4, which includes fourth encoded slices of each of the sets of encoded slices. As such, the fourth DST execution unit receives encoded data slices corresponding to first error encoding information (e.g., encoded data slices of error coding (EC) data). The grouping selection module 114 further creates a fifth slice grouping for DST execution unit #5, which includes fifth encoded slices of each of the sets of encoded slices. As such, the fifth DST execution unit receives encoded data slices corresponding to second error encoding information.

Figure 10:
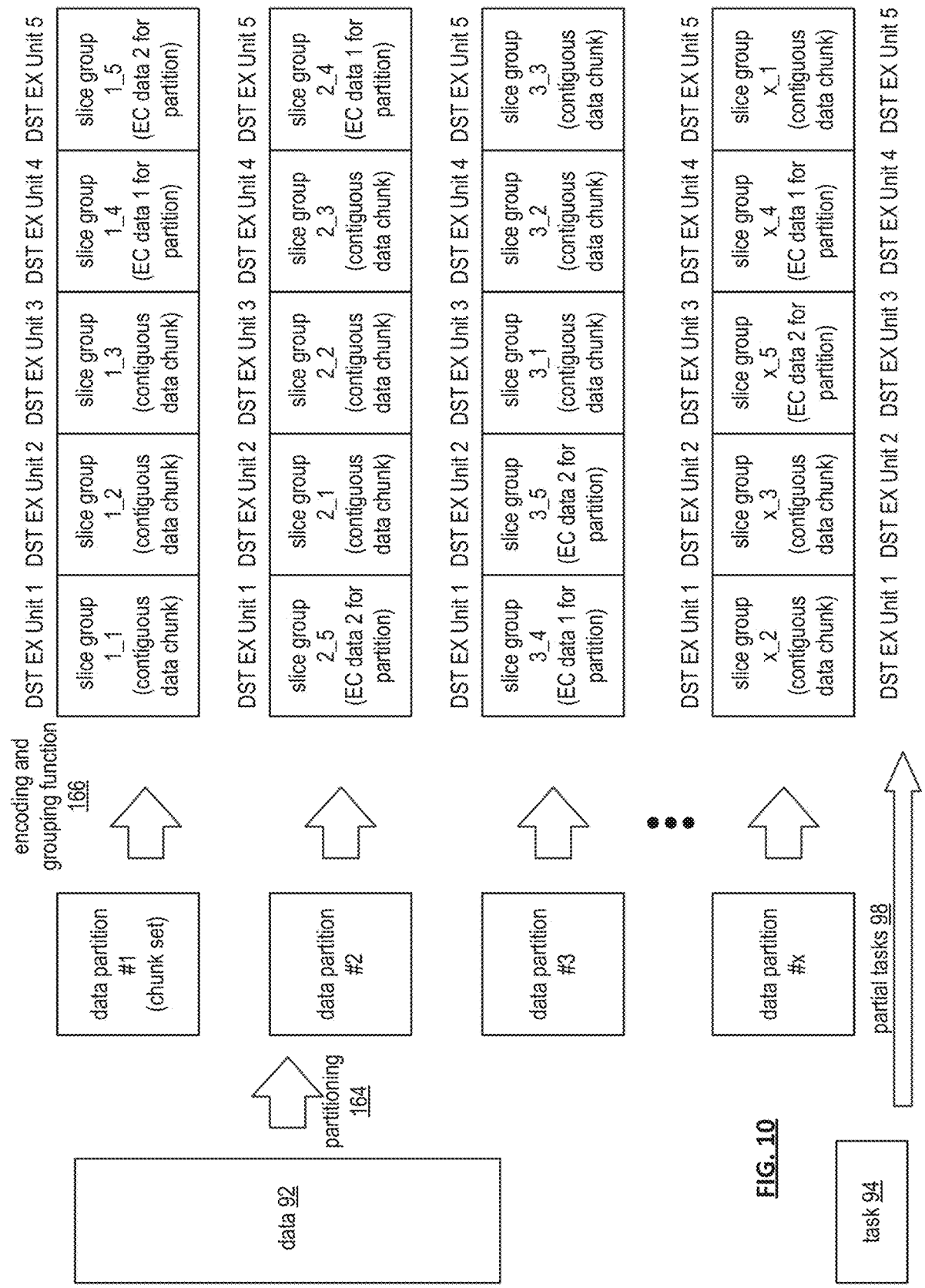
FIG. 10 is a diagram of an example of converting data into slice groups in accordance with the present invention.

FIG. 10 is a diagram of an example of converting data 92 into slice groups that expands on the preceding figures. As shown, the data 92 is partitioned in accordance with a partitioning function 164 into a plurality of data partitions (1-x, where x is an integer greater than 4). Each data partition (or chunk set of data) is encoded and grouped into slice groupings as previously discussed by an encoding and grouping function 166. For a given data partition, the slice groupings are sent to distributed storage and task (DST) execution units. From data partition to data partition, the ordering of the slice groupings to the DST execution units may vary.

For example, the slice groupings of data partition #1 is sent to the DST execution units such that the first DST execution receives first encoded data slices of each of the sets of encoded data slices, which corresponds to a first continuous data chunk of the first data partition (e.g., refer to FIG. 9), a second DST execution receives second encoded data slices of each of the sets of encoded data slices, which corresponds to a second continuous data chunk of the first data partition, etc.

For the second data partition, the slice groupings may be sent to the DST execution units in a different order than it was done for the first data partition. For instance, the first slice grouping of the second data partition (e.g., slice group 2_1) is sent to the second DST execution unit; the second slice grouping of the second data partition (e.g., slice group 2_2) is sent to the third DST execution unit; the third slice grouping of the second data partition (e.g., slice group 2_3) is sent to the fourth DST execution unit; the fourth slice grouping of the second data partition (e.g., slice group 2_4, which includes first error coding information) is sent to the fifth DST execution unit; and the fifth slice grouping of the second data partition (e.g., slice group 2_5, which includes second error coding information) is sent to the first DST execution unit.

The pattern of sending the slice groupings to the set of DST execution units may vary in a predicted pattern, a random pattern, and/or a combination thereof from data partition to data partition. In addition, from data partition to data partition, the set of DST execution units may change. For example, for the first data partition, DST execution units 1-5 may be used; for the second data partition, DST execution units 6-10 may be used; for the third data partition, DST execution units 3-7 may be used; etc. As is also shown, the task is divided into partial tasks that are sent to the DST execution units in conjunction with the slice groupings of the data partitions.

Figure 11:
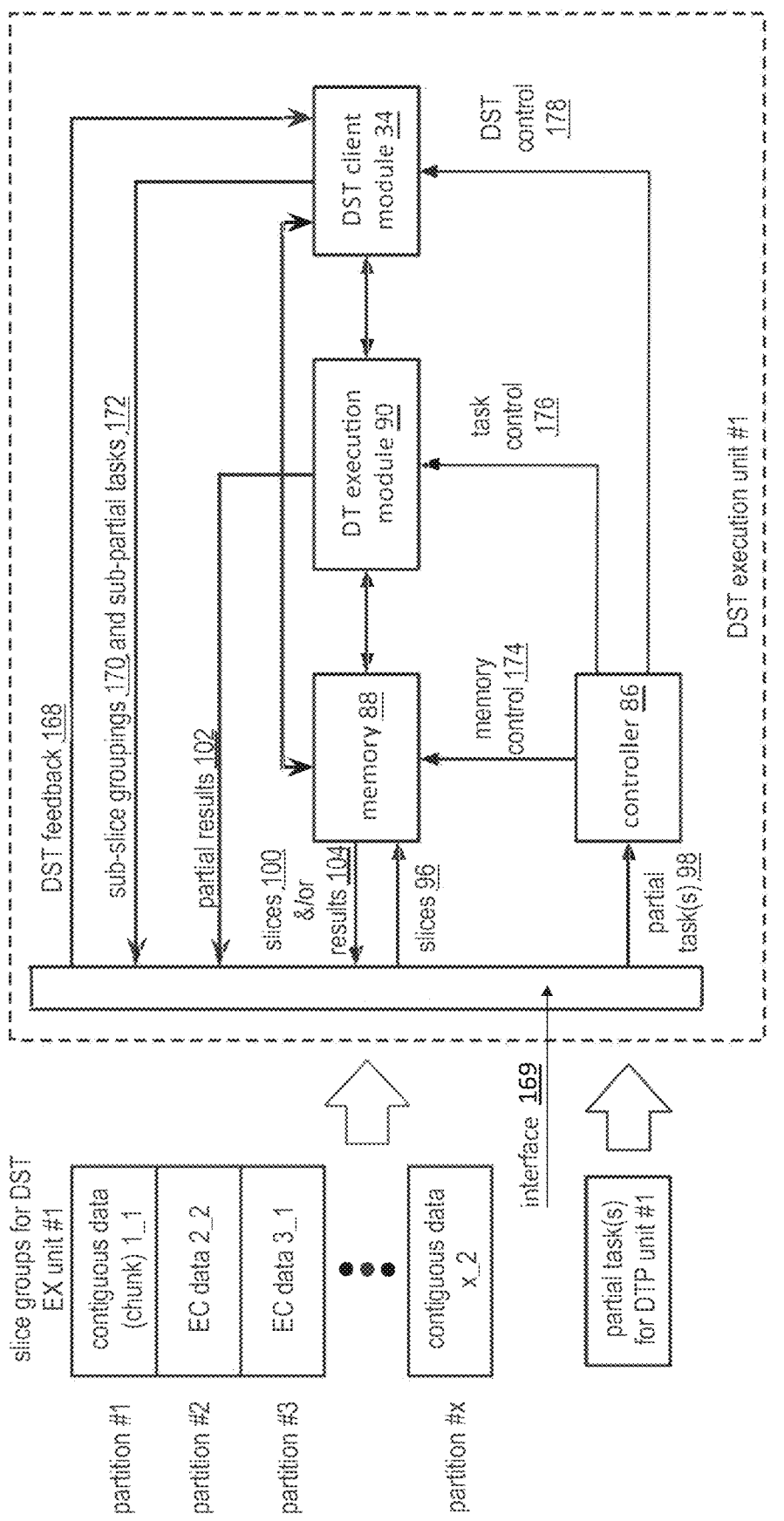
FIG. 11 is a schematic block diagram of an embodiment of a DST execution unit in accordance with the present invention.

FIG. 11 is a schematic block diagram of an embodiment of a DST (distributed storage and/or task) execution unit that includes an interface 169, a controller 86, memory 88, one or more DT (distributed task) execution modules 90, and a DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a slice group, the DST execution module receives a slice grouping 96 (e.g., slice group #1) via interface 169. The slice grouping 96 includes, per partition, encoded data slices of contiguous data or encoded data slices of error coding (EC) data. For slice group #1, the DST execution module receives encoded data slices of contiguous data for partitions #1 and #x (and potentially others between 3 and x) and receives encoded data slices of EC data for partitions #2 and #3 (and potentially others between 3 and x). Examples of encoded data slices of contiguous data and encoded data slices of error coding (EC) data are discussed with reference to FIG. 9. The memory 88 stores the encoded data slices of slice groupings 96 in accordance with memory control information 174 it receives from the controller 86.

The controller 86 (e.g., a processing module, a CPU, etc.) generates the memory control information 174 based on a partial task(s) 98 and distributed computing information (e.g., user information (e.g., user ID, distributed computing permissions, data access permission, etc.), vault information (e.g., virtual memory assigned to user, user group, temporary storage for task processing, etc.), task validation information, etc.). For example, the controller 86 interprets the partial task(s) 98 in light of the distributed computing information to determine whether a requestor is authorized to perform the task 98, is authorized to access the data, and/or is authorized to perform the task on this particular data. When the requestor is authorized, the controller 86 determines, based on the task 98 and/or another input, whether the encoded data slices of the slice grouping 96 are to be temporarily stored or permanently stored. Based on the foregoing, the controller 86 generates the memory control information 174 to write the encoded data slices of the slice grouping 96 into the memory 88 and to indicate whether the slice grouping 96 is permanently stored or temporarily stored.

With the slice grouping 96 stored in the memory 88, the controller 86 facilitates execution of the partial task(s) 98. In an example, the controller 86 interprets the partial task 98 in light of the capabilities of the DT execution module(s) 90. The capabilities include one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, etc. If the controller 86 determines that the DT execution module(s) 90 have sufficient capabilities, it generates task control information 176.

The task control information 176 may be a generic instruction (e.g., perform the task on the stored slice grouping) or a series of operational codes. In the former instance, the DT execution module 90 includes a co-processor function specifically configured (fixed or programmed) to perform the desired task 98. In the latter instance, the DT execution module 90 includes a general processor topology where the controller stores an algorithm corresponding to the particular task 98. In this instance, the controller 86 provides the operational codes (e.g., assembly language, source code of a programming language, object code, etc.) of the algorithm to the DT execution module 90 for execution.

Depending on the nature of the task 98, the DT execution module 90 may generate intermediate partial results 102 that are stored in the memory 88 or in a cache memory (not shown) within the DT execution module 90. In either case, when the DT execution module 90 completes execution of the partial task 98, it outputs one or more partial results 102. The partial results 102 may also be stored in memory 88.

If, when the controller 86 is interpreting whether capabilities of the DT execution module(s) 90 can support the partial task 98, the controller 86 determines that the DT execution module(s) 90 cannot adequately support the task 98 (e.g., does not have the right resources, does not have sufficient available resources, available resources would be too slow, etc.), it then determines whether the partial task 98 should be fully offloaded or partially offloaded.

If the controller 86 determines that the partial task 98 should be fully offloaded, it generates DST control information 178 and provides it to the DST client module 34. The DST control information 178 includes the partial task 98, memory storage information regarding the slice grouping 96, and distribution instructions. The distribution instructions instruct the DST client module 34 to divide the partial task 98 into sub-partial tasks 172, to divide the slice grouping 96 into sub-slice groupings 170, and identify other DST execution units. The DST client module 34 functions in a similar manner as the DST client module 34 of FIGS. 3-10 to produce the sub-partial tasks 172 and the sub-slice groupings 170 in accordance with the distribution instructions.

The DST client module 34 receives DST feedback 168 (e.g., sub-partial results), via the interface 169, from the DST execution units to which the task was offloaded. The DST client module 34 provides the sub-partial results to the DST execution unit, which processes the sub-partial results to produce the partial result(s) 102.

If the controller 86 determines that the partial task 98 should be partially offloaded, it determines what portion of the task 98 and/or slice grouping 96 should be processed locally and what should be offloaded. For the portion that is being locally processed, the controller 86 generates task control information 176 as previously discussed. For the portion that is being offloaded, the controller 86 generates DST control information 178 as previously discussed.

When the DST client module 34 receives DST feedback 168 (e.g., sub-partial results) from the DST executions units to which a portion of the task was offloaded, it provides the sub-partial results to the DT execution module 90. The DT execution module 90 processes the sub-partial results with the sub-partial results it created to produce the partial result(s) 102.

The memory 88 may be further utilized to retrieve one or more of stored slices 100, stored results 104, partial results 102 when the DT execution module 90 stores partial results 102 and/or results 104 in the memory 88. For example, when the partial task 98 includes a retrieval request, the controller 86 outputs the memory control 174 to the memory 88 to facilitate retrieval of slices 100 and/or results 104.

Figure 12:
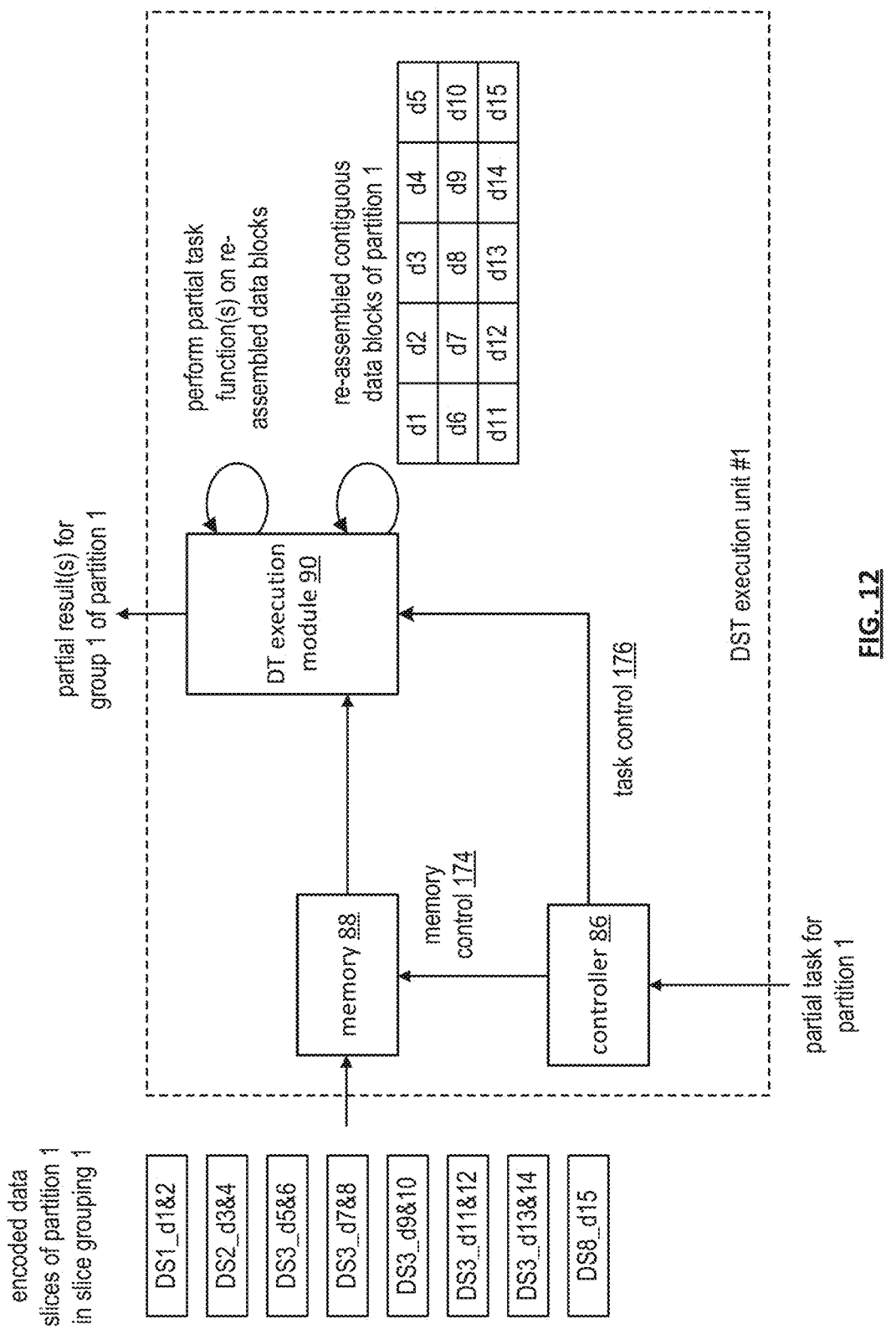
FIG. 12 is a schematic block diagram of an example of operation of a DST execution unit in accordance with the present invention.

FIG. 12 is a schematic block diagram of an example of operation of a distributed storage and task (DST) execution unit storing encoded data slices and executing a task thereon. To store the encoded data slices of a partition 1 of slice grouping 1, a controller 86 generates write commands as memory control information 174 such that the encoded slices are stored in desired locations (e.g., permanent or temporary) within memory 88.

Once the encoded slices are stored, the controller 86 provides task control information 176 to a distributed task (DT) execution module 90. As a first step of executing the task in accordance with the task control information 176, the DT execution module 90 retrieves the encoded slices from memory 88. The DT execution module 90 then reconstructs contiguous data blocks of a data partition. As shown for this example, reconstructed contiguous data blocks of data partition 1 include data blocks 1-15 (e.g., d1-d15).

With the contiguous data blocks reconstructed, the DT execution module 90 performs the task on the reconstructed contiguous data blocks. For example, the task may be to search the reconstructed contiguous data blocks for a particular word or phrase, identify where in the reconstructed contiguous data blocks the particular word or phrase occurred, and/or count the occurrences of the particular word or phrase on the reconstructed contiguous data blocks. The DST execution unit continues in a similar manner for the encoded data slices of other partitions in slice grouping 1. Note that with using the unity matrix error encoding scheme previously discussed, if the encoded data slices of contiguous data are uncorrupted, the decoding of them is a relatively straightforward process of extracting the data.

If, however, an encoded data slice of contiguous data is corrupted (or missing), it can be rebuilt by accessing other DST execution units that are storing the other encoded data slices of the set of encoded data slices of the corrupted encoded data slice. In this instance, the DST execution unit having the corrupted encoded data slices retrieves at least three encoded data slices (of contiguous data and of error coding data) in the set from the other DST execution units (recall for this example, the pillar width is 5 and the decode threshold is 3). The DST execution unit decodes the retrieved data slices using the DS error encoding parameters to recapture the corresponding data segment. The DST execution unit then re-encodes the data segment using the DS error encoding parameters to rebuild the corrupted encoded data slice. Once the encoded data slice is rebuilt, the DST execution unit functions as previously described.

Figure 13:
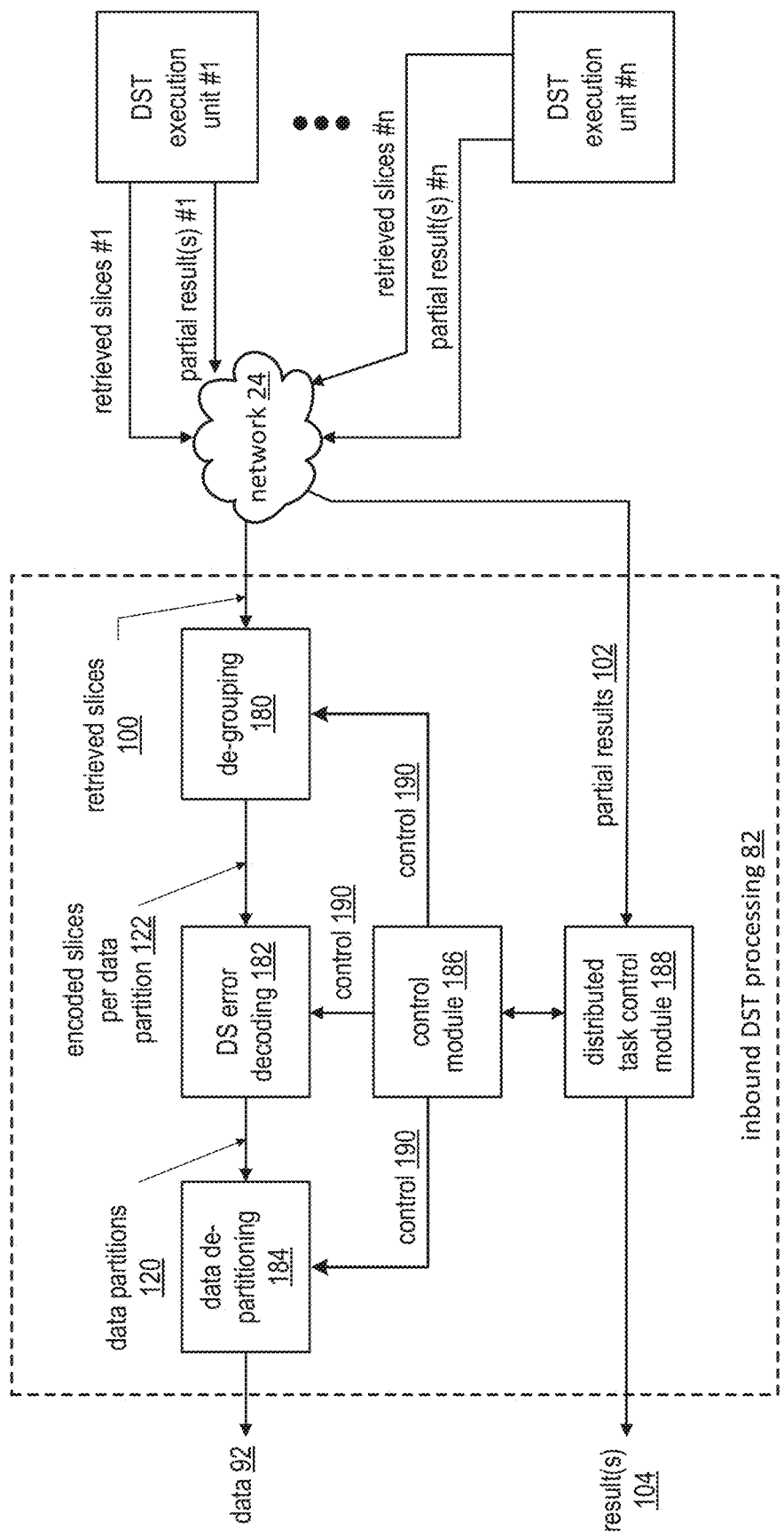
FIG. 13 is a schematic block diagram of an embodiment of an inbound distributed storage and/or task (DST) processing in accordance with the present invention.

FIG. 13 is a schematic block diagram of an embodiment of an inbound distributed storage and/or task (DST) processing section 82 of a DST client module coupled to DST execution units of a distributed storage and task network (DSTN) module via a network 24. The inbound DST processing section 82 includes a de-grouping module 180, a DS (dispersed storage) error decoding module 182, a data de-partitioning module 184, a control module 186, and a distributed task control module 188. Note that the control module 186 and/or the distributed task control module 188 may be separate modules from corresponding ones of outbound DST processing section or may be the same modules.

In an example of operation, the DST execution units have completed execution of corresponding partial tasks on the corresponding slice groupings to produce partial results 102. The inbound DST processing section 82 receives the partial results 102 via the distributed task control module 188. The inbound DST processing section 82 then processes the partial results 102 to produce a final result, or results 104. For example, if the task was to find a specific word or phrase within data, the partial results 102 indicate where in each of the prescribed portions of the data the corresponding DST execution units found the specific word or phrase. The distributed task control module 188 combines the individual partial results 102 for the corresponding portions of the data into a final result 104 for the data as a whole.

In another example of operation, the inbound DST processing section 82 is retrieving stored data from the DST execution units (i.e., the DSTN module). In this example, the DST execution units output encoded data slices 100 corresponding to the data retrieval requests. The de-grouping module 180 receives retrieved slices 100 and de-groups them to produce encoded data slices per data partition 122. The DS error decoding module 182 decodes, in accordance with DS error encoding parameters, the encoded data slices per data partition 122 to produce data partitions 120.

The data de-partitioning module 184 combines the data partitions 120 into the data 92. The control module 186 controls the conversion of retrieved slices 100 into the data 92 using control signals 190 to each of the modules. For instance, the control module 186 provides de-grouping information to the de-grouping module 180, provides the DS error encoding parameters to the DS error decoding module 182, and provides de-partitioning information to the data de-partitioning module 184.

Figure 14:
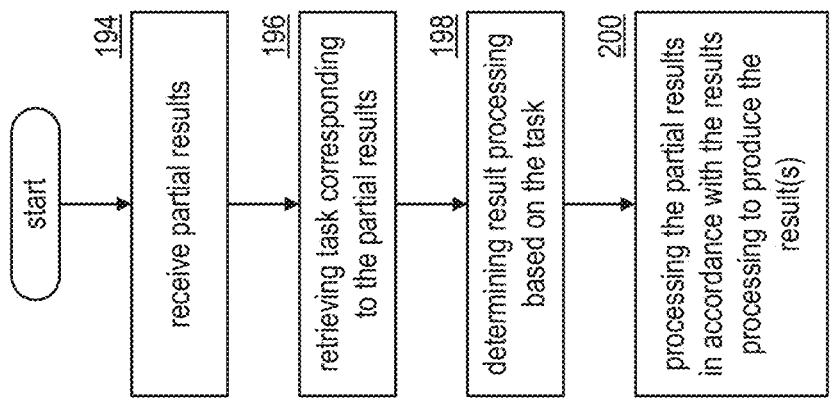
FIG. 14 is a logic diagram of an example of a method for inbound DST processing in accordance with the present invention.

FIG. 14 is a logic diagram of an example of a method that is executable by distributed storage and task (DST) client module regarding inbound DST processing. The method begins at step 194 where the DST client module receives partial results. The method continues at step 196 where the DST client module retrieves the task corresponding to the partial results. For example, the partial results include header information that identifies the requesting entity, which correlates to the requested task.

The method continues at step 198 where the DST client module determines result processing information based on the task. For example, if the task were to identify a particular word or phrase within the data, the result processing information would indicate to aggregate the partial results for the corresponding portions of the data to produce the final result. As another example, if the task were to count the occurrences of a particular word or phrase within the data, results of processing the information would indicate to add the partial results to produce the final results. The method continues at step 200 where the DST client module processes the partial results in accordance with the result processing information to produce the final result or results.

Figure 15:
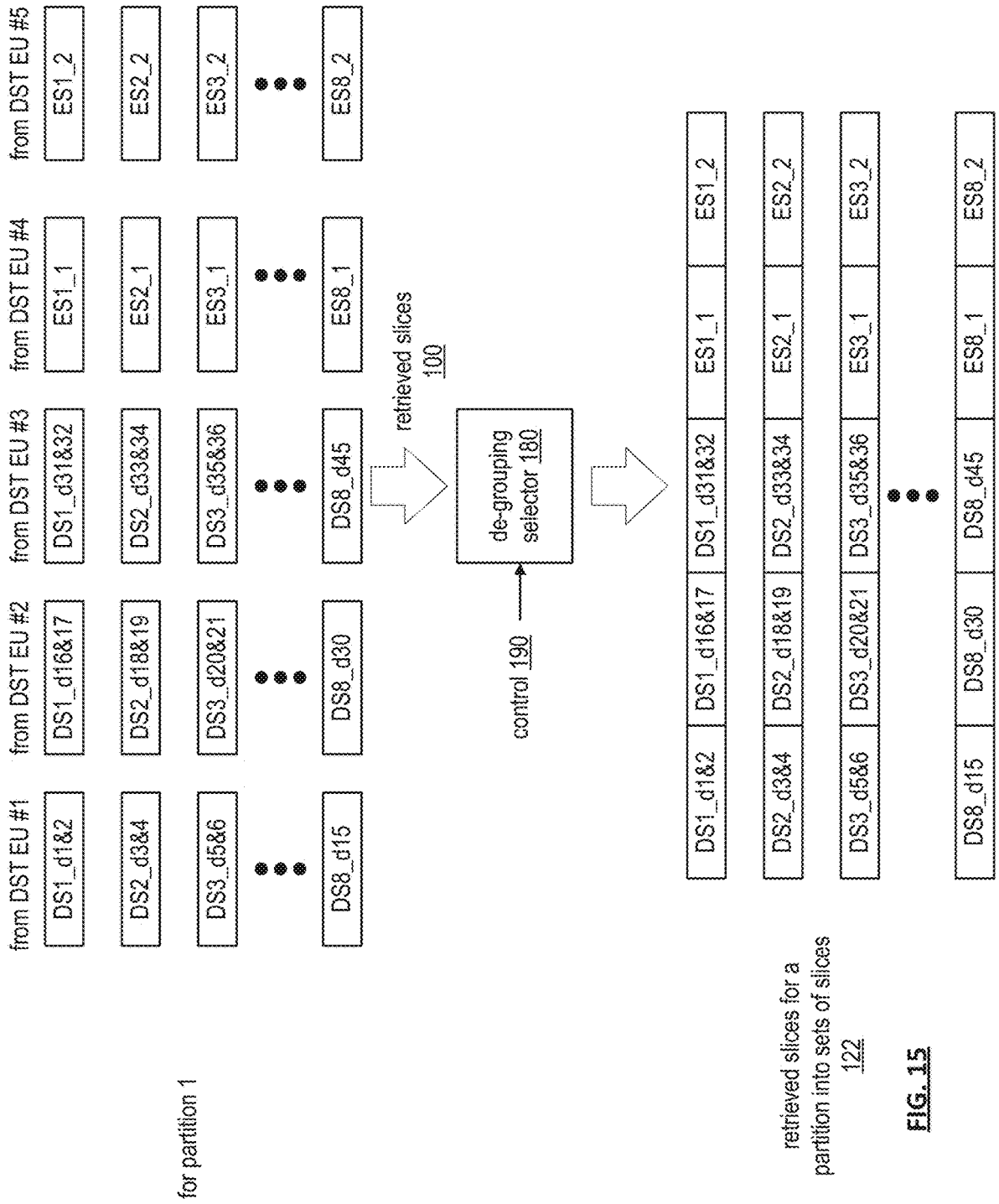
FIG. 15 is a diagram of an example of de-grouping selection processing of the inbound DST processing in accordance with the present invention.

FIG. 15 is a diagram of an example of de-grouping selection processing of an inbound distributed storage and task (DST) processing section of a DST client module. In general, this is an inverse process of the grouping module of the outbound DST processing section of FIG. 9. Accordingly, for each data partition (e.g., partition #1), the de-grouping module retrieves the corresponding slice grouping from the DST execution units (EU) (e.g., DST 1-5).

As shown, DST execution unit #1 provides a first slice grouping, which includes the first encoded slices of each of the sets of encoded slices (e.g., encoded data slices of contiguous data of data blocks 1-15); DST execution unit #2 provides a second slice grouping, which includes the second encoded slices of each of the sets of encoded slices (e.g., encoded data slices of contiguous data of data blocks 16-30); DST execution unit #3 provides a third slice grouping, which includes the third encoded slices of each of the sets of encoded slices (e.g., encoded data slices of contiguous data of data blocks 31-45); DST execution unit #4 provides a fourth slice grouping, which includes the fourth encoded slices of each of the sets of encoded slices (e.g., first encoded data slices of error coding (EC) data); and DST execution unit #5 provides a fifth slice grouping, which includes the fifth encoded slices of each of the sets of encoded slices (e.g., first encoded data slices of error coding (EC) data).

The de-grouping module de-groups the slice groupings (e.g., received slices 100) using a de-grouping selector 180 controlled by a control signal 190 as shown in the example to produce a plurality of sets of encoded data slices (e.g., retrieved slices for a partition into sets of slices 122). Each set corresponding to a data segment of the data partition.

Figure 16:
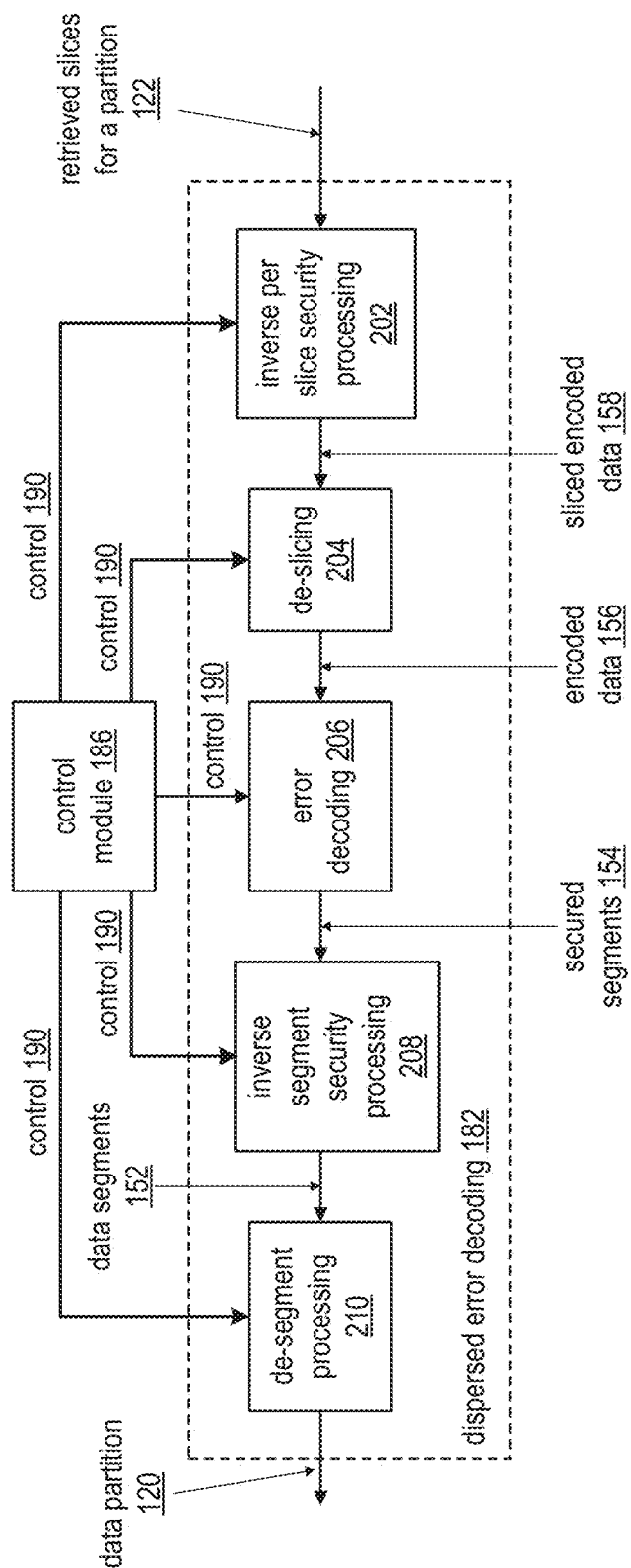
FIG. 16 is a schematic block diagram of an embodiment of a dispersed error decoding in accordance with the present invention.

FIG. 16 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, a de-segmenting processing module 210, and a control module 186.

In an example of operation, the inverse per slice security processing module 202, when enabled by the control module 186, unsecures each encoded data slice 122 based on slice de-security information received as control information 190 (e.g., the compliment of the slice security information discussed with reference to FIG. 6) received from the control module 186. The slice security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 122, it decrypts each verified encoded data slice, and decompresses each decrypted encoded data slice to produce slice encoded data 158. When the inverse per slice security processing module 202 is not enabled, it passes the encoded data slices 122 as the sliced encoded data 158 or is bypassed such that the retrieved encoded data slices 122 are provided as the sliced encoded data 158.

The de-slicing module 204 de-slices the sliced encoded data 158 into encoded data segments 156 in accordance with a pillar width of the error correction encoding parameters received as control information 190 from the control module 186. For example, if the pillar width is five, the de-slicing module 204 de-slices a set of five encoded data slices into an encoded data segment 156. The error decoding module 206 decodes the encoded data segments 156 in accordance with error correction decoding parameters received as control information 190 from the control module 186 to produce secure data segments 154. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments 154 based on segment security information received as control information 190 from the control module 186. The segment security information includes data decompression, decryption, de-watermarking, integrity check (e.g., CRC, etc.) verification, and/or any other type of digital security. For example, when the inverse segment security processing module 208 is enabled, it verifies integrity information (e.g., a CRC value) of each secure data segment 154, it decrypts each verified secured data segment, and decompresses each decrypted secure data segment to produce a data segment 152. When the inverse segment security processing module 208 is not enabled, it passes the decoded data segment 154 as the data segment 152 or is bypassed.

The de-segment processing module 210 receives the data segments 152 and receives de-segmenting information as control information 190 from the control module 186. The de-segmenting information indicates how the de-segment processing module 210 is to de-segment the data segments 152 into a data partition 120. For example, the de-segmenting information indicates how the rows and columns of data segments are to be rearranged to yield the data partition 120.

Figure 17:
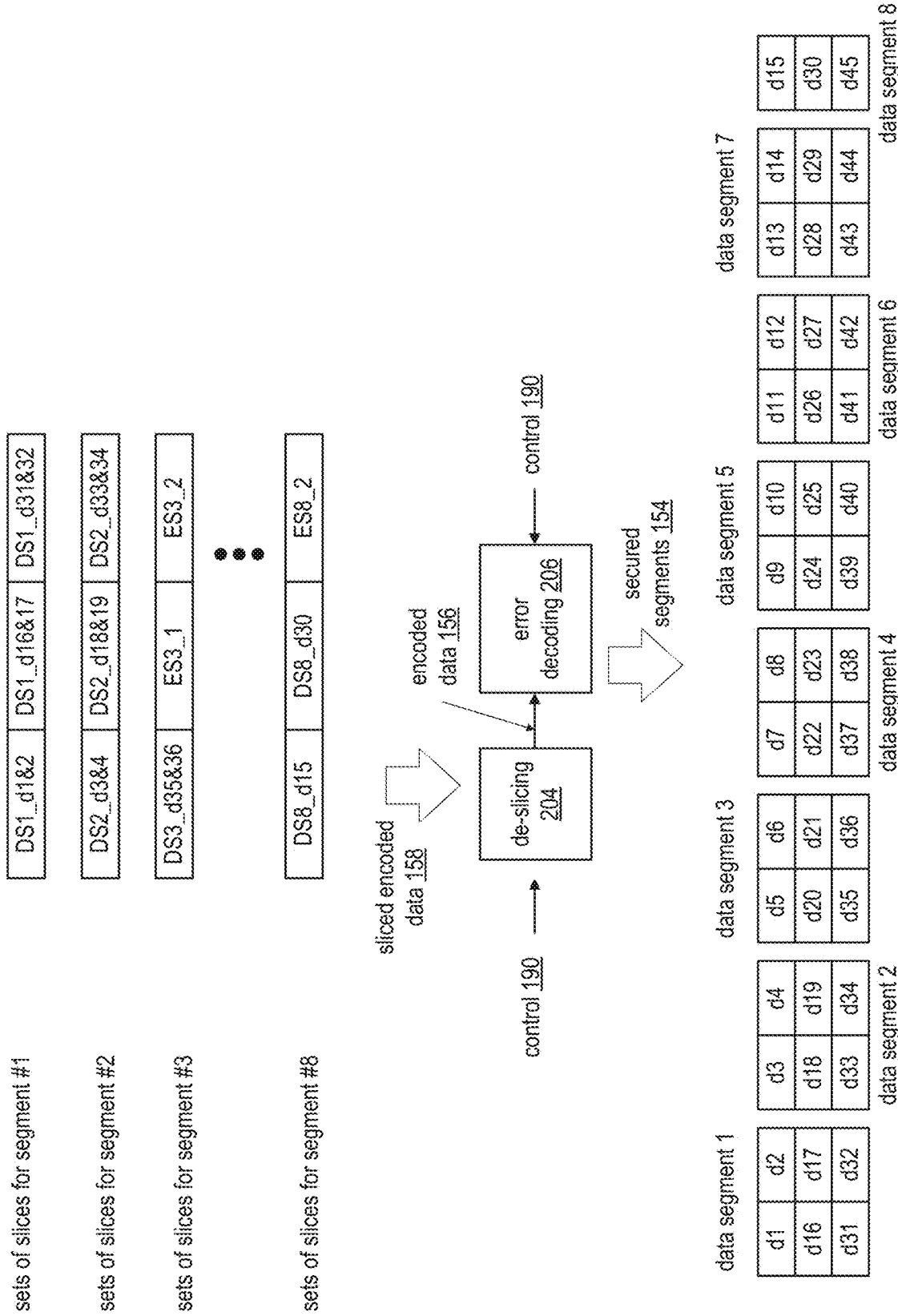
FIG. 17 is a diagram of an example of de-slicing and error decoding processing of the dispersed error decoding in accordance with the present invention.

FIG. 17 is a diagram of an example of de-slicing and error decoding processing of a dispersed error decoding module. A de-slicing module 204 receives at least a decode threshold number of encoded data slices 158 for each data segment in accordance with control information 190 and provides encoded data 156. In this example, a decode threshold is three. As such, each set of encoded data slices 158 is shown to have three encoded data slices per data segment. The de-slicing module 204 may receive three encoded data slices per data segment because an associated distributed storage and task (DST) client module requested retrieving only three encoded data slices per segment or selected three of the retrieved encoded data slices per data segment. As shown, which is based on the unity matrix encoding previously discussed with reference to FIG. 8, an encoded data slice may be a data-based encoded data slice (e.g., DS1_d1&d2) or an error code based encoded data slice (e.g., ES3_1).

An error decoding module 206 decodes the encoded data 156 of each data segment in accordance with the error correction decoding parameters of control information 190 to produce secured segments 154. In this example, data segment 1 includes 3 rows with each row being treated as one word for encoding. As such, data segment 1 includes three words: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

Figure 18:
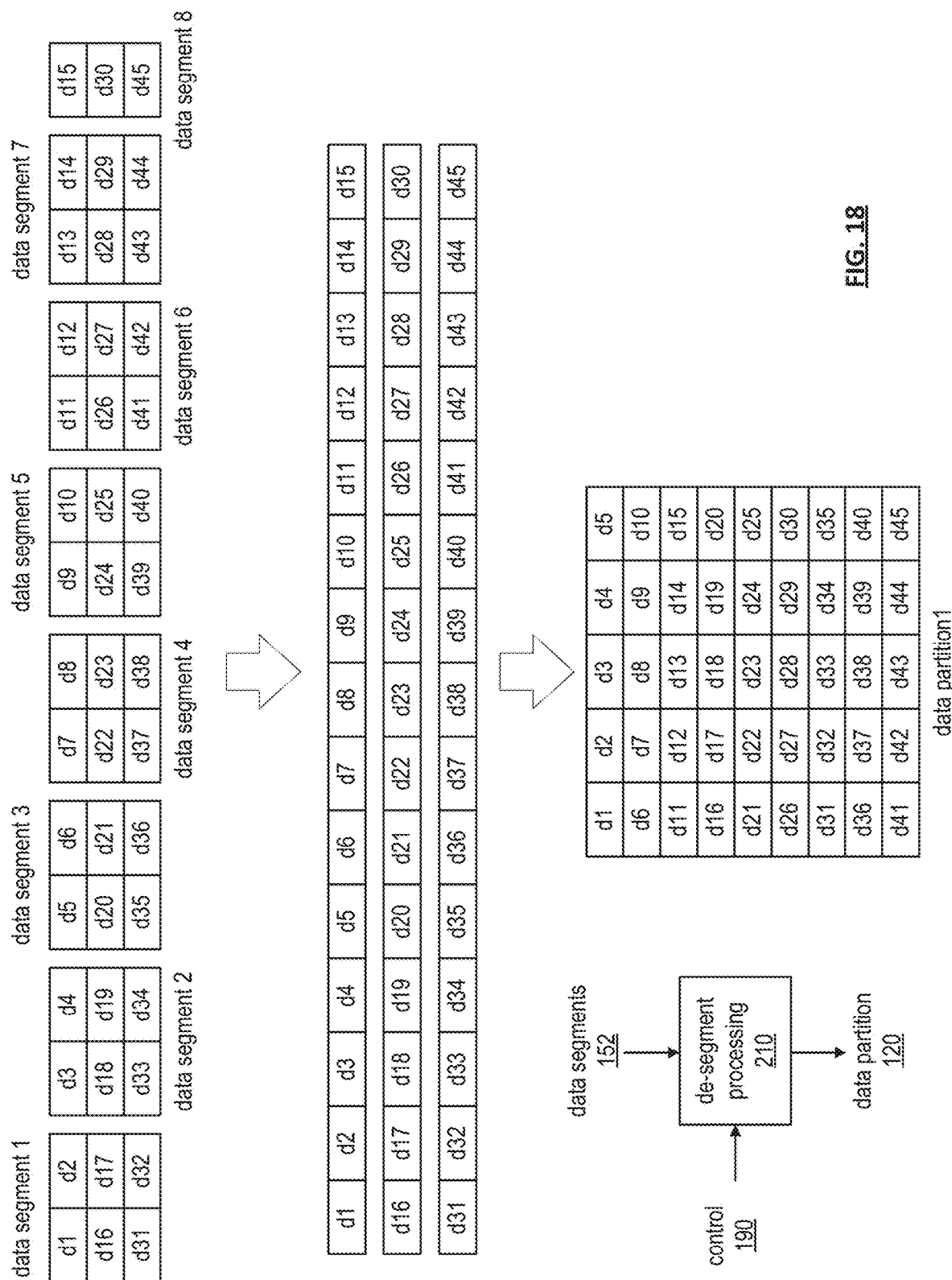
FIG. 18 is a diagram of an example of de-segment processing of the dispersed error decoding in accordance with the present invention.

FIG. 18 is a diagram of an example of de-segment processing of an inbound distributed storage and task (DST) processing. In this example, a de-segment processing module 210 receives data segments 152 (e.g., 1-8) and rearranges the data blocks of the data segments into rows and columns in accordance with de-segmenting information of control information 190 to produce a data partition 120. Note that the number of rows is based on the decode threshold (e.g., 3 in this specific example) and the number of columns is based on the number and size of the data blocks.

The de-segmenting module 210 converts the rows and columns of data blocks into the data partition 120. Note that each data block may be of the same size as other data blocks or of a different size. In addition, the size of each data block may be a few bytes to megabytes of data.

Figure 19:
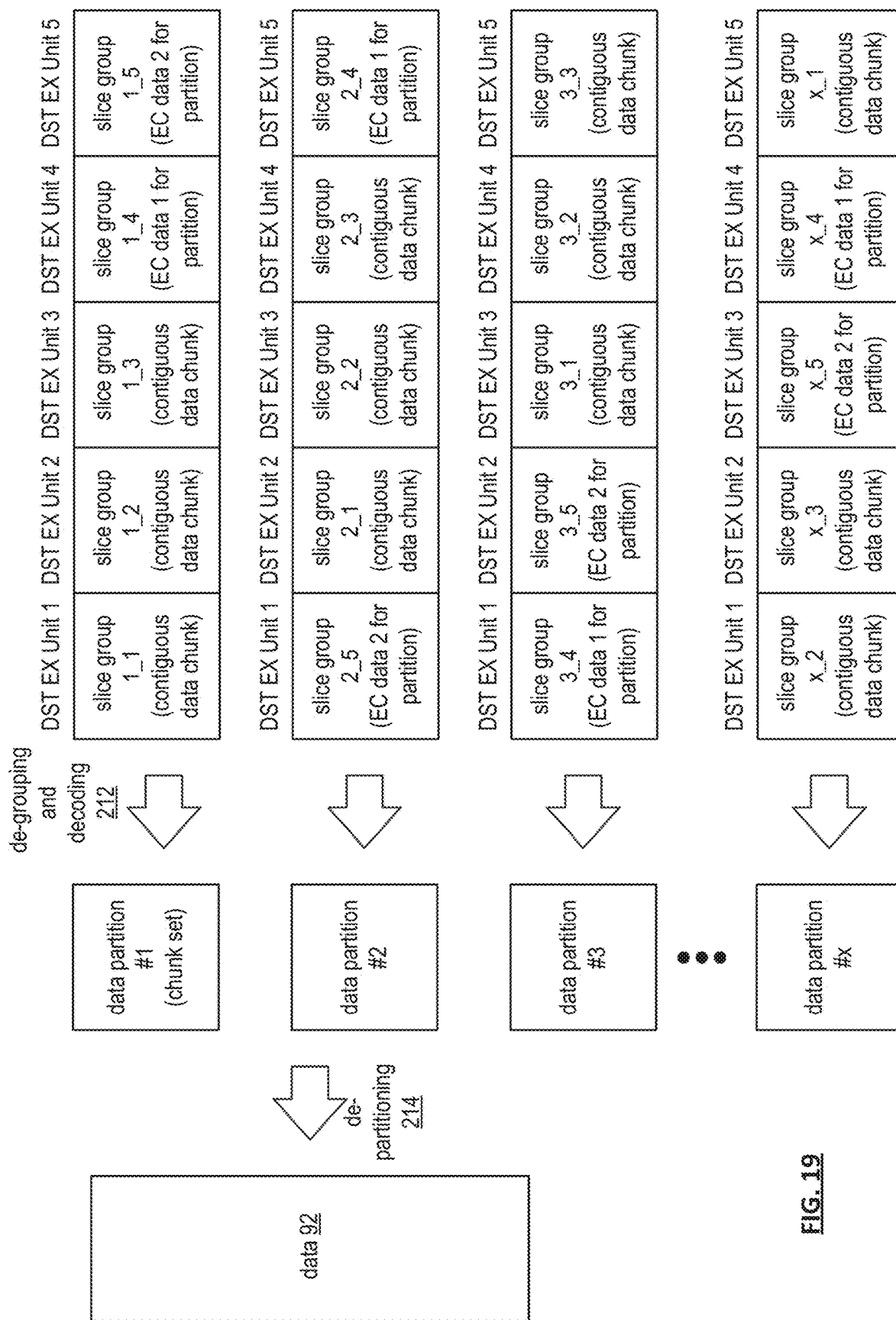
FIG. 19 is a diagram of an example of converting slice groups into data in accordance with the present invention.

FIG. 19 is a diagram of an example of converting slice groups into data 92 within an inbound distributed storage and task (DST) processing section. As shown, the data 92 is reconstructed from a plurality of data partitions (1-x, where x is an integer greater than 4). Each data partition (or chunk set of data) is decoded and re-grouped using a de-grouping and decoding function 212 and a de-partition function 214 from slice groupings as previously discussed. For a given data partition, the slice groupings (e.g., at least a decode threshold per data segment of encoded data slices) are received from DST execution units. From data partition to data partition, the ordering of the slice groupings received from the DST execution units may vary as discussed with reference to FIG. 10.

Figure 20:
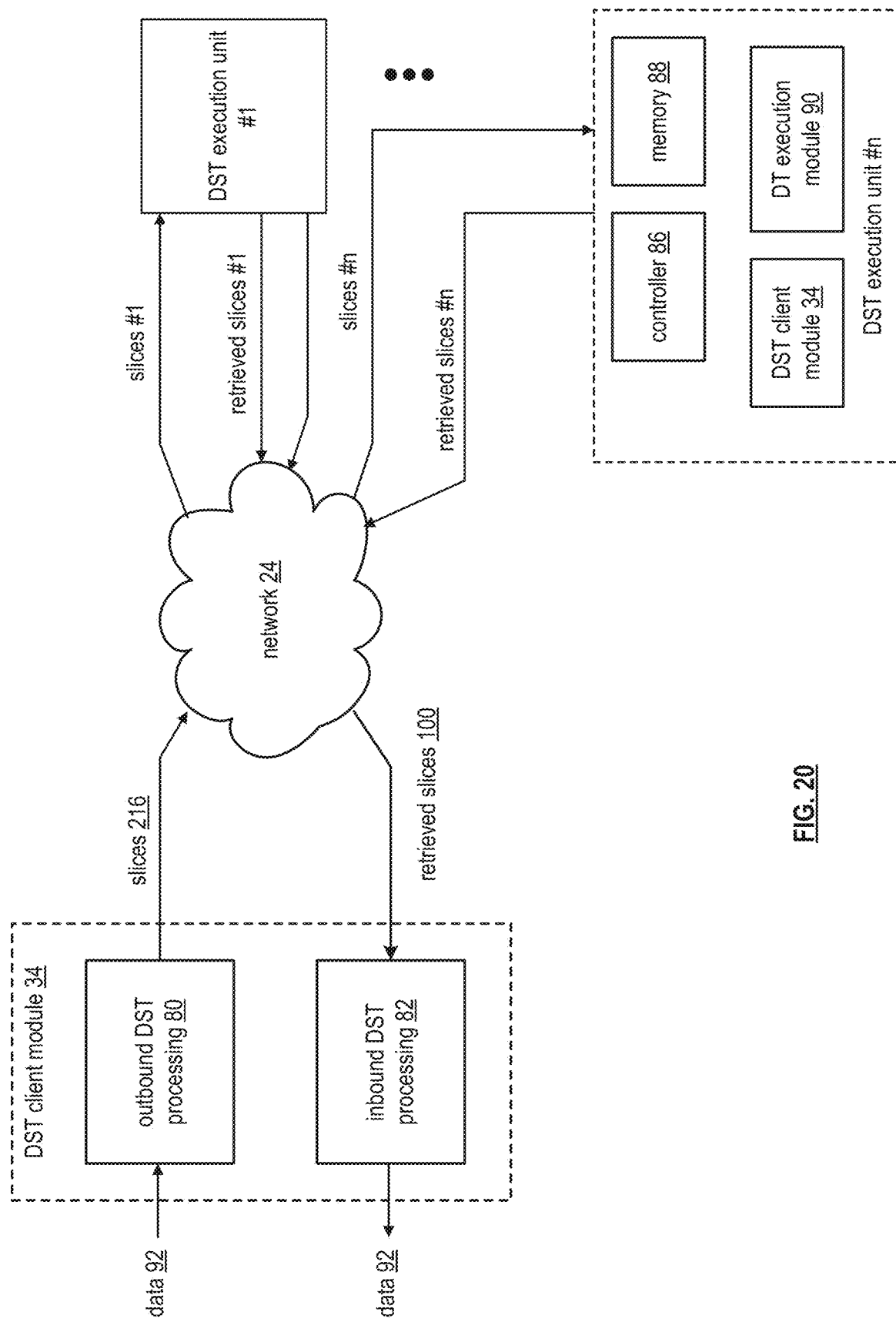
FIG. 20 is a diagram of an example of a distributed storage within the distributed computing system in accordance with the present invention.

FIG. 20 is a diagram of an example of a distributed storage and/or retrieval within the distributed computing system. The distributed computing system includes a plurality of distributed storage and/or task (DST) processing client modules 34 (one shown) coupled to a distributed storage and/or task processing network (DSTN) module, or multiple DSTN modules, via a network 24. The DST client module 34 includes an outbound DST processing section 80 and an inbound DST processing section 82. The DSTN module includes a plurality of DST execution units. Each DST execution unit includes a controller 86, memory 88, one or more distributed task (DT) execution modules 90, and a DST client module 34.

In an example of data storage, the DST client module 34 has data 92 that it desires to store in the DSTN module. The data 92 may be a file (e.g., video, audio, text, graphics, etc.), a data object, a data block, an update to a file, an update to a data block, etc. In this instance, the outbound DST processing module 80 converts the data 92 into encoded data slices 216 as will be further described with reference to FIGS. 21-23. The outbound DST processing module 80 sends, via the network 24, to the DST execution units for storage as further described with reference to FIG. 24.

In an example of data retrieval, the DST client module 34 issues a retrieve request to the DST execution units for the desired data 92. The retrieve request may address each DST executions units storing encoded data slices of the desired data, address a decode threshold number of DST execution units, address a read threshold number of DST execution units, or address some other number of DST execution units. In response to the request, each addressed DST execution unit retrieves its encoded data slices 100 of the desired data and sends them to the inbound DST processing section 82, via the network 24.

When, for each data segment, the inbound DST processing section 82 receives at least a decode threshold number of encoded data slices 100, it converts the encoded data slices 100 into a data segment. The inbound DST processing section 82 aggregates the data segments to produce the retrieved data 92.

Figure 21:
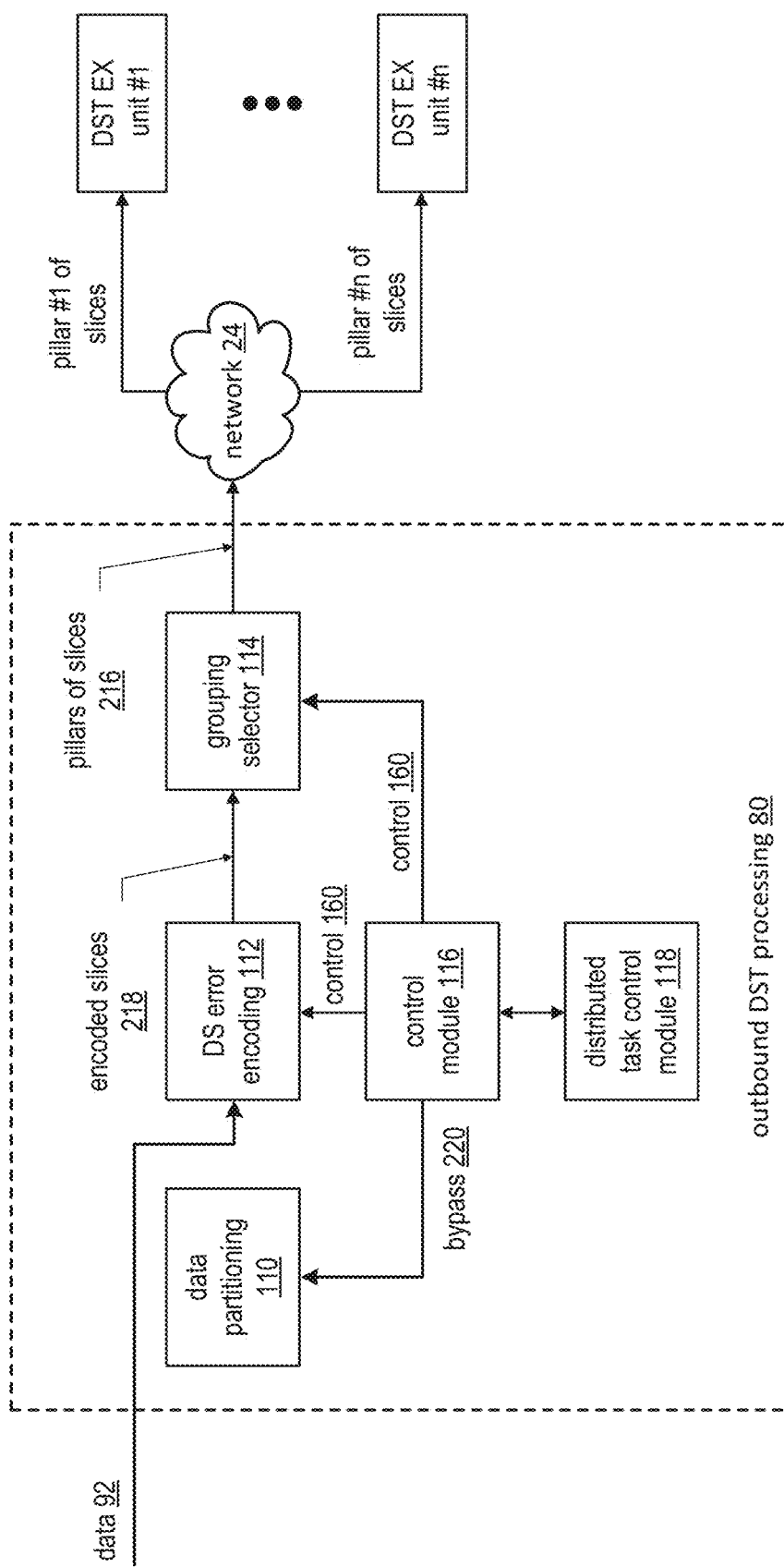
FIG. 21 is a schematic block diagram of an example of operation of outbound distributed storage and/or task (DST) processing for storing data in accordance with the present invention.

FIG. 21 is a schematic block diagram of an embodiment of an outbound distributed storage and/or task (DST) processing section 80 of a DST client module coupled to a distributed storage and task network (DSTN) module (e.g., a plurality of DST execution units) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 is by-passed such that data 92 is provided directly to the DS error encoding module 112. The control module 116 coordinates the by-passing of the data partitioning module 110 by outputting a bypass 220 message to the data partitioning module 110.

The DS error encoding module 112 receives the data 92 in a serial manner, a parallel manner, and/or a combination thereof. The DS error encoding module 112 DS error encodes the data in accordance with control information 160 from the control module 116 to produce encoded data slices 218. The DS error encoding includes segmenting the data 92 into data segments, segment security processing (e.g., encryption, compression, watermarking, integrity check (e.g., CRC, etc.)), error encoding, slicing, and/or per slice security processing (e.g., encryption, compression, watermarking, integrity check (e.g., CRC, etc.)). The control information 160 indicates which steps of the DS error encoding are active for the data 92 and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 218 of the data segments into pillars of slices 216. The number of pillars corresponds to the pillar width of the DS error encoding parameters. In this example, the distributed task control module 118 facilitates the storage request.

Figure 22:
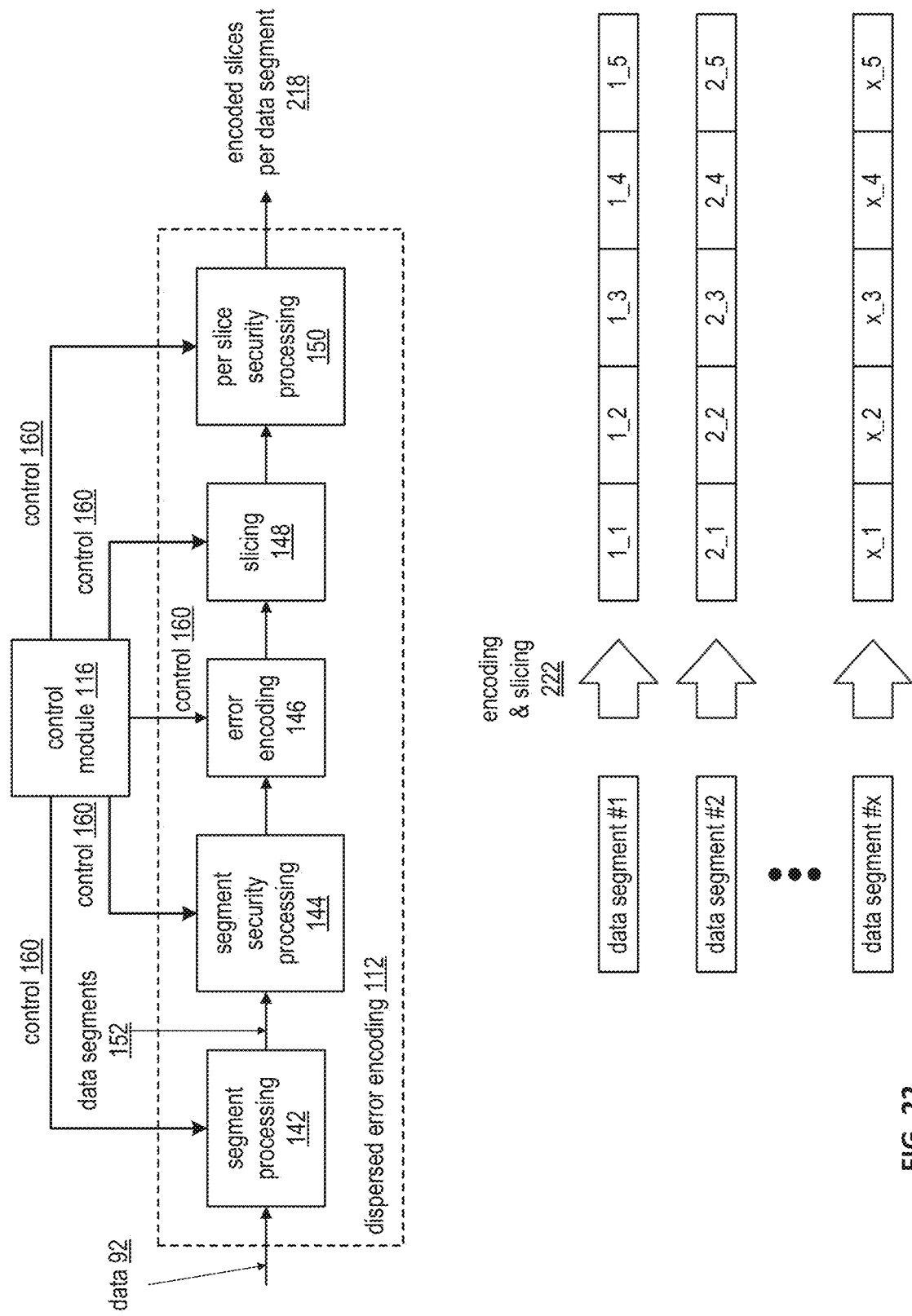
FIG. 22 is a schematic block diagram of an example of a dispersed error encoding for the example of FIG. 21 in accordance with the present invention.

FIG. 22 is a schematic block diagram of an example of a dispersed storage (DS) error encoding module 112 for the example of FIG. 21. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives data 92 and receives segmenting information as control information 160 from the control module 116. The segmenting information indicates how the segment processing module is to segment the data. For example, the segmenting information indicates the size of each data segment. The segment processing module 142 segments the data 92 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., CRC, etc.), and/or any other type of digital security. For example, when the segment security processing module 144 is enabled, it compresses a data segment 152, encrypts the compressed data segment, and generates a CRC value for the encrypted data segment to produce a secure data segment. When the segment security processing module 144 is not enabled, it passes the data segments 152 to the error encoding module 146 or is bypassed such that the data segments 152 are provided to the error encoding module 146.

The error encoding module 146 encodes the secure data segments in accordance with error correction encoding parameters received as control information 160 from the control module 116. The error correction encoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment to produce an encoded data segment.

The slicing module 148 slices the encoded data segment in accordance with a pillar width of the error correction encoding parameters. For example, if the pillar width is five, the slicing module slices an encoded data segment into a set of five encoded data slices. As such, for a plurality of data segments, the slicing module 148 outputs a plurality of sets of encoded data slices as shown within encoding and slicing function 222 as described.

The per slice security processing module 150, when enabled by the control module 116, secures each encoded data slice based on slice security information received as control information 160 from the control module 116. The slice security information includes data compression, encryption, watermarking, integrity check (e.g., CRC, etc.), and/or any other type of digital security. For example, when the per slice security processing module 150 is enabled, it may compress an encoded data slice, encrypt the compressed encoded data slice, and generate a CRC value for the encrypted encoded data slice to produce a secure encoded data slice tweaking. When the per slice security processing module 150 is not enabled, it passes the encoded data slices or is bypassed such that the encoded data slices 218 are the output of the DS error encoding module 112.

Figure 23:
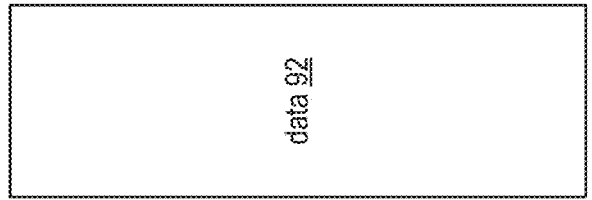
FIG. 23 is a diagram of an example of converting data into pillar slice groups for storage in accordance with the present invention.

FIG. 23 is a diagram of an example of converting data 92 into pillar slice groups utilizing encoding, slicing and pillar grouping function 224 for storage in memory of a distributed storage and task network (DSTN) module. As previously discussed the data 92 is encoded and sliced into a plurality of sets of encoded data slices; one set per data segment. The grouping selection module organizes the sets of encoded data slices into pillars of data slices. In this example, the DS error encoding parameters include a pillar width of 5 and a decode threshold of 3. As such, for each data segment, 5 encoded data slices are created.

The grouping selection module takes the first encoded data slice of each of the sets and forms a first pillar, which may be sent to the first DST execution unit. Similarly, the grouping selection module creates the second pillar from the second slices of the sets; the third pillar from the third slices of the sets; the fourth pillar from the fourth slices of the sets; and the fifth pillar from the fifth slices of the set.

Figure 24:
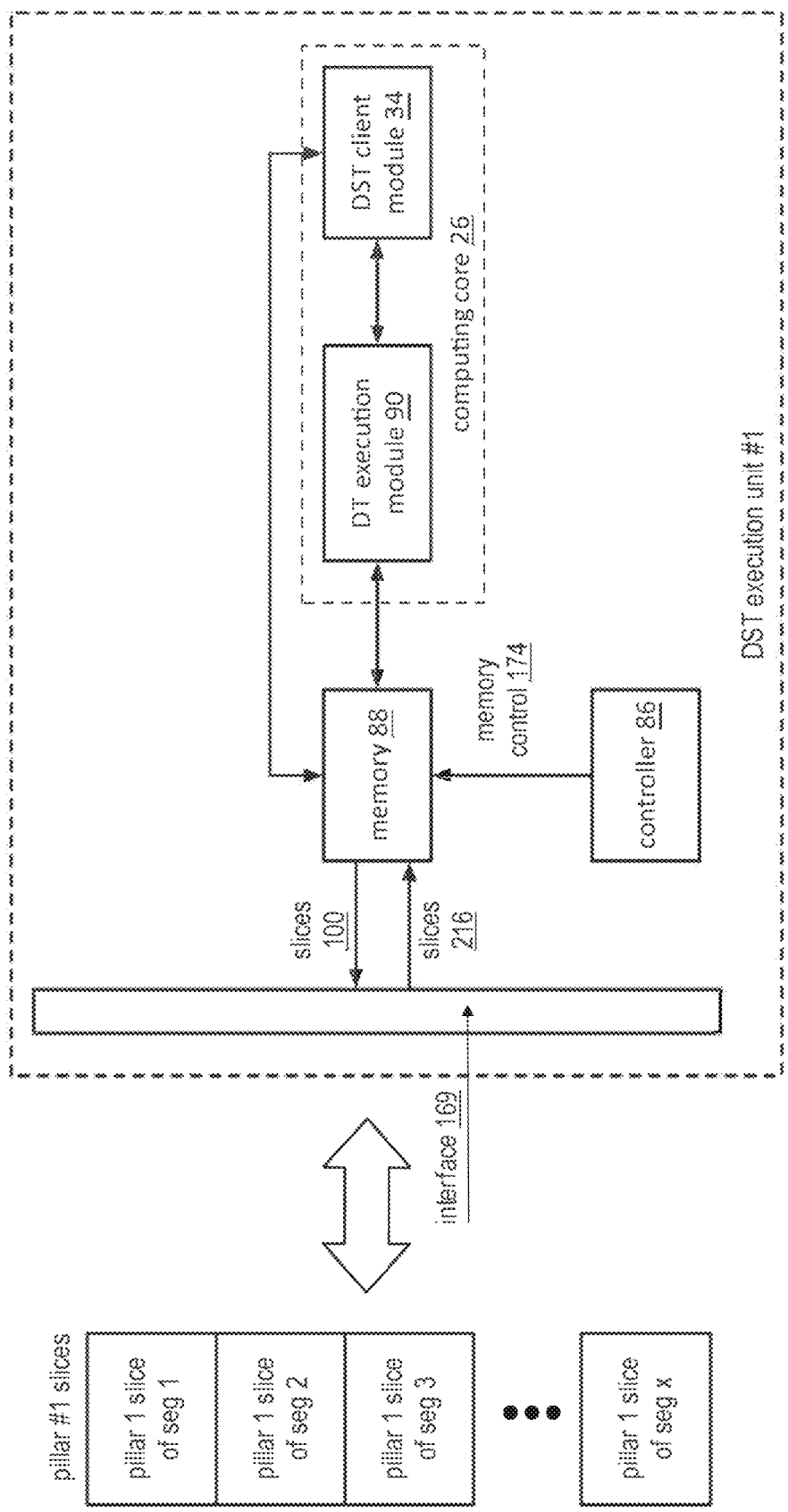
FIG. 24 is a schematic block diagram of an example of a storage operation of a DST execution unit in accordance with the present invention.

FIG. 24 is a schematic block diagram of an embodiment of a distributed storage and/or task (DST) execution unit that includes an interface 169, a controller 86, memory 88, one or more distributed task (DT) execution modules 90, and a DST client module 34. A computing core 26 may be utilized to implement the one or more DT execution modules 90 and the DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a pillar of slices 216, the DST execution unit receives, via interface 169, a pillar of slices 216 (e.g., pillar #1 slices). The memory 88 stores the encoded data slices 216 of the pillar of slices in accordance with memory control information 174 it receives from the controller 86. The controller 86 (e.g., a processing module, a CPU, etc.) generates the memory control information 174 based on distributed storage information (e.g., user information (e.g., user ID, distributed storage permissions, data access permission, etc.), vault information (e.g., virtual memory assigned to user, user group, etc.), etc.). Similarly, when retrieving slices, the DST execution unit receives, via interface 169, a slice retrieval request. The memory 88 retrieves the slice in accordance with memory control information 174 it receives from the controller 86. The memory 88 outputs the slice 100, via the interface 169, to a requesting entity.

Figure 25:
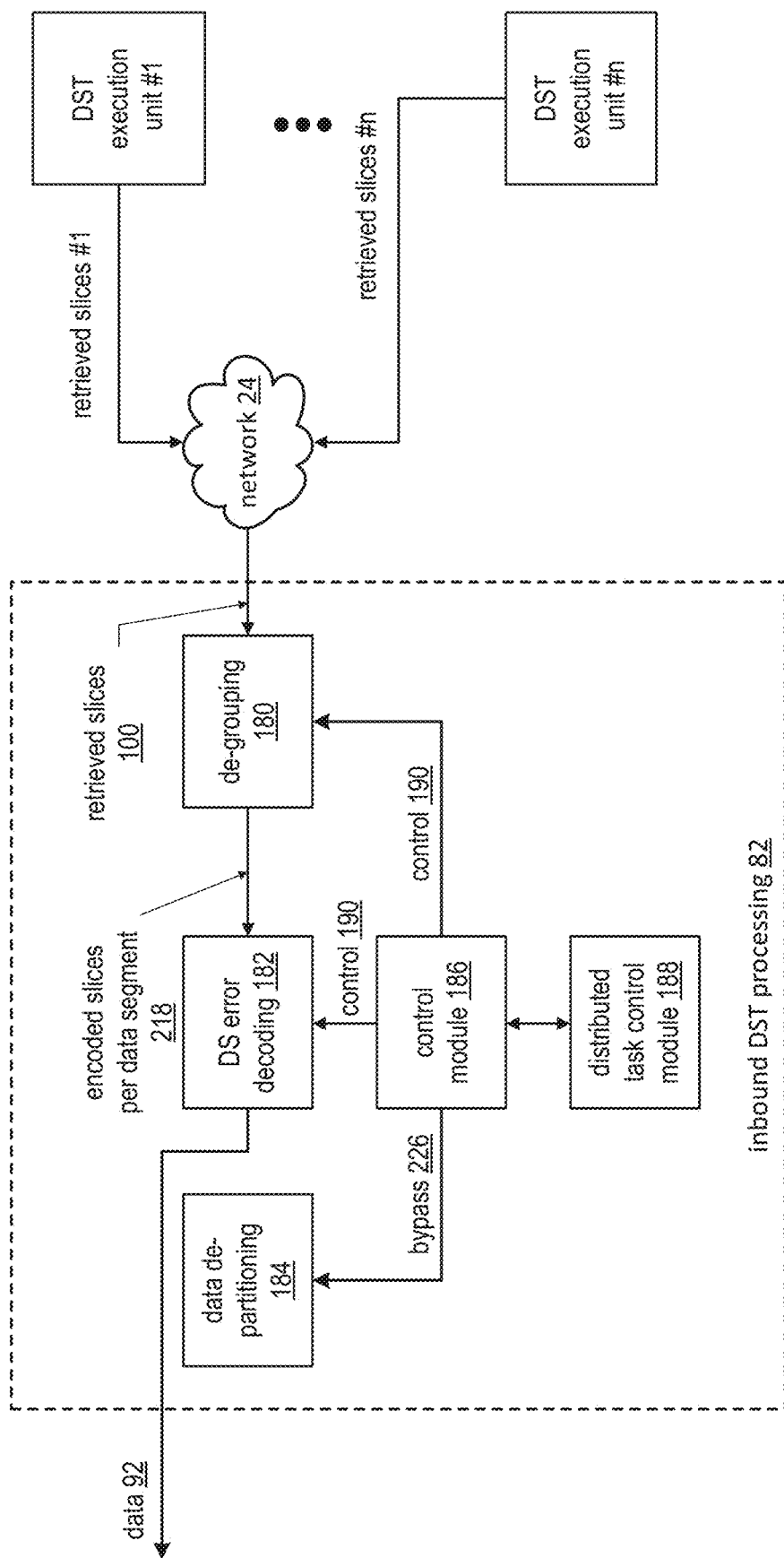
FIG. 25 is a schematic block diagram of an example of operation of inbound distributed storage and/or task (DST) processing for retrieving dispersed error encoded data in accordance with the present invention.

FIG. 25 is a schematic block diagram of an example of operation of an inbound distributed storage and/or task (DST) processing section 82 for retrieving dispersed error encoded data 92. The inbound DST processing section 82 includes a de-grouping module 180, a dispersed storage (DS) error decoding module 182, a data de-partitioning module 184, a control module 186, and a distributed task control module 188. Note that the control module 186 and/or the distributed task control module 188 may be separate modules from corresponding ones of an outbound DST processing section or may be the same modules.

In an example of operation, the inbound DST processing section 82 is retrieving stored data 92 from the DST execution units (i.e., the DSTN module). In this example, the DST execution units output encoded data slices corresponding to data retrieval requests from the distributed task control module 188. The de-grouping module 180 receives pillars of slices 100 and de-groups them in accordance with control information 190 from the control module 186 to produce sets of encoded data slices 218. The DS error decoding module 182 decodes, in accordance with the DS error encoding parameters received as control information 190 from the control module 186, each set of encoded data slices 218 to produce data segments, which are aggregated into retrieved data 92. The data de-partitioning module 184 is by-passed in this operational mode via a bypass signal 226 of control information 190 from the control module 186.

Figure 26:
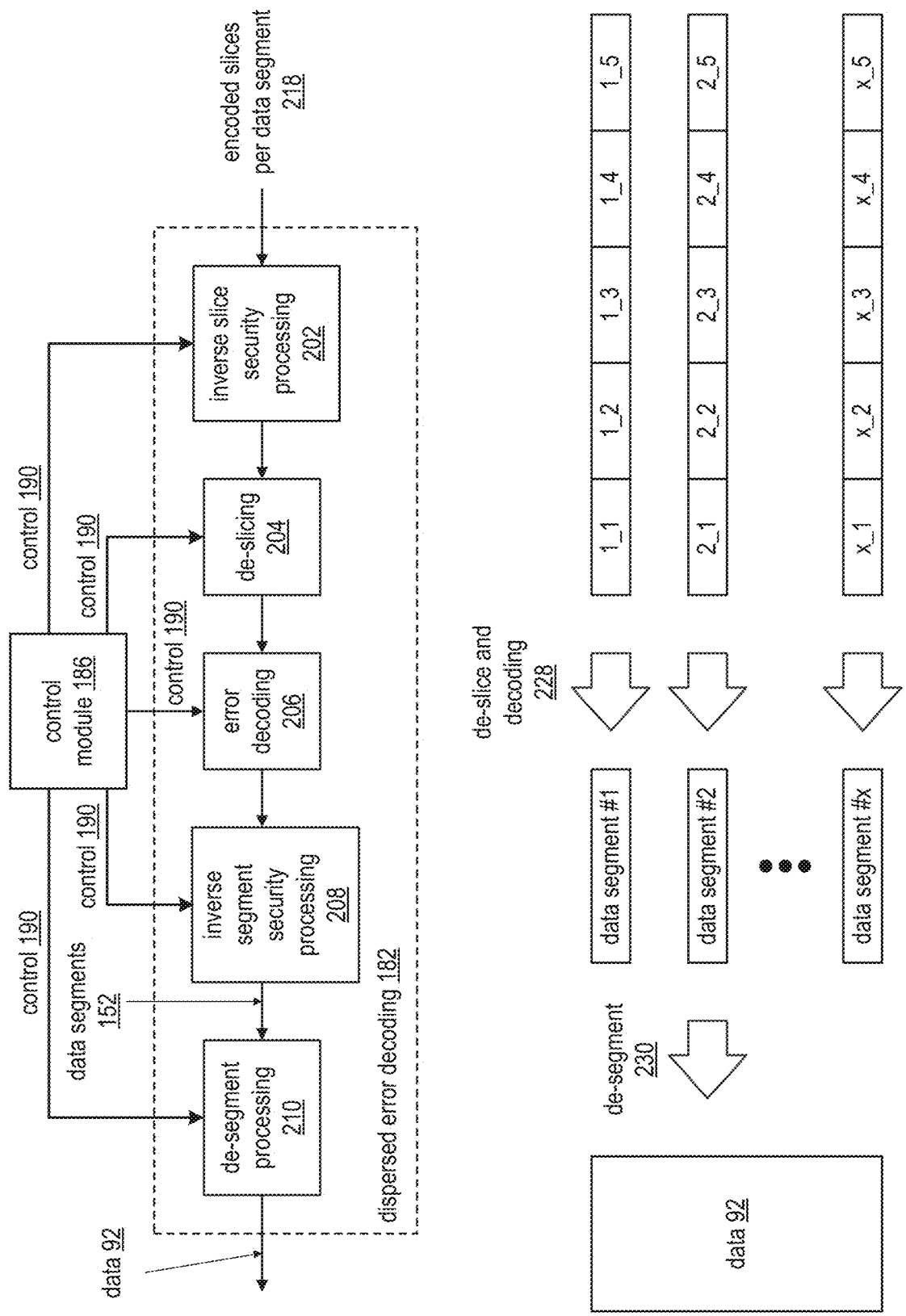
FIG. 26 is a schematic block diagram of an example of a dispersed error decoding for the example of FIG. 25 in accordance with the present invention.

FIG. 26 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, and a de-segmenting processing module 210. The dispersed error decoding module 182 is operable to de-slice and decode encoded slices per data segment 218 utilizing a de-slicing and decoding function 228 to produce a plurality of data segments that are de-segmented utilizing a de-segment function 230 to recover data 92.

In an example of operation, the inverse per slice security processing module 202, when enabled by the control module 186 via control information 190, unsecures each encoded data slice 218 based on slice de-security information (e.g., the compliment of the slice security information discussed with reference to FIG. 6) received as control information 190 from the control module 186. The slice de-security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 218, it decrypts each verified encoded data slice, and decompresses each decrypted encoded data slice to produce slice encoded data. When the inverse per slice security processing module 202 is not enabled, it passes the encoded data slices 218 as the sliced encoded data or is bypassed such that the retrieved encoded data slices 218 are provided as the sliced encoded data.

The de-slicing module 204 de-slices the sliced encoded data into encoded data segments in accordance with a pillar width of the error correction encoding parameters received as control information 190 from a control module 186. For example, if the pillar width is five, the de-slicing module de-slices a set of five encoded data slices into an encoded data segment. Alternatively, the encoded data segment may include just three encoded data slices (e.g., when the decode threshold is 3).

The error decoding module 206 decodes the encoded data segments in accordance with error correction decoding parameters received as control information 190 from the control module 186 to produce secure data segments. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments based on segment security information received as control information 190 from the control module 186. The segment security information includes data decompression, decryption, de-watermarking, integrity check (e.g., CRC, etc.) verification, and/or any other type of digital security. For example, when the inverse segment security processing module is enabled, it verifies integrity information (e.g., a CRC value) of each secure data segment, it decrypts each verified secured data segment, and decompresses each decrypted secure data segment to produce a data segment 152. When the inverse segment security processing module 208 is not enabled, it passes the decoded data segment 152 as the data segment or is bypassed. The de-segmenting processing module 210 aggregates the data segments 152 into the data 92 in accordance with control information 190 from the control module 186.

Figure 27:
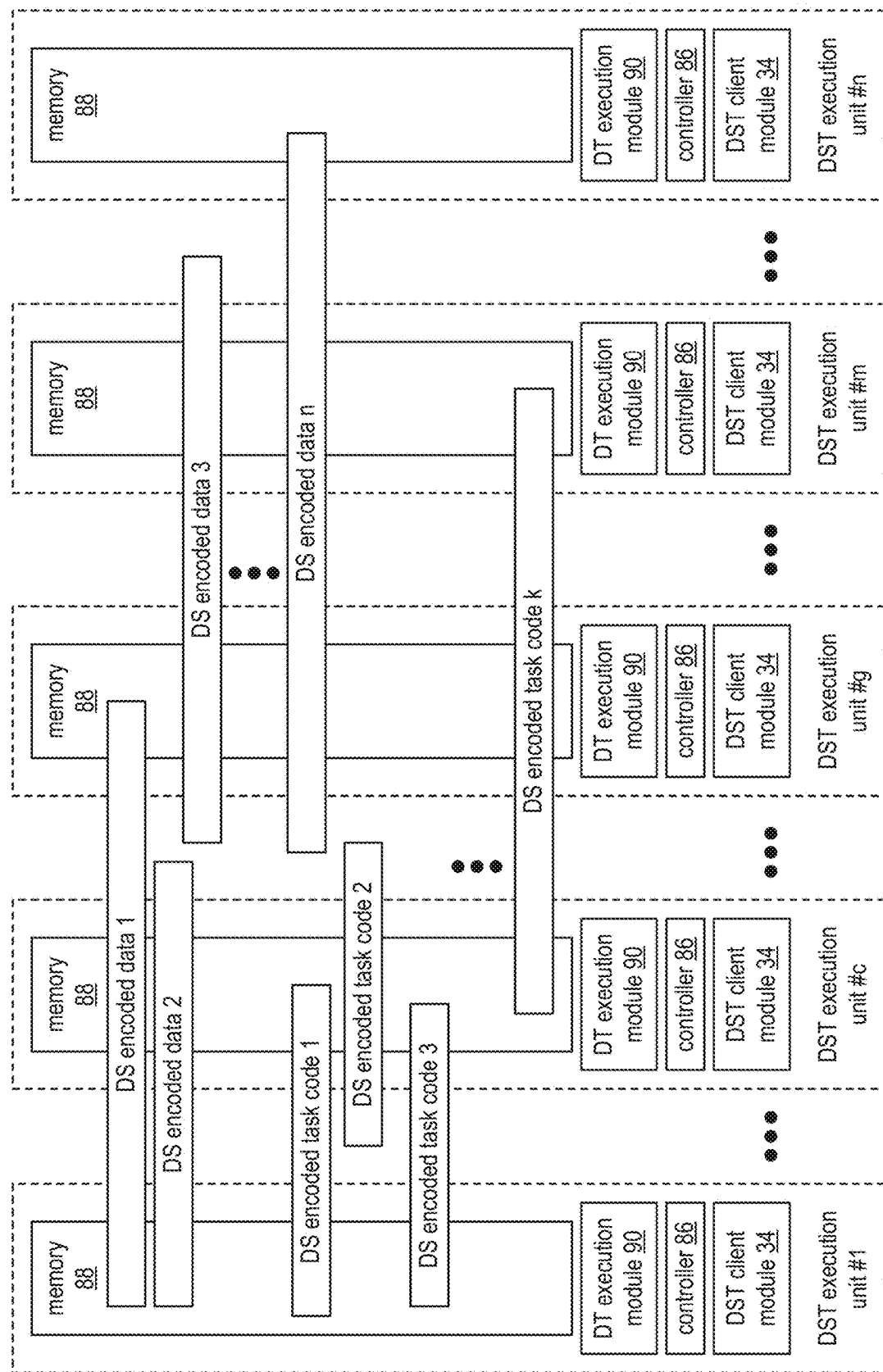
FIG. 27 is a schematic block diagram of an example of a distributed storage and task processing network (DSTN) module storing a plurality of data and a plurality of task codes in accordance with the present invention.

FIG. 27 is a schematic block diagram of an example of a distributed storage and task processing network (DSTN) module that includes a plurality of distributed storage and task (DST) execution units (#1 through #n, where, for example, n is an integer greater than or equal to three). Each of the DST execution units includes a DST client module 34, a controller 86, one or more DT (distributed task) execution modules 90, and memory 88.

In this example, the DSTN module stores, in the memory of the DST execution units, a plurality of DS (dispersed storage) encoded data (e.g., 1 through n, where n is an integer greater than or equal to two) and stores a plurality of DS encoded task codes (e.g., 1 through k, where k is an integer greater than or equal to two). The DS encoded data may be encoded in accordance with one or more examples described with reference to FIGS. 3-19 (e.g., organized in slice groupings) or encoded in accordance with one or more examples described with reference to FIGS. 20-26 (e.g., organized in pillar groups). The data that is encoded into the DS encoded data may be of any size and/or of any content. For example, the data may be one or more digital books, a copy of a company's emails, a large-scale Internet search, a video security file, one or more entertainment video files (e.g., television programs, movies, etc.), data files, and/or any other large amount of data (e.g., greater than a few Terabytes).

The tasks that are encoded into the DS encoded task code may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. The tasks may be encoded into the DS encoded task code in accordance with one or more examples described with reference to FIGS. 3-19 (e.g., organized in slice groupings) or encoded in accordance with one or more examples described with reference to FIGS. 20-26 (e.g., organized in pillar groups).

In an example of operation, a DST client module of a user device or of a DST processing unit issues a DST request to the DSTN module. The DST request may include a request to retrieve stored data, or a portion thereof, may include a request to store data that is included with the DST request, may include a request to perform one or more tasks on stored data, may include a request to perform one or more tasks on data included with the DST request, etc. In the cases where the DST request includes a request to store data or to retrieve data, the client module and/or the DSTN module processes the request as previously discussed with reference to one or more of FIGS. 3-19 (e.g., slice groupings) and/or 20-26 (e.g., pillar groupings). In the case where the DST request includes a request to perform one or more tasks on data included with the DST request, the DST client module and/or the DSTN module process the DST request as previously discussed with reference to one or more of FIGS. 3-19.

In the case where the DST request includes a request to perform one or more tasks on stored data, the DST client module and/or the DSTN module processes the DST request as will be described with reference to one or more of FIGS. 28-39. In general, the DST client module identifies data and one or more tasks for the DSTN module to execute upon the identified data. The DST request may be for a one-time execution of the task or for an on-going execution of the task. As an example of the latter, as a company generates daily emails, the DST request may be to daily search new emails for inappropriate content and, if found, record the content, the email sender(s), the email recipient(s), email routing information, notify human resources of the identified email, etc.

Figure 28:
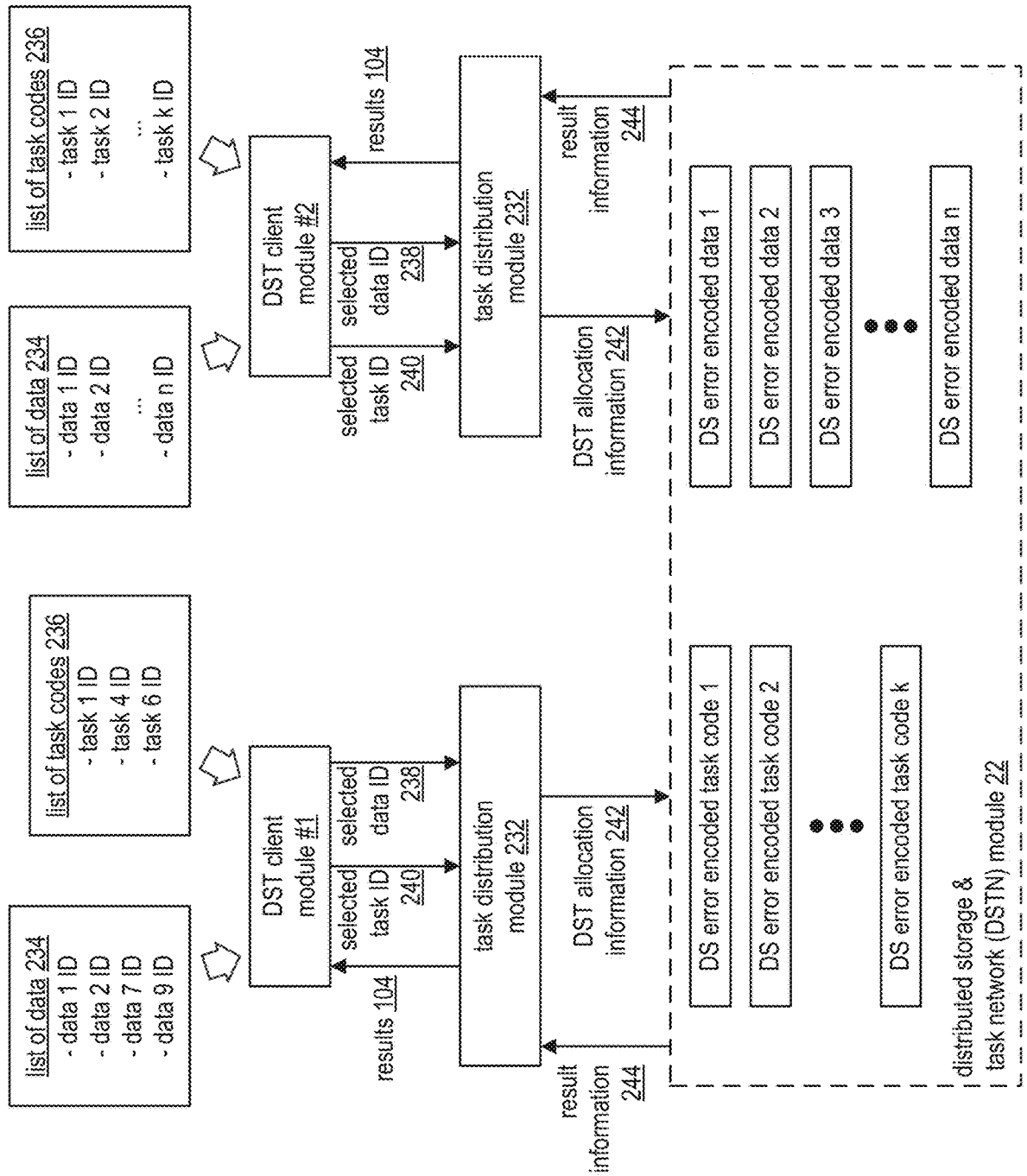
FIG. 28 is a schematic block diagram of an example of the distributed computing system performing tasks on stored data in accordance with the present invention.

FIG. 28 is a schematic block diagram of an example of a distributed computing system performing tasks on stored data. In this example, two distributed storage and task (DST) client modules 1-2 are shown: the first may be associated with a user device and the second may be associated with a DST processing unit or a high priority user device (e.g., high priority clearance user, system administrator, etc.). Each DST client module includes a list of stored data 234 and a list of tasks codes 236. The list of stored data 234 includes one or more entries of data identifying information, where each entry identifies data stored in the DSTN module 22. The data identifying information (e.g., data ID) includes one or more of a data file name, a data file directory listing, DSTN addressing information of the data, a data object identifier, etc. The list of tasks 236 includes one or more entries of task code identifying information, when each entry identifies task codes stored in the DSTN module 22. The task code identifying information (e.g., task ID) includes one or more of a task file name, a task file directory listing, DSTN addressing information of the task, another type of identifier to identify the task, etc.

As shown, the list of data 234 and the list of tasks 236 are each smaller in number of entries for the first DST client module than the corresponding lists of the second DST client module. This may occur because the user device associated with the first DST client module has fewer privileges in the distributed computing system than the device associated with the second DST client module. Alternatively, this may occur because the user device associated with the first DST client module serves fewer users than the device associated with the second DST client module and is restricted by the distributed computing system accordingly. As yet another alternative, this may occur through no restraints by the distributed computing system, it just occurred because the operator of the user device associated with the first DST client module has selected fewer data and/or fewer tasks than the operator of the device associated with the second DST client module.

In an example of operation, the first DST client module selects one or more data entries 238 and one or more tasks 240 from its respective lists (e.g., selected data ID and selected task ID). The first DST client module sends its selections to a task distribution module 232. The task distribution module 232 may be within a stand-alone device of the distributed computing system, may be within the user device that contains the first DST client module, or may be within the DSTN module 22.

Regardless of the task distribution module's location, it generates DST allocation information 242 from the selected task ID 240 and the selected data ID 238. The DST allocation information 242 includes data partitioning information, task execution information, and/or intermediate result information. The task distribution module 232 sends the DST allocation information 242 to the DSTN module 22. Note that one or more examples of the DST allocation information will be discussed with reference to one or more of FIGS. 29-39.

The DSTN module 22 interprets the DST allocation information 242 to identify the stored DS encoded data (e.g., DS error encoded data 2) and to identify the stored DS error encoded task code (e.g., DS error encoded task code 1). In addition, the DSTN module 22 interprets the DST allocation information 242 to determine how the data is to be partitioned and how the task is to be partitioned. The DSTN module 22 also determines whether the selected DS error encoded data 238 needs to be converted from pillar grouping to slice grouping. If so, the DSTN module 22 converts the selected DS error encoded data into slice groupings and stores the slice grouping DS error encoded data by overwriting the pillar grouping DS error encoded data or by storing it in a different location in the memory of the DSTN module 22 (i.e., does not overwrite the pillar grouping DS encoded data).

The DSTN module 22 partitions the data and the task as indicated in the DST allocation information 242 and sends the portions to selected DST execution units of the DSTN module 22. Each of the selected DST execution units performs its partial task(s) on its slice groupings to produce partial results. The DSTN module 22 collects the partial results from the selected DST execution units and provides them, as result information 244, to the task distribution module. The result information 244 may be the collected partial results, one or more final results as produced by the DSTN module 22 from processing the partial results in accordance with the DST allocation information 242, or one or more intermediate results as produced by the DSTN module 22 from processing the partial results in accordance with the DST allocation information 242.

The task distribution module 232 receives the result information 244 and provides one or more final results 104 therefrom to the first DST client module. The final result(s) 104 may be result information 244 or a result(s) of the task distribution module's processing of the result information 244.

In concurrence with processing the selected task of the first DST client module, the distributed computing system may process the selected task(s) of the second DST client module on the selected data(s) of the second DST client module. Alternatively, the distributed computing system may process the second DST client module's request subsequent to, or preceding, that of the first DST client module. Regardless of the ordering and/or parallel processing of the DST client module requests, the second DST client module provides its selected data 238 and selected task 240 to a task distribution module 232. If the task distribution module 232 is a separate device of the distributed computing system or within the DSTN module, the task distribution modules 232 coupled to the first and second DST client modules may be the same module. The task distribution module 232 processes the request of the second DST client module in a similar manner as it processed the request of the first DST client module.

Figure 29:
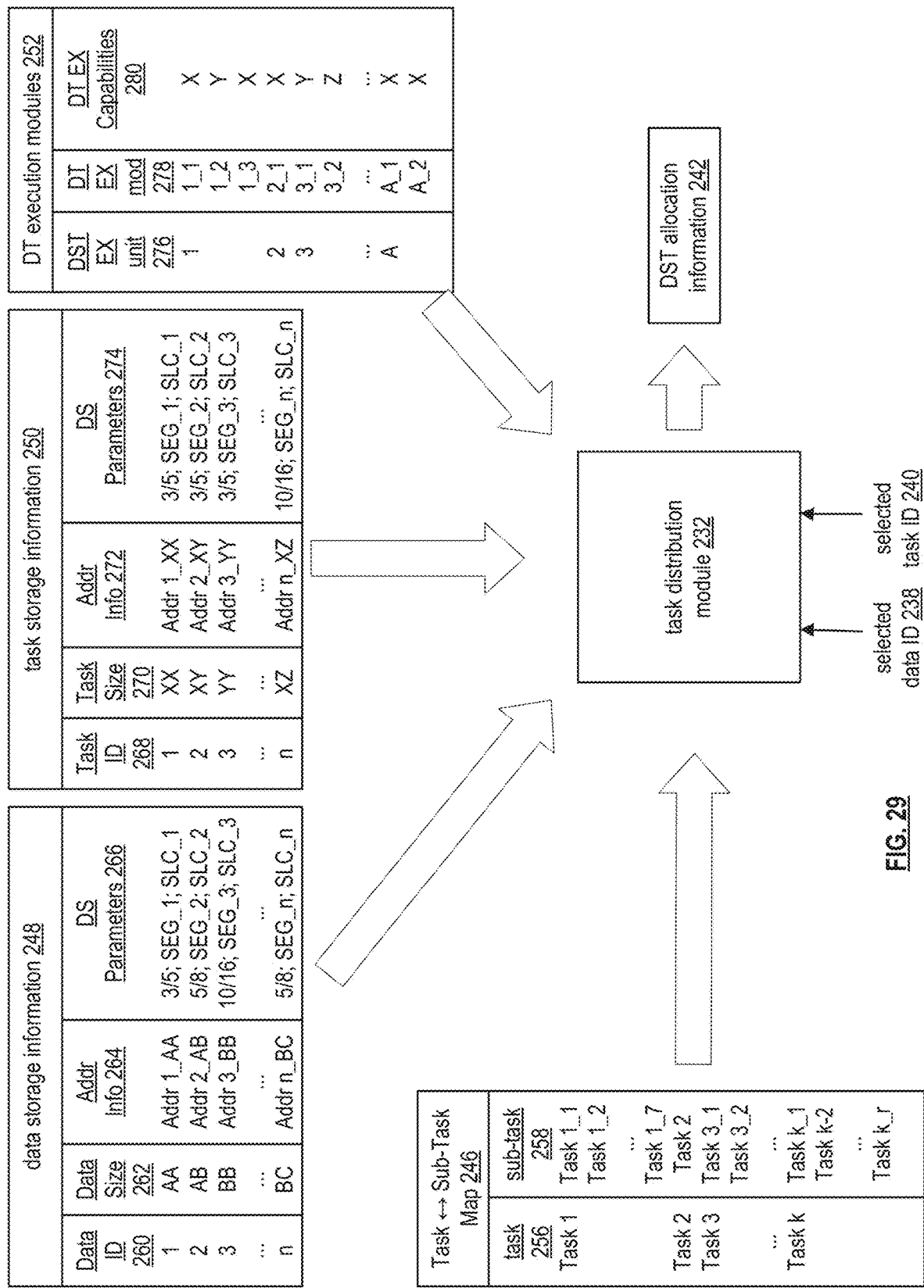
FIG. 29 is a schematic block diagram of an embodiment of a task distribution module facilitating the example of FIG. 28 in accordance with the present invention.

FIG. 29 is a schematic block diagram of an embodiment of a task distribution module 232 facilitating the example of FIG. 28. The task distribution module 232 includes a plurality of tables it uses to generate distributed storage and task (DST) allocation information 242 for selected data and selected tasks received from a DST client module. The tables include data storage information 248, task storage information 250, distributed task (DT) execution module information 252, and task ⇔ sub-task mapping information 246.

The data storage information table 248 includes a data identification (ID) field 260, a data size field 262, an addressing information field 264, distributed storage (DS) information 266, and may further include other information regarding the data, how it is stored, and/or how it can be processed. For example, DS encoded data #1 has a data ID of 1, a data size of AA (e.g., a byte size of a few Terabytes or more), addressing information of Addr_1_AA, and DS parameters of ⅗; SEG_1; and SLC_1. In this example, the addressing information may be a virtual address corresponding to the virtual address of the first storage word (e.g., one or more bytes) of the data and information on how to calculate the other addresses, may be a range of virtual addresses for the storage words of the data, physical addresses of the first storage word or the storage words of the data, may be a list of slice names of the encoded data slices of the data, etc. The DS parameters may include identity of an error encoding scheme, decode threshold/pillar width (e.g., ⅗ for the first data entry), segment security information (e.g., SEG_1), per slice security information (e.g., SLC_1), and/or any other information regarding how the data was encoded into data slices.

The task storage information table 250 includes a task identification (ID) field 268, a task size field 270, an addressing information field 272, distributed storage (DS) information 274, and may further include other information regarding the task, how it is stored, and/or how it can be used to process data. For example, DS encoded task #2 has a task ID of 2, a task size of XY, addressing information of Addr_2_XY, and DS parameters of ⅗; SEG_2; and SLC_2. In this example, the addressing information may be a virtual address corresponding to the virtual address of the first storage word (e.g., one or more bytes) of the task and information on how to calculate the other addresses, may be a range of virtual addresses for the storage words of the task, physical addresses of the first storage word or the storage words of the task, may be a list of slices names of the encoded slices of the task code, etc. The DS parameters may include identity of an error encoding scheme, decode threshold/pillar width (e.g., ⅗ for the first data entry), segment security information (e.g., SEG_2), per slice security information (e.g., SLC_2), and/or any other information regarding how the task was encoded into encoded task slices. Note that the segment and/or the per-slice security information include a type of encryption (if enabled), a type of compression (if enabled), watermarking information (if enabled), and/or an integrity check scheme (if enabled).

The task ⇔ sub-task mapping information table 246 includes a task field 256 and a sub-task field 258. The task field 256 identifies a task stored in the memory of a distributed storage and task network (DSTN) module and the corresponding sub-task fields 258 indicates whether the task includes sub-tasks and, if so, how many and if any of the sub-tasks are ordered. In this example, the task ⇔ sub-task mapping information table 246 includes an entry for each task stored in memory of the DSTN module (e.g., task 1 through task k). In particular, this example indicates that task 1 includes 7 sub-tasks; task 2 does not include sub-tasks, and task k includes r number of sub-tasks (where r is an integer greater than or equal to two).

The DT execution module table 252 includes a DST execution unit ID field 276, a DT execution module ID field 278, and a DT execution module capabilities field 280. The DST execution unit ID field 276 includes the identity of DST units in the DSTN module. The DT execution module ID field 278 includes the identity of each DT execution unit in each DST unit. For example, DST unit 1 includes three DT executions modules (e.g., 1_1, 1_2, and 1_3). The DT execution capabilities field 280 includes identity of the capabilities of the corresponding DT execution unit. For example, DT execution module 1_1 includes capabilities X, where X includes one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, memory information (e.g., type, size, availability, etc.), and/or any information germane to executing one or more tasks.

From these tables, the task distribution module 232 generates the DST allocation information 242 to indicate where the data is stored, how to partition the data, where the task is stored, how to partition the task, which DT execution units should perform which partial task on which data partitions, where and how intermediate results are to be stored, etc. If multiple tasks are being performed on the same data or different data, the task distribution module factors such information into its generation of the DST allocation information.

Figure 30:
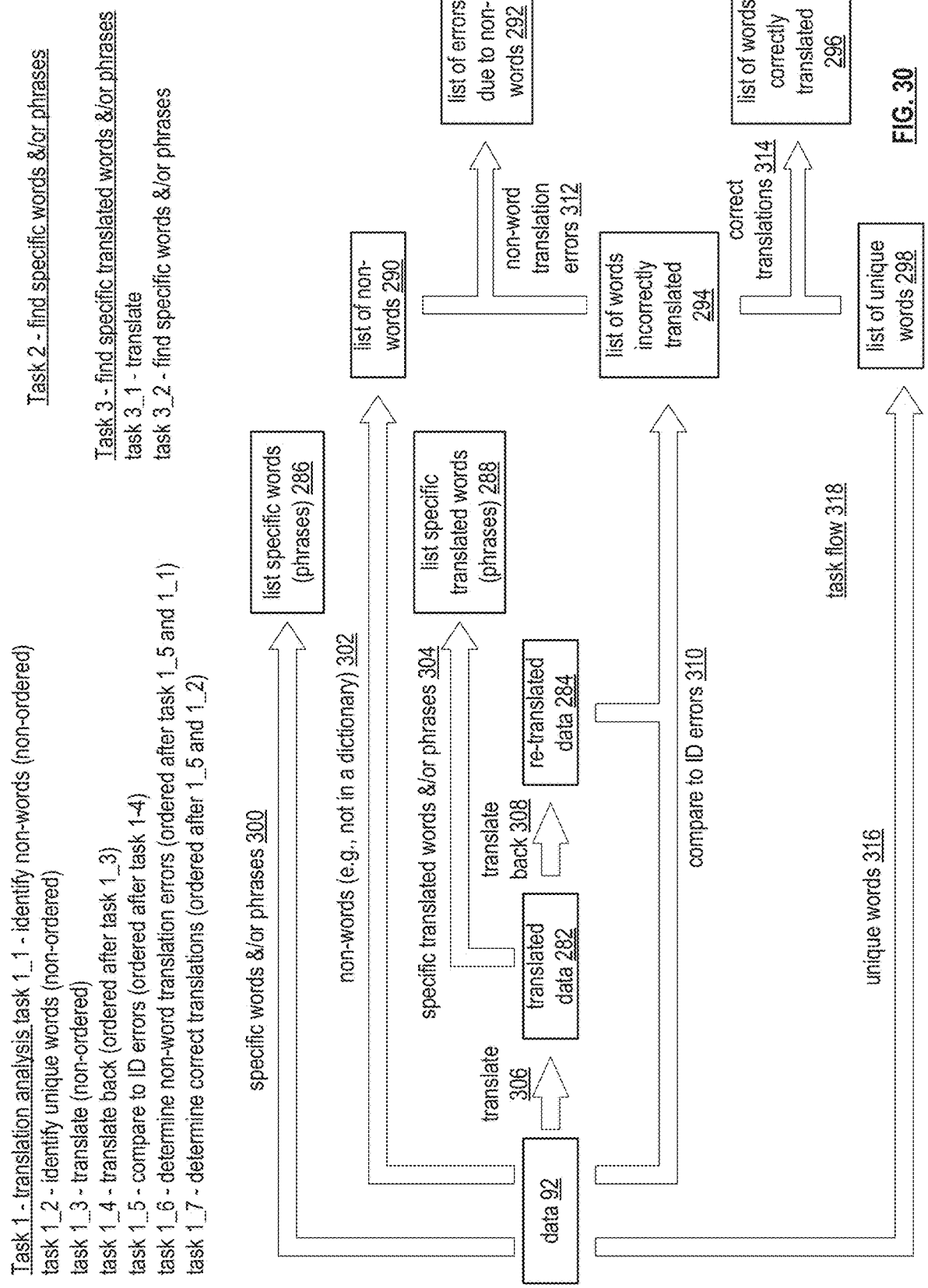
FIG. 30 is a diagram of a specific example of the distributed computing system performing tasks on stored data in accordance with the present invention.

FIG. 30 is a diagram of a specific example of a distributed computing system performing tasks on stored data as a task flow 318. In this example, selected data 92 is data 2 and selected tasks are tasks 1, 2, and 3. Task 1 corresponds to analyzing translation of data from one language to another (e.g., human language or computer language); task 2 corresponds to finding specific words and/or phrases in the data; and task 3 corresponds to finding specific translated words and/or phrases in translated data.

In this example, task 1 includes 7 sub-tasks: task 1_1—identify non-words (non-ordered); task 1_2—identify unique words (non-ordered); task 1_3—translate (non-ordered); task 1_4—translate back (ordered after task 1_3); task 1_5—compare to ID errors (ordered after task 1-4); task 1_6—determine non-word translation errors (ordered after task 1_5 and 1_1); and task 1_7—determine correct translations (ordered after 1_5 and 1_2). The sub-task further indicates whether they are an ordered task (i.e., are dependent on the outcome of another task) or non-order (i.e., are independent of the outcome of another task). Task 2 does not include sub-tasks and task 3 includes two sub-tasks: task 3_1 translate; and task 3_2 find specific word or phrase in translated data.

In general, the three tasks collectively are selected to analyze data for translation accuracies, translation errors, translation anomalies, occurrence of specific words or phrases in the data, and occurrence of specific words or phrases on the translated data. Graphically, the data 92 is translated 306 into translated data 282; is analyzed for specific words and/or phrases 300 to produce a list of specific words and/or phrases 286; is analyzed for non-words 302 (e.g., not in a reference dictionary) to produce a list of non-words 290; and is analyzed for unique words 316 included in the data 92 (i.e., how many different words are included in the data) to produce a list of unique words 298. Each of these tasks is independent of each other and can therefore be processed in parallel if desired.

The translated data 282 is analyzed (e.g., sub-task 3_2) for specific translated words and/or phrases 304 to produce a list of specific translated words and/or phrases 288. The translated data 282 is translated back 308 (e.g., sub-task 1_4) into the language of the original data to produce re-translated data 284. These two tasks are dependent on the translate task (e.g., task 1_3) and thus must be ordered after the translation task, which may be in a pipelined ordering or a serial ordering. The re-translated data 284 is then compared 310 with the original data 92 to find words and/or phrases that did not translate (one way and/or the other) properly to produce a list of incorrectly translated words 294. As such, the comparing task (e.g., sub-task 1_5) 310 is ordered after the translation 306 and re-translation tasks 308 (e.g., sub-tasks 1_3 and 1_4).

The list of words incorrectly translated 294 is compared 312 to the list of non-words 290 to identify words that were not properly translated because the words are non-words to produce a list of errors due to non-words 292. In addition, the list of words incorrectly translated 294 is compared 314 to the list of unique words 298 to identify unique words that were properly translated to produce a list of correctly translated words 296. The comparison may also identify unique words that were not properly translated to produce a list of unique words that were not properly translated. Note that each list of words (e.g., specific words and/or phrases, non-words, unique words, translated words and/or phrases, etc.,) may include the word and/or phrase, how many times it is used, where in the data it is used, and/or any other information requested regarding a word and/or phrase.

Figure 31:
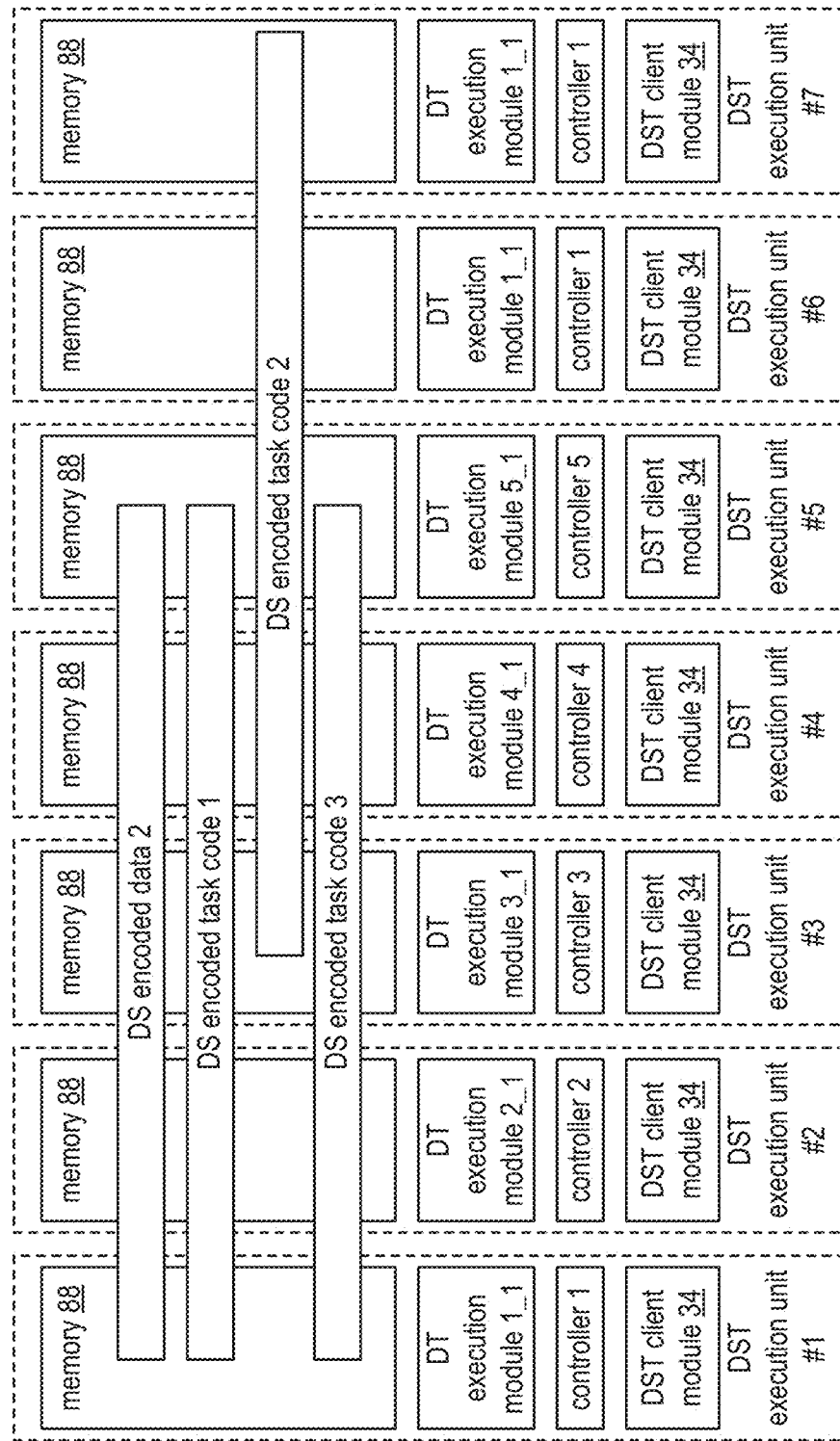
FIG. 31 is a schematic block diagram of an example of a distributed storage and task processing network (DSTN) module storing data and task codes for the example of FIG. 30 in accordance with the present invention.

FIG. 31 is a schematic block diagram of an example of a distributed storage and task processing network (DSTN) module storing data and task codes for the example of FIG. 30. As shown, DS encoded data 2 is stored as encoded data slices across the memory (e.g., stored in memories 88) of DST execution units 1-5; the DS encoded task code 1 (of task 1) and DS encoded task 3 are stored as encoded task slices across the memory of DST execution units 1-5; and DS encoded task code 2 (of task 2) is stored as encoded task slices across the memory of DST execution units 3-7. As indicated in the data storage information table and the task storage information table of FIG. 29, the respective data/task has DS parameters of ⅗ for their decode threshold/pillar width; hence spanning the memory of five DST execution units.

FIG. 32 is a diagram of an example of distributed storage and task (DST) allocation information 242 for the example of FIG. 30. The DST allocation information 242 includes data partitioning information 320, task execution information 322, and intermediate result information 324. The data partitioning information 320 includes the data identifier (ID), the number of partitions to split the data into, address information for each data partition, and whether the DS encoded data has to be transformed from pillar grouping to slice grouping. The task execution information 322 includes tabular information having a task identification field 326, a task ordering field 328, a data partition field ID 330, and a set of DT execution modules 332 to use for the distributed task processing per data partition. The intermediate result information 324 includes tabular information having a name ID field 334, an ID of the DST execution unit assigned to process the corresponding intermediate result 336, a scratch pad storage field 338, and an intermediate result storage field 340.

Continuing with the example of FIG. 30, where tasks 1-3 are to be distributedly performed on data 2, the data partitioning information includes the ID of data 2. In addition, the task distribution module determines whether the DS encoded data 2 is in the proper format for distributed computing (e.g., was stored as slice groupings). If not, the task distribution module indicates that the DS encoded data 2 format needs to be changed from the pillar grouping format to the slice grouping format, which will be done by the DSTN module. In addition, the task distribution module determines the number of partitions to divide the data into (e.g., 2_1 through 2_z) and addressing information for each partition.

The task distribution module generates an entry in the task execution information section for each sub-task to be performed. For example, task 1_1 (e.g., identify non-words on the data) has no task ordering (i.e., is independent of the results of other sub-tasks), is to be performed on data partitions 2_1 through 2_z by DT execution modules 1_1, 2_1, 3_1, 4_1, and Si. For instance, DT execution modules 1_1, 2_1, 3_1, 4_1, and 5_1 search for non-words in data partitions 2_1 through 2_z to produce task 1_1 intermediate results (R1-1, which is a list of non-words). Task 1_2 (e.g., identify unique words) has similar task execution information as task 1_1 to produce task 1_2 intermediate results (R1-2, which is the list of unique words).

Task 1_3 (e.g., translate) includes task execution information as being non-ordered (i.e., is independent), having DT execution modules 1_1, 2_1, 3_1, 4_1, and 5_1 translate data partitions 2_1 through 2_4 and having DT execution modules 1_2, 2_2, 3_2, 4_2, and 5_2 translate data partitions 2_5 through 2_z to produce task 1_3 intermediate results (R1-3, which is the translated data). In this example, the data partitions are grouped, where different sets of DT execution modules perform a distributed sub-task (or task) on each data partition group, which allows for further parallel processing.

Task 1_4 (e.g., translate back) is ordered after task 1_3 and is to be executed on task 1_3's intermediate result (e.g., R1-3_1) (e.g., the translated data). DT execution modules 1_1, 2_1, 3_1, 4_1, and 5_1 are allocated to translate back task 1_3 intermediate result partitions R1-3_1 through R1-3_4 and DT execution modules 1_2, 2_2, 6_1, 7_1, and 7_2 are allocated to translate back task 1_3 intermediate result partitions R1-3_5 through R1-3_z to produce task 1-4 intermediate results (R1-4, which is the translated back data).

Task 1_5 (e.g., compare data and translated data to identify translation errors) is ordered after task 1_4 and is to be executed on task 1_4's intermediate results (R4-1) and on the data. DT execution modules 1_1, 2_1, 3_1, 4_1, and 5_1 are allocated to compare the data partitions (2_1 through 2_z) with partitions of task 1-4 intermediate results partitions R1-4_1 through R1-4_z to produce task 1_5 intermediate results (R1-5, which is the list words translated incorrectly).

Task 1_6 (e.g., determine non-word translation errors) is ordered after tasks 1_1 and 1_5 and is to be executed on tasks 1_1's and 1_5's intermediate results (R1-1 and R1-5). DT execution modules 1_1, 2_1, 3_1, 4_1, and 5_1 are allocated to compare the partitions of task 1_1 intermediate results (R1-1_1 through R1-1_z) with partitions of task 1-5 intermediate results partitions (R1-5_1 through R1-5_z) to produce task 1_6 intermediate results (R1-6, which is the list translation errors due to non-words).

Task 1_7 (e.g., determine words correctly translated) is ordered after tasks 1_2 and 1_5 and is to be executed on tasks 1_2's and 1_5's intermediate results (R1-1 and R1-5). DT execution modules 1_2, 2_2, 3_2, 4_2, and 5_2 are allocated to compare the partitions of task 1_2 intermediate results (R1-2_1 through R1-2_z) with partitions of task 1-5 intermediate results partitions (R1-5_1 through R1-5_z) to produce task 1_7 intermediate results (R1-7, which is the list of correctly translated words).

Task 2 (e.g., find specific words and/or phrases) has no task ordering (i.e., is independent of the results of other sub-tasks), is to be performed on data partitions 2_1 through 2_z by DT execution modules 3_1, 4_1, 5_1, 6_1, and 7_1. For instance, DT execution modules 3_1, 4_1, 5_1, 6_1, and 7_1 search for specific words and/or phrases in data partitions 2_1 through 2_z to produce task 2 intermediate results (R2, which is a list of specific words and/or phrases).

Task 3_2 (e.g., find specific translated words and/or phrases) is ordered after task 1_3 (e.g., translate) is to be performed on partitions R1-3_1 through R1-3_z by DT execution modules 1_2, 2_2, 3_2, 4_2, and 5_2. For instance, DT execution modules 1_2, 2_2, 3_2, 4_2, and 5_2 search for specific translated words and/or phrases in the partitions of the translated data (R1-3_1 through R1-3_z) to produce task 3_2 intermediate results (R3-2, which is a list of specific translated words and/or phrases).

For each task, the intermediate result information indicates which DST unit is responsible for overseeing execution of the task and, if needed, processing the partial results generated by the set of allocated DT execution units.

In addition, the intermediate result information indicates a scratch pad memory for the task and where the corresponding intermediate results are to be stored. For example, for intermediate result R1-1 (the intermediate result of task 1_1), DST unit 1 is responsible for overseeing execution of the task 1_1 and coordinates storage of the intermediate result as encoded intermediate result slices stored in memory of DST execution units 1-5. In general, the scratch pad is for storing non-DS encoded intermediate results and the intermediate result storage is for storing DS encoded intermediate results.

FIGS. 33-38 are schematic block diagrams of the distributed storage and task network (DSTN) module performing the example of FIG. 30. In FIG. 33, the DSTN module accesses the data 92 and partitions it into a plurality of partitions 1-z in accordance with distributed storage and task network (DST) allocation information. For each data partition, the DSTN identifies a set of its DT (distributed task) execution modules 90 to perform the task (e.g., identify non-words (i.e., not in a reference dictionary) within the data partition) in accordance with the DST allocation information. From data partition to data partition, the set of DT execution modules 90 may be the same, different, or a combination thereof (e.g., some data partitions use the same set while other data partitions use different sets).

For the first data partition, the first set of DT execution modules (e.g., 1_1, 2_1, 3_1, 4_1, and 5_1 per the DST allocation information of FIG. 32) executes task 1_1 to produce a first partial result 102 of non-words found in the first data partition. The second set of DT execution modules (e.g., 1_1, 2_1, 3_1, 4_1, and 5_1 per the DST allocation information of FIG. 32) executes task 1_1 to produce a second partial result 102 of non-words found in the second data partition. The sets of DT execution modules (as per the DST allocation information) perform task 1_1 on the data partitions until the "z" set of DT execution modules performs task 1_1 on the "zth" data partition to produce a "zth" partial result 102 of non-words found in the "zth" data partition.

As indicated in the DST allocation information of FIG. 32, DST execution unit 1 is assigned to process the first through "zth" partial results to produce the first intermediate result (R1-1), which is a list of non-words found in the data. For instance, each set of DT execution modules 90 stores its respective partial result in the scratchpad memory of DST execution unit 1 (which is identified in the DST allocation or may be determined by DST execution unit 1). A processing module of DST execution 1 is engaged to aggregate the first through "zth" partial results to produce the first intermediate result (e.g., R1_1). The processing module stores the first intermediate result as non-DS error encoded data in the scratchpad memory or in another section of memory of DST execution unit 1.

DST execution unit 1 engages its DST client module to slice grouping based DS error encode the first intermediate result (e.g., the list of non-words). To begin the encoding, the DST client module determines whether the list of non-words is of a sufficient size to partition (e.g., greater than a Terabyte). If yes, it partitions the first intermediate result (R1-1) into a plurality of partitions (e.g., R1-1_1 through R1-1_m). If the first intermediate result is not of sufficient size to partition, it is not partitioned.

For each partition of the first intermediate result, or for the first intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

In FIG. 34, the DSTN module is performing task 1_2 (e.g., find unique words) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_2 in accordance with the DST allocation information. From data partition to data partition, the set of DT execution modules may be the same, different, or a combination thereof. For the data partitions, the allocated set of DT execution modules executes task 1_2 to produce a partial results (e.g., $1^{st}$ through "zth") of unique words found in the data partitions.

As indicated in the DST allocation information of FIG. 32, DST execution unit 1 is assigned to process the first through "zth" partial results 102 of task 1_2 to produce the second intermediate result (R1-2), which is a list of unique words found in the data 92. The processing module of DST execution 1 is engaged to aggregate the first through "zth" partial results of unique words to produce the second intermediate result. The processing module stores the second intermediate result as non-DS error encoded data in the scratchpad memory or in another section of memory of DST execution unit 1.

DST execution unit 1 engages its DST client module to slice grouping based DS error encode the second intermediate result (e.g., the list of non-words). To begin the encoding, the DST client module determines whether the list of unique words is of a sufficient size to partition (e.g., greater than a Terabyte). If yes, it partitions the second intermediate result (R1-2) into a plurality of partitions (e.g., R1-2_1 through R1-2_m). If the second intermediate result is not of sufficient size to partition, it is not partitioned.

For each partition of the second intermediate result, or for the second intermediate results, the DST client module uses the DS error encoding parameters of the data (e.g., DS parameters of data 2, which includes 3/5 decode threshold/ pillar width ratio) to produce slice groupings. The slice groupings are stored in the intermediate result memory (e.g., allocated memory in the memories of DST execution units 1-5).

In FIG. 35, the DSTN module is performing task 1_3 (e.g., translate) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_3 in accordance with the DST allocation information (e.g., DT execution modules 1_1, 2_1, 3_1, 4_1, and 5_1 translate data partitions 2_1 through 2_4 and DT execution modules 1_2, 2_2, 3_2, 4_2, and 5_2 translate data partitions 2_5 through 2_z). For the data partitions, the allocated set of DT execution modules 90 executes task 1_3 to produce partial results 102 (e.g., $1^{st}$ through "zth") of translated data.

As indicated in the DST allocation information of FIG. 32, DST execution unit 2 is assigned to process the first through "zth" partial results of task 1_3 to produce the third intermediate result (R1-3), which is translated data. The processing module of DST execution 2 is engaged to aggregate the first through "zth" partial results of translated data to produce the third intermediate result. The processing module stores the third intermediate result as non-DS error encoded data in the scratchpad memory or in another section of memory of DST execution unit 2.

DST execution unit 2 engages its DST client module to slice grouping based DS error encode the third intermediate result (e.g., translated data). To begin the encoding, the DST client module partitions the third intermediate result (R1-3) into a plurality of partitions (e.g., R1-3_1 through R1-3_y). For each partition of the third intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is further shown in FIG. 35, the DSTN module is performing task 1_4 (e.g., retranslate) on the translated data of the third intermediate result. To begin, the DSTN module accesses the translated data (from the scratchpad memory or from the intermediate result memory and decodes it) and partitions it into a plurality of partitions in accordance with the DST allocation information. For each partition of the third intermediate result, the DSTN identifies a set of its DT execution modules 90 to perform task 1_4 in accordance with the DST allocation information (e.g., DT execution modules 1_1, 2_1, 3_1, 4_1, and 5_1 are allocated to translate back partitions R1-3_1 through R1-3_4 and DT execution modules 1_2, 2_2, 6_1, 7_1, and 7_2 are allocated to translate back partitions R1-3_5 through R1-3_z). For the partitions, the allocated set of DT execution modules executes task 1_4 to produce partial results 102 (e.g., $1^{st}$ through "zth") of re-translated data.

As indicated in the DST allocation information of FIG. 32, DST execution unit 3 is assigned to process the first through "zth" partial results of task 1_4 to produce the fourth intermediate result (R1-4), which is retranslated data. The processing module of DST execution 3 is engaged to aggregate the first through "zth" partial results of retranslated data to produce the fourth intermediate result. The processing module stores the fourth intermediate result as non-DS error encoded data in the scratchpad memory or in another section of memory of DST execution unit 3.

DST execution unit 3 engages its DST client module to slice grouping based DS error encode the fourth intermediate result (e.g., retranslated data). To begin the encoding, the DST client module partitions the fourth intermediate result (R1-4) into a plurality of partitions (e.g., R1-4_1 through R1-4_z). For each partition of the fourth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

Figure 36:
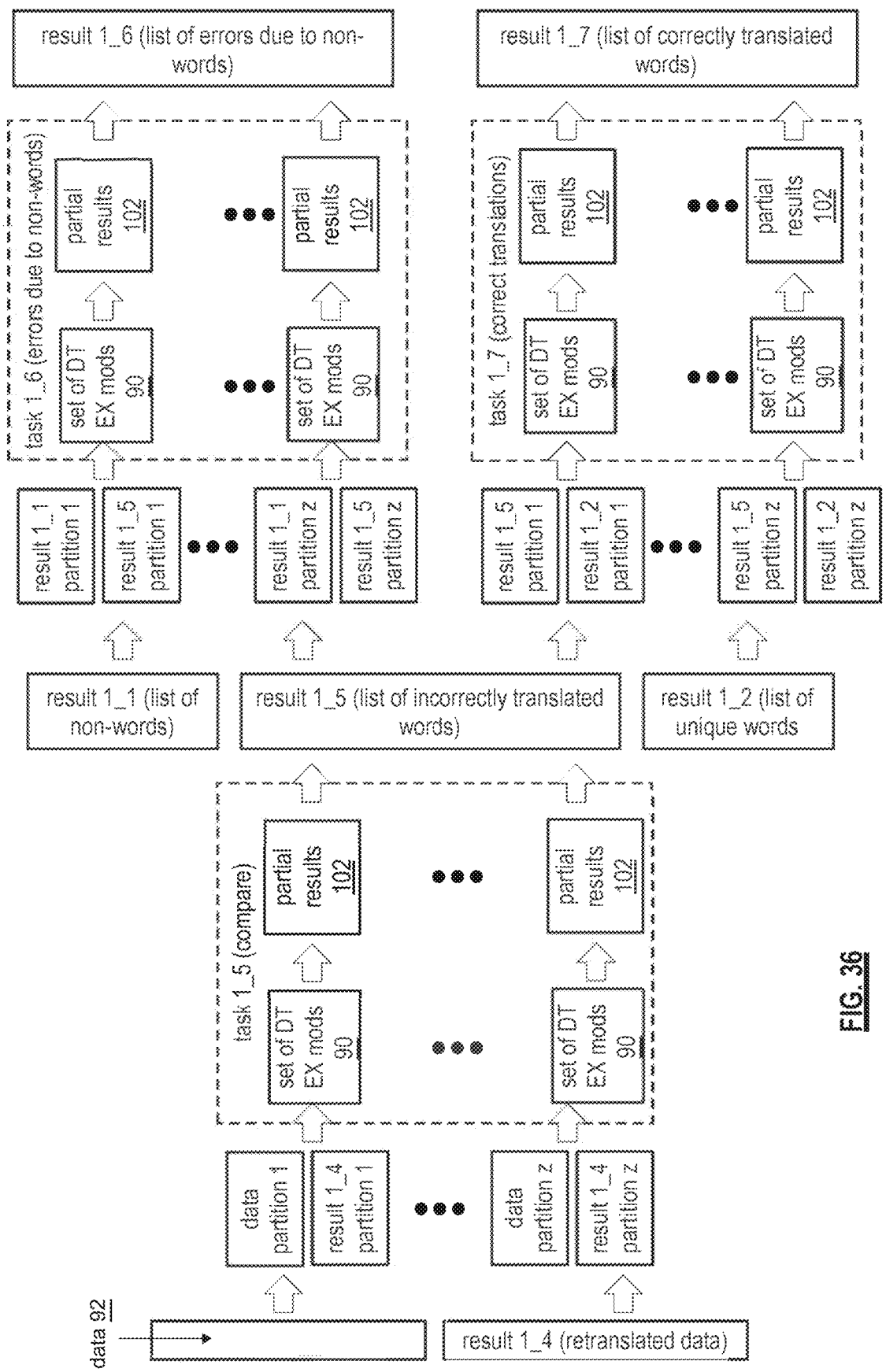

In FIG. 36, a distributed storage and task network (DSTN) module is performing task 1_5 (e.g., compare) on data 92 and retranslated data of FIG. 35. To begin, the DSTN module accesses the data 92 and partitions it into a plurality of partitions in accordance with the DST allocation information or it may use the data partitions of task 1_1 if the partitioning is the same. The DSTN module also accesses the retranslated data from the scratchpad memory, or from the intermediate result memory and decodes it, and partitions it into a plurality of partitions in accordance with the DST allocation information. The number of partitions of the retranslated data corresponds to the number of partitions of the data.

For each pair of partitions (e.g., data partition 1 and retranslated data partition 1), the DSTN identifies a set of its DT execution modules 90 to perform task 1_5 in accordance with the DST allocation information (e.g., DT execution modules 1_1, 2_1, 3_1, 4_1, and 5_1). For each pair of partitions, the allocated set of DT execution modules executes task 1_5 to produce partial results 102 (e.g., $1^{st}$ through "zth") of a list of incorrectly translated words and/or phrases.

As indicated in the DST allocation information of FIG. 32, DST execution unit 1 is assigned to process the first through "zth" partial results of task 1_5 to produce the fifth intermediate result (R1-5), which is the list of incorrectly translated words and/or phrases. In particular, the processing module of DST execution 1 is engaged to aggregate the first through "zth" partial results of the list of incorrectly translated words and/or phrases to produce the fifth intermediate result. The processing module stores the fifth intermediate result as non-DS error encoded data in the scratchpad memory or in another section of memory of DST execution unit 1.

DST execution unit 1 engages its DST client module to slice grouping based DS error encode the fifth intermediate result. To begin the encoding, the DST client module partitions the fifth intermediate result (R1-5) into a plurality of partitions (e.g., R1-5_1 through R1-5_z). For each partition of the fifth intermediate result, the DST client module uses the DS error encoding parameters of the data (e.g., DS parameters of data 2, which includes ⅗ decode threshold/pillar width ratio) to produce slice groupings. The slice groupings are stored in the intermediate result memory (e.g., allocated memory in the memories of DST execution units 1-5 per the DST allocation information).

As is further shown in FIG. 36, the DSTN module is performing task 1_6 (e.g., translation errors due to non-words) on the list of incorrectly translated words and/or phrases (e.g., the fifth intermediate result R1-5) and the list of non-words (e.g., the first intermediate result R1-1). To begin, the DSTN module accesses the lists and partitions them into a corresponding number of partitions.

For each pair of partitions (e.g., partition R1-1_1 and partition R1-5_1), the DSTN identifies a set of its DT execution modules 90 to perform task 1_6 in accordance with the DST allocation information (e.g., DT execution modules 1_1, 2_1, 3_1, 4_1, and 5_1). For each pair of partitions, the allocated set of DT execution modules executes task 1_6 to produce partial results 102 (e.g., $1^{st}$ through "zth") of a list of incorrectly translated words and/or phrases due to non-words.

As indicated in the DST allocation information of FIG. 32, DST execution unit 2 is assigned to process the first through "zth" partial results of task 1_6 to produce the sixth intermediate result (R1-6), which is the list of incorrectly translated words and/or phrases due to non-words. In particular, the processing module of DST execution 2 is engaged to aggregate the first through "zth" partial results of the list of incorrectly translated words and/or phrases due to non-words to produce the sixth intermediate result. The processing module stores the sixth intermediate result as non-DS error encoded data in the scratchpad memory or in another section of memory of DST execution unit 2.

DST execution unit 2 engages its DST client module to slice grouping based DS error encode the sixth intermediate result. To begin the encoding, the DST client module partitions the sixth intermediate result (R1-6) into a plurality of partitions (e.g., R1-6_1 through R1-6_z). For each partition of the sixth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is still further shown in FIG. 36, the DSTN module is performing task 1_7 (e.g., correctly translated words and/or phrases) on the list of incorrectly translated words and/or phrases (e.g., the fifth intermediate result R1-5) and the list of unique words (e.g., the second intermediate result R1-2). To begin, the DSTN module accesses the lists and partitions them into a corresponding number of partitions.

For each pair of partitions (e.g., partition R1-2_1 and partition R1-5_1), the DSTN identifies a set of its DT execution modules 90 to perform task 17 in accordance with the DST allocation information (e.g., DT execution modules 1_2, 2_2, 3_2, 4_2, and 5_2). For each pair of partitions, the allocated set of DT execution modules executes task 1_7 to produce partial results 102 (e.g., $1^{st}$ through "zth") of a list of correctly translated words and/or phrases.

As indicated in the DST allocation information of FIG. 32, DST execution unit 3 is assigned to process the first through "zth" partial results of task 1_7 to produce the seventh intermediate result (R1-7), which is the list of correctly translated words and/or phrases. In particular, the processing module of DST execution 3 is engaged to aggregate the first through "zth" partial results of the list of correctly translated words and/or phrases to produce the seventh intermediate result. The processing module stores the seventh intermediate result as non-DS error encoded data in the scratchpad memory or in another section of memory of DST execution unit 3.

DST execution unit 3 engages its DST client module to slice grouping based DS error encode the seventh intermediate result. To begin the encoding, the DST client module partitions the seventh intermediate result (R1-7) into a plurality of partitions (e.g., R1-7_1 through R1-7_z). For each partition of the seventh intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

In FIG. 37, the distributed storage and task network (DSTN) module is performing task 2 (e.g., find specific words and/or phrases) on the data 92. To begin, the DSTN module accesses the data and partitions it into a plurality of partitions 1-z in accordance with the DST allocation information or it may use the data partitions of task 1_1 if the partitioning is the same. For each data partition, the DSTN identifies a set of its DT execution modules 90 to perform task 2 in accordance with the DST allocation information. From data partition to data partition, the set of DT execution modules may be the same, different, or a combination thereof. For the data partitions, the allocated set of DT execution modules executes task 2 to produce partial results 102 (e.g., $1^{st}$ through "zth") of specific words and/or phrases found in the data partitions.

As indicated in the DST allocation information of FIG. 32, DST execution unit 7 is assigned to process the first through "zth" partial results of task 2 to produce task 2 intermediate result (R2), which is a list of specific words and/or phrases found in the data. The processing module of DST execution 7 is engaged to aggregate the first through "zth" partial results of specific words and/or phrases to produce the task 2 intermediate result. The processing module stores the task 2 intermediate result as non-DS error encoded data in the scratchpad memory or in another section of memory of DST execution unit 7.

DST execution unit 7 engages its DST client module to slice grouping based DS error encode the task 2 intermediate result. To begin the encoding, the DST client module determines whether the list of specific words and/or phrases is of a sufficient size to partition (e.g., greater than a Terabyte). If yes, it partitions the task 2 intermediate result (R2) into a plurality of partitions (e.g., R2_1 through R2_m). If the task 2 intermediate result is not of sufficient size to partition, it is not partitioned.

For each partition of the task 2 intermediate result, or for the task 2 intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-4, and 7).

In FIG. 38, the distributed storage and task network (DSTN) module is performing task 3 (e.g., find specific translated words and/or phrases) on the translated data (R1-3). To begin, the DSTN module accesses the translated data (from the scratchpad memory or from the intermediate result memory and decodes it) and partitions it into a plurality of partitions in accordance with the DST allocation information. For each partition, the DSTN identifies a set of its DT execution modules to perform task 3 in accordance with the DST allocation information. From partition to partition, the set of DT execution modules may be the same, different, or a combination thereof. For the partitions, the allocated set of DT execution modules 90 executes task 3 to produce partial results 102 (e.g., $1^{st}$ through "zth") of specific translated words and/or phrases found in the data partitions.

As indicated in the DST allocation information of FIG. 32, DST execution unit 5 is assigned to process the first through "zth" partial results of task 3 to produce task 3 intermediate result (R3), which is a list of specific translated words and/or phrases found in the translated data. In particular, the processing module of DST execution 5 is engaged to aggregate the first through "zth" partial results of specific translated words and/or phrases to produce the task 3 intermediate result. The processing module stores the task 3 intermediate result as non-DS error encoded data in the scratchpad memory or in another section of memory of DST execution unit 7.

DST execution unit 5 engages its DST client module to slice grouping based DS error encode the task 3 intermediate result. To begin the encoding, the DST client module determines whether the list of specific translated words and/or phrases is of a sufficient size to partition (e.g., greater than a Terabyte). If yes, it partitions the task 3 intermediate result (R3) into a plurality of partitions (e.g., R3_1 through R3_m).

If the task 3 intermediate result is not of sufficient size to partition, it is not partitioned.

For each partition of the task 3 intermediate result, or for the task 3 intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-4, 5, and 7).

FIG. 39 is a diagram of an example of combining result information into final results 104 for the example of FIG. 30. In this example, the result information includes the list of specific words and/or phrases found in the data (task 2 intermediate result), the list of specific translated words and/or phrases found in the data (task 3 intermediate result), the list of non-words found in the data (task 1 first intermediate result R1-1), the list of unique words found in the data (task 1 second intermediate result R1-2), the list of translation errors due to non-words (task 1 sixth intermediate result R1-6), and the list of correctly translated words and/or phrases (task 1 seventh intermediate result R1-7). The task distribution module provides the result information to the requesting DST client module as the results 104.

FIGS. 40A-B are schematic block diagrams of an embodiment of a dispersed storage network (DSN) that includes the distributed storage and task (DST) processing unit 16 of FIG. 1, the network 24 of FIG. 1, and at least two DST execution (EX) unit sets 1-2. Each DST execution unit set includes a set of DST execution units 1-n. Hereafter, the at least two DST execution unit sets 1-2 may be interchangeably referred to as a DSN memory. Each DST execution unit set may be affiliated with a unique storage vault, where a storage vault is a virtual storage entity associated with one or more DSN users. Each DST execution unit may be implemented utilizing the DST execution unit 36 of FIG. 1.

Each DST execution unit may be affiliated with storage characteristics. The storage characteristics includes one or more of a memory type, a storage performance level, a storage reliability level, communication link data rate, and a storage availability level. As such, each storage vault may be affiliated with one or more storage characteristics and as such, may be utilized for storage of data in alignment with desired storage characteristics. For example, a first storage vault associated with the DST execution unit set 1 is associated with faster than average storage latency when the DST execution unit set 1 includes DST execution units 1-n that are associated with storage characteristics of a faster than average storage performance level (e.g., faster memory and faster communication links to the DST processing unit 16). As another example, a second storage vault associated with the DST execution unit set 2 is associated with higher than average storage reliability when the DST execution unit set 2 includes DST execution units 1-n that are associated with storage characteristics of a higher than average storage reliability level. The DSN functions to store a data object 368.

FIG. 40A illustrates steps of an example of operation of the storing of the data where the DST processing unit 16 receives the data object 368 for storage in the DSN memory. Having received the data object 368, the DST processing unit 16 determines dispersed storage error encoding parameters for encoding the data object into a plurality of sets of encoded data slices. Having produced the plurality of sets of encoded data slices, the DST processing unit 16 determines to use a dual storage path approach for storing the plurality of sets of encoded data slices in a first memory type of the DSN memory (e.g., the DST execution units at 1) and in a second memory type of the DSN memory (e.g., the DST execution unit set 2) when a cumulative time difference between storing the plurality of sets of encoded data slices in the first memory type and the second memory type is equal to or greater than a storage time difference threshold, where the first memory type being memory coupled to the DST processing unit 16 (e.g., a computing device) via a first communication link (e.g., a high-speed local area network when the DST processing unit 16 and the DST execution unit set are co-located), and where the second memory type being memory coupled to the computing devices via a second communication link (e.g., the network 24), where the first communication link has a higher data rate than the second communication link (e.g., the local area network is faster than the network 24). The first memory type being memory having a first memory access rate and the second memory type being memory having a second memory access rate, where the first memory access rate is greater than the second memory access rate.

As a specific example of determining to use the dual storage path approach, the DST processing unit 16 estimates a first storage time for storing the plurality of sets of encoded data slices in the first memory type of the DSN memory, estimates a second storage time for storing the plurality of sets of encoded data slices in the second memory type of the DSN memory, where, on a set of encoded data slices basis, the first memory type has a faster access time than the second memory type. When the estimated second storage time is equal to or greater than the estimated first storage time by the storage time difference threshold, the DST processing unit 16 determines to use the dual storage path approach for storing the plurality of encoded data slices in the first memory type and in the second memory type.

Having determined to use the dual storage path approach, the DST processing unit 16 dispersed storage error encodes the data object 368 to produce the plurality of sets of encoded data slices (e.g., slices 1-n for each set). Having produced the plurality of sets of encoded data slices, the DST processing unit 16 outputs the plurality of sets of encoded data slices to the first type of memory of the DSN memory in accordance with a first parameter set of the dispersed storage error encoding parameters. For example, the DST processing unit 16 sends the plurality of sets of encoded data slices 1-n to the DST execution units 1-n of the DST execution unit set 1 for storage. Having produced the plurality of sets of encoded data slices, the DST processing unit further outputs the plurality of sets of encoded data slices to the second type of memory of the DSN memory in accordance with a second parameter set of the dispersed storage error encoding parameters. For example, the DST processing unit 16 initiates sending, via the network 24, the plurality of sets of encoded data slices 1-n to the DST execution units 1-n of the DST execution unit set 2 for storage.

The DST processing unit 16 may establish the first and second parameter sets of the dispersed storage error encoding parameters utilizing a variety of approaches. In a first approach of establishing the first and second parameter sets of the dispersed storage error encoding parameters, the first parameter set of the dispersed storage error encoding parameters includes a decode threshold number (e.g., k), a set total number (e.g., n), and a first write threshold number (e.g., k+1), where the decode threshold number corresponds to a minimum number of encoded data slices of a set of encoded data slices needed to recover a corresponding data segment of the data object, the set total number corresponds to a total number of encoded data slices in the set of encoded data slices, and the first write threshold number corresponds to a first number of encoded data slices of the set of encoded data slices that needs to be successfully stored for the set of encoded data slices to be deemed successfully stored in the first memory type. The first approach further includes the second parameter set of the dispersed storage error encoding parameters including the decode threshold number (e.g., k), the set total number (e.g., n), and a second write threshold number (e.g., k+2), where the second write threshold number corresponds to a second number of encoded data slices of the set of encoded data slices that needs to be successfully stored for the set of encoded data slices to be deemed successfully stored in the second memory type, where the second write threshold is a greater number than the first write threshold.

In a second approach of establishing the first and second parameter sets of the dispersed storage error encoding parameters, the first parameter set of the dispersed storage error encoding parameters include the decode threshold number (e.g., k), a first set total number (e.g., n), and the first write threshold number (e.g., k+1), where the decode threshold number corresponds to the minimum number of encoded data slices of a set of encoded data slices needed to recover a corresponding data segment of the data object, the first set total number corresponds to a first total number of encoded data slices in the set of encoded data slices, and the first write threshold number corresponds to a first number of encoded data slices of the set of encoded data slices that needs to be successfully stored for the set of encoded data slices to be deemed successfully stored in the first memory type. The second approach further includes the second parameter set of the dispersed storage error encoding parameters including the decode threshold number (e.g., k), a second set total number (e.g., m), and the second write threshold number (e.g., k+2), where the second set total number corresponds to a second total number of encoded data slices in the set of encoded data slices and the second write threshold number corresponds to a second number of encoded data slices of the set of encoded data slices that needs to be successfully stored for the set of encoded data slices to be deemed successfully stored in the second memory type, where the second write threshold is a greater number than the first write threshold and the second set total number is a greater number than the first set total number (e.g., m>n).

The outputting the plurality of sets of encoded data slices to the first and second types of memory of the DSN memory further includes the DST processing unit 16 generating a plurality of sets of slices names for the plurality of sets of encoded data slices, generating a first plurality of DSN addresses to include the plurality of sets of slices names and first DSN identifiers of storage units of the first memory type, and generating a second plurality of DSN addresses to include the plurality of sets of slices names and second DSN identifiers of storage units of the second memory type. Having generated the first and second plurality of DSN addresses, the DST processing unit 16 outputs, in accordance with the first plurality of DSN addresses, the plurality of sets of encoded data slices to the first type of memory (e.g., utilizing Internet protocol addresses of DST execution units of the DST execution unit set 1), and outputs, in accordance with the second plurality of DSN addresses, the plurality of sets of encoded data slices to the second type of memory (e.g., utilizing Internet protocol addresses of DST execution units of the DST execution unit set 2).

FIG. 40B illustrates further steps of the example of operation of the storing of the data where, when the plurality of sets of encoded data slices have been successfully stored in the second memory type (e.g., in the DST execution unit set 2), the DST processing unit 16 facilitates deleting encoded data slices from the first memory type such that, for each set of the plurality of sets of encoded data slices, the first memory type is storing a decode threshold number of encoded data slices. For example, the DST processing unit 16 receives, via the network 24, a write threshold number of write slice responses 1-WT from the DST execution units of the DST execution unit set 2 indicating the successful storage of the plurality of sets of encoded data slices in the second memory type (e.g., in the DST execution unit set 2), and issues a delete slice requests k+1 through n to the DST execution units k+1 through n to facilitate deleting, for each set of encoded data slices of the plurality sets of encoded data slices, encoded data slices k+1 through n such that a decode threshold number of encoded data slices 1-k remaining stored in the DST execution units 1-k of the DST execution unit set 1 to facilitate subsequent access of the stored data object 368 while providing a storage efficiency improvement to the DSN.

FIG. 40C is a flowchart illustrating an example of storing data. In particular, a method is presented for use in conjunction with one or more functions and features described in conjunction with FIGS. 1-39, 40A-B, and also FIG. 40C. The method includes step 370 where a processing module of a computing device of one or more computing devices of a dispersed storage network (DSN) receives a data object for storage in DSN memory. The method continues at step 372 where the processing module determines dispersed storage error encoding parameters for encoding the data object into a plurality of sets of encoded data slices.

The method continues at step 374 where the processing module determines to use a dual storage path approach for storing the plurality of sets of encoded data slices in a first memory type of the DSN memory and in a second memory type of the DSN memory when a cumulative time difference between storing the plurality of sets of encoded data slices in the first memory type and the second memory type is equal to or greater than a storage time difference threshold. The first memory type being memory coupled to the computing device via a first communication link and the second memory type being memory coupled to the computing devices via a second communication link, where the first communication link has a higher data rate than the second communication link. The first memory type being memory having a first memory access rate and the second memory type being memory having a second memory access rate, where the first memory access rate is greater than the second memory access rate.

As an example of determining to use the dual storage path approach, the processing module estimates a first storage time for storing the plurality of sets of encoded data slices in the first memory type of the DSN memory, estimates a second storage time for storing the plurality of sets of encoded data slices in the second memory type of the DSN memory, where, on a set of encode data slices basis, the first memory type has a faster access time than the second memory type. When the estimated second storage time is equal to or greater than the estimated first storage time by the storage time difference threshold, a processing module determines to use the dual storage path approach for storing the plurality of encoded data slices in the first memory type and in the second memory type.

The method continues at step 376 where the processing module dispersed storage error encodes the data object to produce the plurality of sets of encoded data slices. The method continues at step 378 where the processing module outputs the plurality of sets of encoded data slices to the first type of memory of the DSN memory in accordance with a first parameter set of the dispersed storage error encoding parameters. The method continues at step 380 where the processing module outputs the plurality of sets of encoded data slices to the second type of memory of the DSN memory in accordance with a second parameter set of the dispersed storage error encoding parameters. The processing module may establish the first and second parameter sets of the dispersed storage error encoding parameters utilizing a variety of approaches. In a first approach of establishing the first and second parameter sets of the dispersed storage error encoding parameters, the first parameter set of the dispersed storage error encoding parameters includes a decode threshold number, a set total number, and a first write threshold number, where the decode threshold number corresponds to a minimum number of encoded data slices of a set of encoded data slices needed to recover a corresponding data segment of the data object, the set total number corresponds to a total number of encoded data slices in the set of encoded data slices, and the first write threshold number corresponds to a first number of encoded data slices of the set of encoded data slices that needs to be successfully stored for the set of encoded data slices to be deemed successfully stored in the first memory type. The first approach further includes the second parameter set of the dispersed storage error encoding parameters including the decode threshold number, the set total number, and a second write threshold number, where the second write threshold number corresponds to a second number of encoded data slices of the set of encoded data slices that needs to be successfully stored for the set of encoded data slices to be deemed successfully stored in the second memory type, where the second write threshold is a greater number than the first write threshold.

In a second approach of establishing the first and second parameter sets of the dispersed storage error encoding parameters, the first parameter set of the dispersed storage error encoding parameters includes a decode threshold number, a first set total number, and a first write threshold number, where the decode threshold number corresponds to a minimum number of encoded data slices of a set of encoded data slices needed to recover a corresponding data segment of the data object, the first set total number corresponds to a first total number of encoded data slices in the set of encoded data slices, and the first write threshold number corresponds to a first number of encoded data slices of the set of encoded data slices that needs to be successfully stored for the set of encoded data slices to be deemed successfully stored in the first memory type. The second approach further includes the second parameter set of the dispersed storage error encoding parameters including the decode threshold number, a second set total number, and a second write threshold number, where the second set total number corresponds to a second total number of encoded data slices in the set of encoded data slices and the second write threshold number corresponds to a second number of encoded data slices of the set of encoded data slices that needs to be successfully stored for the set of encoded data slices to be deemed successfully stored in the second memory type, where the second write threshold is a greater number than the first write threshold and the second set total number is a greater number than the first set total number.

The outputting the plurality of sets of encoded data slices to the first and second types of memory of the DSN memory includes generating a plurality of sets of slices names for the plurality of sets of encoded data slices, generating a first plurality of DSN addresses to include the plurality of sets of slices names and first DSN identifiers of storage units of the first memory type, generating a second plurality of DSN addresses to include the plurality of sets of slices names and second DSN identifiers of storage units of the second memory type, outputting, in accordance with the first plurality of DSN addresses, the plurality of sets of encoded data slices to the first type of memory, and outputting, in accordance with the second plurality of DSN addresses, the plurality of sets of encoded data slices to the second type of memory.

When the plurality of sets of encoded data slices have been successfully stored in the second memory type, the method continues at step 382 where the processing module deletes encoded data slices from the first memory type such that, for each set of the plurality of sets of encoded data slices, the first memory type is storing a decode threshold number of encoded data slices. For example, the processing module issues delete slice requests to the first memory type to delete all but the decode threshold number of encoded data slices for each set of the plurality of sets of encoded data slices.

The method described above in conjunction with the processing module can alternatively be performed by other modules of the dispersed storage network or by other devices. In addition, at least one memory section (e.g., a non-transitory computer readable storage medium) that stores operational instructions can, when executed by one or more processing modules of one or more computing devices of the dispersed storage network (DSN), cause the one or more computing devices to perform any or all of the method steps described above.

Alternatively, or in addition to, the processing module facilitates retrieval of the data object by at least one of recovery of at least some of the remaining encoded data slices stored in the first memory type and recovery of any decode threshold number of encoded data slices of each set of the second plurality of sets of encoded data slices from the second memory type. For example, the processing module recovers the data object from the first memory type when at least the decode threshold number of encoded data slices are available from the first memory type for each set of the plurality of sets of encoded data slices. As another example, the processing module recovers the data object from the second memory type when the data object is not available from the first memory type.

FIGS. 41A-B are schematic block diagrams of another embodiment of a dispersed storage network (DSN) that includes the distributed storage and task (DST) processing unit 16 of FIG. 1, the network 24 of FIG. 1, and at least two DST execution (EX) unit sets 1-2. Each DST execution unit set includes a set of DST execution units 1-n, where each DST execution unit is associated with storage of a unique encoded data slice of a set of n encoded data slices for storage in each set of DST execution units 1-n in accordance with a dispersed storage error coding function, and where dispersal parameters associated with the dispersed storage error coding function includes one or more of an information dispersal algorithm (IDA) width=n, a read threshold number, and a decode threshold number=k. For example, each DST execution unit set 1-2 includes DST execution units 1-8 when the dispersal parameters includes a common IDA width of n=8, a read threshold of 6, and a decode threshold of k=5.

Each DST execution unit set may be affiliated with a unique storage vault, where a storage vault is a virtual storage entity associated with one or more DSN users. For example, the DST execution unit set 1 is affiliated with a first storage vault and the DST execution unit set 2 is affiliated with a second storage vault. Each DST execution unit may be implemented utilizing the DST execution unit 36 of FIG. 1. The DSN functions to store data.

FIG. 41A illustrates steps of an example of operation of the storing of the data where the DST processing unit 16 dispersed storage error encodes the data utilizing the dispersed storage error coding function in accordance with the dispersal parameters common to the at least two storage vaults to produce a plurality of sets of encoded data slices. Having produced the plurality of sets of encoded data slices, the DST processing unit 16 facilitates storage of the plurality of sets of encoded data slices in each of the at least two storage vaults in accordance with a first storage mode, where a storage mode indicates which encoded data slices are to be stored in which DST execution units. For example, the first storage mode includes an indication that encoded data slices 1-8 are to be stored in DST execution units 1-8 in each of the storage vaults 1-2 (e.g., encoded data slice 1 stored in DST execution unit 1, encoded data slice 2 stored in the DST execution unit 2, etc.). The facilitating includes issuing, via the network 24, one or more sets of write slice requests to each DST execution unit set, where the one or more sets of write slice requests includes the plurality of sets of encoded data slices.

Having stored the plurality of sets of encoded data slices in each of the at least two storage vaults, when detecting a subsequent storage error associated with a given storage vault, the DST processing unit 16 generates a corresponding rebuilt encoded data slice to abate the storage error in accordance with the first storage mode. The detecting includes at least one of identifying a missing encoded data slice, identifying a corrupted slice, interpreting an error message, and receiving a rebuilding request.

The generating includes at least one of retrieving a corresponding stored encoded data slice from another storage vault and dispersed storage error encoding a recovered data segment that corresponds to the storage error to produce the rebuilt encoded data slice. As a specific example, the DST processing unit 16 retrieves encoded data slice 3 from the DST execution unit 3 of the DST execution unit set 2 when encoded data slice 3 of the DST execution unit 3 of the DST execution unit set 1 is associated with the storage error. As another specific example, the DST processing unit 16 retrieves a decode threshold number of unique encoded data slices of the set of encoded data slices from one or more of the DST execution unit sets 1-2, dispersed storage error decodes the retrieved encoded number of unique encoded data slices to produce the recovered data segment, and dispersed storage error encodes the recovered data segment to produce a rebuilt encoded data slice 3.

FIG. 41B illustrates further steps of the example of operation of the storing of the data where the DST processing unit 16 invokes a storage mode transition from the first storage mode to a second storage mode. The detecting may be based on one or more of detecting that a timeframe associated with the first storage mode has expired, interpreting a schedule, interpreting an error message, detecting that a data access frequency level is less than a low data access frequency threshold level, and receiving a request. As a specific example, the DST processing unit 16 invokes the second storage mode when detecting that a 10 day timeframe has expired since the initial storage of the data.

Having invoked the storage mode transition, the DST processing unit 16 determines a slice storage pattern in accordance with the second storage mode. The determining includes one or more of interpreting a request, interpreting system registry information, selecting based on the access frequency level, and interpreting a storage requirement. The slice storage patterns includes, for each set of encoded data slices, a total number of allowed encoded data slices and which encoded data slices are to be stored in which DST execution units (e.g., maintain a read threshold number in total between the two storage vaults).

Having determined the slice storage pattern, the DST processing unit 16 facilitates maintenance of stored encoded data slices in accordance with the determined slice storage pattern. For example, the facilitating includes identifying encoded data slices for deletion in accordance with the slice storage pattern and issuing delete slice requests to delete the identified encoded data slices for deletion. For example, the DST processing unit 16 issues delete slice requests 412 to delete encoded data slices 2, 4, 6-8 from DST execution unit set 1 and issues delete slice requests 414 to delete encoded data slices 1, 3, 5, 7-8 from DST execution unit set 2 such that the read threshold number of encoded data slices 1-6 remain distributed amongst the two DST execution unit sets 1-2 in accordance with the determined slice storage pattern.

When detecting a subsequent storage error associated with a given storage vault that is noncompliance with the determined slice storage pattern, the DST processing unit 16 generates a corresponding rebuilt encoded data slice to abate the storage error in accordance with the second storage mode. For example, the DST processing unit 16 obtains a decode threshold number of encoded data slices of the set of encoded data slices (e.g., encoded data slices 1-5) from DST execution unit sets 1-2 to produce a rebuilt encoded data slice 6 when the rebuilt encoded data slice 6 of the DST execution unit set 2 is associated with the subsequent storage error.

FIG. 41C is a flowchart illustrating another example of storing data. The method includes step 420 where a processing module (e.g., of a distributed storage and task (DST) processing unit) dispersed storage error encodes a data object for storage to produce a plurality of sets of encoded data slices utilizing dispersal parameters common to a first and second storage vault. As a specific example, the processing module obtains the common dispersal parameters (e.g., interprets system registry information) and encodes the data object utilizing a dispersed storage error coding function to produce the plurality of sets of encoded data slices.

The method continues at step 422 where the processing module facilitates storage of the plurality of sets of encoded data slices in each of the first and second storage vaults in accordance with a first storage mode. For example, the processing module issues one or more sets of write slice requests to each storage vault, where the requests includes the plurality of sets of encoded data slices.

When detecting a subsequent storage error, the method continues at step 424 where the processing module generates a corresponding rebuilt encoded data slice in accordance with the first storage mode. As a specific example, when an associated encoded data slice is available from another storage vault, the processing module retrieves the associated encoded data slice as the rebuilt encoded data slice. As another specific example, when the associated encoded data slice is not available, the processing module dispersed storage error encodes the recovered data segment associated with the storage error to produce the rebuilt encoded data slice. For instance, the processing module retrieves a decode threshold number of encoded data slices of a set of encoded data slices associated with the storage error and dispersed storage error decodes the retrieved decode threshold number of encoded data slices to produce the recovered data segment for further encoding.

The method continues at step 426 where the processing module initiates a storage mode transition from the first storage mode to a second storage mode. The initiating may be based on one or more of detecting that a first storage mode timeframe has expired, interpreting a schedule, interpreting an error message, detecting that a data access frequency level has dropped below a low data access frequency threshold level, and interpreting a request.

The method continues at step 428 where the processing module determines a slice storage pattern in accordance with the second storage vault. The determining includes at least one of interpreting system registry information, looking up a predetermination, interpreting a storage requirement, and interpreting a request.

The method continues at step 430 where the processing module facilitates maintenance of stored encoded data slices in accordance with the determined slice storage pattern. For example, the processing module issues delete slice requests for stored encoded data slices of the first and second storage vaults that are incompatible with the slice storage pattern.

When detecting a subsequent storage error that is non-compliant with the slice storage pattern of the second storage mode, the method continues at step 432 where the processing module generates a corresponding rebuilt encoded data slice in accordance with the second storage mode. As a specific example, the processing module detects a slice error associated with a desired stored encoded data slice, retrieves a decode threshold number of encoded data slices associated with the storage error, dispersed storage error decodes the decode threshold number of encoded data slices to produce a recovered data segment, and dispersed storage error encodes the recovered data segment to produce the rebuilt encoded data slice.

FIGS. 42A-B are schematic block diagrams of another embodiment of a dispersed storage network (DSN) that includes the distributed storage and task (DST) processing unit 16 of FIG. 1, the network 24 of FIG. 1, and a DST execution (EX) unit set 440. The DST execution unit set 440 includes a set of DST execution units, where each DST execution unit is affiliated with a unique encoded data slice of a set of encoded data slices for storage where data is dispersed storage error encoded in accordance with dispersal parameters to produce a plurality of sets of encoded data slices. For example, the DST execution unit set includes DST execution units 1-5 when the dispersal parameters includes an information dispersal algorithm (IDA) width of n=5. The DSN functions to store data.

FIG. 42A illustrates steps of an example of operation of the storing of the data where the DST processing unit 16 dispersed storage error encodes a data object for storage in the DST execution unit set to produce a plurality of sets of encoded data slices, where each encoded data slice of each set of encoded data slices is mapped to a unique DST execution unit of the DST execution unit set in accordance with a slice mapping. Having encoded the data object, the DST processing unit 16 selects a DST execution unit for temporary exclusion of the storage of the data object. As a specific example, the DST processing unit 16 identifies a DST execution unit associated with performance that is less than a performance threshold level. As another specific example, the DST processing unit 16 identifies an unavailable DST execution unit. For instance, the DST processing unit 16 interprets an error message and identifies DST execution unit 3 as unavailable.

For each set of encoded data slices, the DST processing unit 16 identifies an encoded data slice associated with the selected DST execution unit to produce a bundled encoded data slice of a plurality of bundled encoded data slices. For example, the DST processing unit 16 identifies the encoded data slice based on the slice mapping. For instance, the DST processing unit 16 identifies encoded data slices 3-1 through 3-4 corresponding to a third pillar encoded data slice associated with four sets of encoded data slices as the plurality of bundled encoded data slices.

Having produced the bundled encoded data slices, the DST processing unit 16 updates the slice mapping based on the plurality of bundled encoded data slices to produce an updated slice mapping. As a specific example, the DST processing unit 16 selects a distribution approach. The distribution approach maps each bundled encoded data slice of the plurality of bundled encoded data slices to at least one other DST execution unit of the DST execution unit set. The distribution approach includes one or more of even distribution amongst available DST execution units, distribution of more bundled encoded data slices to DST execution units associated with a highest level of performance, and distribution of bundled encoded data slices amongst DST execution units implemented at different sites.

Having updated the slice mapping, the DST processing unit 16 selects a subset of DST execution units of the set of DST execution units for storage of the plurality of bundled encoded data slices in accordance with the updated slice mapping. The selecting may be based on one or more of DST execution unit performance levels, a predetermination, and interpreting system registry information. As a specific example, the DST processing unit 16 determines the updated slice mapping based on the distribution approach. For instance, the DST processing unit 16 maps bundled encoded data slice 3-1 to DST execution unit 1, maps bundled encoded data slice 3-2 to DST execution unit 2, maps bundled encoded data slice 3-3 to DST execution unit 4, and maps bundled encoded data slice 3-4 to DST execution unit 5 when the distribution approach includes the even distribution of the bundled encoded data slices.

Having selected the subset of DST execution units (e.g., DST execution units 1-2, 4-5), the DST processing unit 16, for each DST execution unit of the subset of DST execution units, issues, via the network 24, a write slice request that includes a group of encoded data slices in accordance with the updated slice mapping. For example, the DST processing unit 16 issues, via the network 24, a write slice request 1 that includes encoded data slices 1-1 through 1-4 and bundled encoded data slice 3-1.

FIG. 42B illustrates further steps of the example of operation of the storing of the data where the DST processing unit 16 determines to conclude the temporary exclusion of the selected DST execution unit (e.g., DST execution unit 3). The determining includes one or more of detecting availability and detecting that an associated performance levels greater than a minimum performance threshold level. For example, the DST processing unit 16 interprets a message indicating that DST execution unit 3 is available and performing at a level of performance that is greater than the minimum performance threshold level.

Having determined to conclude the temporary exclusion of the selected DST execution unit, the DST processing unit 16 facilitates migration of the plurality of bundled encoded data slices from the subset of DST execution units to the selected DST execution unit. As a specific example, each DST execution unit of the subset of DST execution units issues a write slice request to the selected DST execution unit, where the write slice request includes a corresponding bundled encoded data slice. As another specific example, the identified DST execution unit issues read slice requests to the subset of DST execution units and receives read slice responses that includes the plurality of bundled encoded data slices. As another specific example, the DST processing unit 16 issues delete slice requests to the subset of DST execution units to delete the plurality of bundled encoded data slices when confirming that the selected DST execution unit has successfully non-temporarily stored the plurality of bundled encoded data slices.

FIG. 42C is a flowchart illustrating another example of storing data. The method includes step 446 where a processing module (e.g., of a distributed storage and task (DST) processing unit) dispersed storage error encodes a data object for storage in a set of storage units to produce a plurality of sets of encoded data slices, where each encoded data slice of each set of encoded data slices is mapped to a unique storage unit of the set of storage units in accordance with a slice mapping. The method continues at step 448 where the processing module selects a storage unit for temporary exclusion of the storage of the data object. As a specific example, the processing module identifies a storage unit associated with a performance level that is less than a low performance threshold level. As another specific example, the processing module identifies an unavailable storage unit.

For each set of encoded data slices, the method continues at step 450 where the processing module identifies an encoded data slice associated with the selected storage unit to produce a bundled encoded data slice of a plurality of bundled encoded data slices. For example, the processing module identifies a plurality of encoded data slices associated with a common pillar of the selected storage unit in accordance with the slice mapping.

The method continues at step 452 where the processing module updates the slice mapping based on the plurality of encoded data slices to produce an updated slice mapping. For example, the processing module selects a distribution approach and determines the updated slice mapping based on the distribution approach.

The method continues at step 454 where the processing module selects a subset of storage units of the set of storage units for storage of the plurality of bundled encoded data slices in accordance with the updated slice mapping, where the subset of storage units and the selected storage unit. The selecting may be based on one or more of a storage unit performance level, a predetermination, and a system registry information.

For each of the subset of storage units, the method continues at step 456 where the processing module issues a write slice request that includes a group of encoded data slices in accordance with the updated slice mapping. For example, the processing module generates the write slice request to include encoded data slices associated with a common pillar of the storage unit (e.g., an encoded data slice for each data segment) and may further include one or more bundled encoded data slices of the plurality of bundled encoded data slices in accordance with the updated slice mapping.

The method continues at step 458 where the processing module determines to conclude the temporary exclusion of the selected storage unit. The determining may be based on one or more of detecting favorable availability of the selected storage unit detecting that a performance level of the selected storage unit is greater than a minimum performance threshold level, and receiving a request.

The method continues at step 460 where the processing module facilitates migration of the plurality of bundled encoded data slices from the subset of storage units to the selected storage unit. The facilitating includes at least one of instructing each of the subset of storage units to issue a write slice request to the selected storage unit, where each request includes one or more bundled encoded data slices, and instructing the selected storage unit to issue a read slice response to each of the subset of storage units such that each of the subset of storage units receives read slice responses that includes the plurality of bundled encoded data slices for storage.

FIG. 43A is a schematic block diagram of another embodiment of a dispersed storage network (DSN) that includes the distributed storage and task (DST) processing unit 16 of FIG. 1, the network 24 of FIG. 1, and a DST execution (EX) unit set 464. The DST execution unit set 464 may be implemented utilizing the DST execution unit set 440 FIG. 42A. The DST execution unit set includes a set of DST execution units, where each DST execution unit is affiliated with a unique encoded data slice of a set of encoded data slices for storage where data is dispersed storage error encoded in accordance with dispersal parameters to produce a plurality of sets of encoded data slices. For example, the DST execution unit set 464 includes DST execution units 1-5 when the dispersal parameters includes an information dispersal algorithm (IDA) width of n=5. The DSN functions to recover data that has been stored in the DST execution unit set.

In an example of operation of the recovering of the data, the DST processing unit 16 identifies a stored data object for retrieval from the DST execution unit set 464 to produce a data identifier (ID), where the data object is dispersed storage error encoded to produce a plurality of sets of encoded data slices and where the plurality of sets of encoded data slices are stored in the DST execution unit set 464. Each encoded data slice is associated with a unique slice name and each slice name includes a common source name. The identifying includes at least one of interpreting a request and performing a lookup.

Having identified the stored data object for retrieval, the DST processing unit 16 determines a DSN address that corresponds to the stored data object. The DSN address includes a virtual address associated with the storage of the stored data object. The virtual address includes a common source name. As an example of the determining of the DSN address, the DST processing unit 16 interprets an entry of a dispersed hierarchical index based on the data ID to identify the common source name. As another example of the determining of the DSN address, the DST processing unit 16 interprets a DSN directory based on the data ID to identify the common source name.

Having determined the DSN address, the DST processing unit 16 generates a read source request 466 based on the DSN address. For example, the DST processing unit 16 populates a source name field of the read source request 466 with the identified common source name. Having generated the read source request 466, the DST processing unit 16 identifies a set of DST execution units (e.g., of the DST execution unit set). The identifying includes at least one of interpreting a DSN address to physical location table and interpreting DST execution unit status. For instance, the DST processing unit 16 identifies DST execution units 1-5 as the set of DST execution units based on the DSN address to physical location table.

Having identified the set of DST execution units, the DST processing unit 16 sends, via the network 24, the read source request 466 to the identified set of DST execution units. Having sent the read source request 466, the DST processing unit 16 receives, via the network 24, retrieved encoded data slices 468 from at least some of the DST execution units of the identified set of DST execution units.

For each set of encoded data slices, the DST processing unit 16 dispersed storage error decodes a decode threshold number of received encoded data slices to reproduce a data segment corresponding to the set of encoded data slices. Having reproduced the data segment, the DST processing unit 16 aggregates a plurality of reproduced data segments to produce a recovered data object 470.

FIG. 43B is a flowchart illustrating an example of recovering data. The method includes step 476 where a processing module (e.g., of a distributed storage and task (DST) processing unit) identifies a stored data object for retrieval from a dispersed storage network (DSN). The identifying includes at least one of interpreting a request and performing a lookup.

The method continues at step 478 where the processing module determines a DSN address and corresponds to the store data object. The determining includes one or more of interpreting a dispersed hierarchical index, interpreting a DSN directory, and identifying a source name common to all slice names of encoded data slices of the store data object.

The method continues at step 480 where the processing module generates a read source request based on the DSN address. For example, the processing module generates the read source request to include the source name that is common to all slice names of encoded data slices of the store data object.

The method continues at step 482 where the processing module identifies a set of storage units of the DSN, where one or more of the storage units of the set of storage units are associated with storage of the stored data object. The identifying includes one or more of issuing a query, interpreting a query response, interpreting an error message, interpreting a storage unit status, and performing a lookup.

The method continues at step 484 where the processing module sends the read source request to the identified set of storage units. For example, the processing module replicates the read source request and transmits a replicated resource request to each storage unit of the identified set of storage units.

The method continues at step 486 where the processing module receives retrieved encoded data slices from at least some of the storage units of the identified set of storage units. For example, the processing module receives read slice responses and extracts one or more retrieved encoded data slices from the received read slice responses.

For each set of encoded data slices, the method continues at step 488 where the processing module dispersed storage error decodes a decode threshold number of received encoded data slices to produce a recovered data object. For example, for each set of encoded data slices, the processing module identifies a decode threshold number of received encoded data slices dispersed storage error decodes the decode threshold number of encoded data slices to reproduce a data segment of a plurality of data segments of the data object, and aggregates the reproduced plurality of data segments to produce the recovered data object.

FIG. 44A is a schematic block diagram of another embodiment of a dispersed storage network (DSN) that includes the distributed storage and task (DST) processing unit 16 of FIG. 1, the network 24 of FIG. 1, and a DST execution (EX) unit set 494. The DST execution unit set 494 may be implemented utilizing the DST execution unit set 440 of FIG. 42A. The DST execution unit set includes a set of DST execution units, where each DST execution unit is affiliated with a unique encoded data slice of a set of encoded data slices for storage where data is dispersed storage error encoded in accordance with dispersal parameters to produce a plurality of sets of encoded data slices. For example, the DST execution unit set includes DST execution units 1-5 when the dispersal parameters includes an information dispersal algorithm (IDA) width of n=5. The DSN functions to recover data that has been stored in the DST execution unit set.

In an example of operation of the recovering of the stored data, the DST processing unit 16 identifies a stored data object for retrieval from the DST execution unit set to produce a data identifier (ID), where the data object is dispersed storage error encoded to produce a plurality of sets of encoded data slices, and where the plurality of sets of encoded data slices are stored in the DST execution unit set. Each encoded data slice is associated with a unique slice name and each slice name includes a common source name. The identifying includes at least one of interpreting a request and performing a lookup.

Having identified the stored data object for retrieval, the DST processing unit 16 determines a DSN address that corresponds to the stored data object. The DSN address includes a virtual address associated with the storage of the stored data object. The virtual address includes a common source name. As an example of the determining of the DSN address, the DST processing unit 16 interprets an entry of a dispersed hierarchical index based on the data ID to identify the common source name. As another example of the determining of the DSN address, the DST processing unit 16 interprets a DSN directory based on the data ID to identify the common source name.

Having determined the DSN address, the DST processing unit 16 generates a read source request 496 based on the DSN address. For example, the DST processing unit 16 populates a source name field of the read source request 496 with the identified common source name. Having generated the read source request 496, the DST processing unit 16 selects a subset of DST execution units of the DST execution unit set for the read source request 496. The selecting includes one or more of interpreting a DSN address to physical location table and interpreting DST execution unit status to identify a decode threshold number of DST execution units that are most likely to include a desired encoded data slices. For example, the DST processing unit 16 identifies DST execution units 1, 2 and 4 when a status for DST execution unit 3 indicates recent unavailability and DST execution units 1, 2, and 4 should include a decode threshold number of encoded data slices for each set of encoded data slices in accordance with a previous storage operation.

Having selected the subset of DST execution units, the DST processing unit 16 sends the read source request 496 to the selected subset of DST execution units. For example, the DST processing unit 16 sends the read source request 496 to DST execution units 1, 2, and 4. Having sent the read source request 496, the DST processing unit 16 sends a read foreign slice read source request 498 to remaining DST execution units of the set of DST execution units. Each read foreign slice read source request 498 includes an indicator to instruct the receiving DST execution unit to return encoded data slice(s) foreign to the DST execution unit (e.g., bundled encoded data slices that are affiliated with at least one other DST execution unit). For example, the DST processing unit 16 sends the read foreign slice read source request 498 to remaining DST execution units 3 and 5.

Having sent the read foreign slice read source requests 498, the DST processing unit 16 receives retrieved encoded data slices 500 from at least some of the DST execution units of the set of DST execution units. For example, the DST processing unit 16 receives bundled encoded data slice 3-4 from DST execution unit 5, receives encoded data slices 4-1 through 4-4 and bundled encoded data slice 3-3 from DST execution unit 4, no foreign slices from DST execution unit 3, encoded data slices 2-1 through 2-4 and bundled encoded data slice 3-2 from DST execution unit 2, and encoded data slices 1-1 through 1-4, and bundled encoded data slice 3-1 from DST execution unit 1. As such, the DST processing unit 16 receives, for each set of encoded data slices, a decode threshold number of total encoded data slices.

Having received the retrieved encoded data slices 500, for each set of encoded data slices, the DST processing unit 16 dispersed storage error decodes the decode threshold number of encoded data slices to reproduce a data segment corresponding to the set of encoded data slices. Having reproduced a plurality of data segments (e.g., 4 data segments), the DST processing unit aggregates the plurality of reproduced data segments to produce a recovered data object 502.

FIG. 44B is a flowchart illustrating another example of recovering data, which includes similar steps to FIG. 43B. The method includes the steps 476-480 of FIG. 43B where a processing module (e.g., of a distributed storage and task (DST) processing unit) identifies a stored data object for retrieval from the DSN, determines a DSN address that corresponds to the stored data object, and generates a read source request based on the DSN address.

The method continues at step 506 where the processing module selects a subset of storage units of a set of storage units of the DSN, where one or more of the storage units of the set of storage units are associated with storage of the stored data object. The selecting includes at least one of performing a lookup to identify the set of storage units and interpreting a storage unit status to identify a decode threshold number of storage units most likely to include storage of encoded data slices of the data object.

The method continues at step 508 where the processing module sends the read source request to the selected subset of storage units. For example, the processing module replicates the read source requests and transmits a replicated read source request to each storage unit of the selected subset of storage units. The method continues at step 510 where the processing module sends a foreign slice read source request to remaining storage units of the set of storage units. For example, the processing module generates the foreign slice read source request, identifies the remaining storage units, and transmits the foreign slice read source request to the identified remaining storage units.

The method continues at step 512 where the processing module receives retrieved encoded data slices from at least some of the storage units of the set of storage units. For example, the processing module receives read slice responses from some of the set of storage units and extracts one or more retrieved encoded data slices from each read slice response. The method continues with step 488 of FIG. 43B where, for each set of encoded data slices, the processing module dispersed storage error decodes a decode threshold number of received encoded data slices to produce a recovered data object.

FIG. 45A is a schematic block diagram of another embodiment of a dispersed storage network (DSN) that includes the distributed storage and task (DST) processing unit 16 of FIG. 1, the network 24 of FIG. 1, and a DST execution (EX) unit set 520. The DST execution unit set 520 may be implemented utilizing the DST execution unit set 440 of FIG. 42A. The DST execution unit set includes a set of DST execution units, where each DST execution unit is affiliated with a unique encoded data slice of a set of encoded data slices for storage and where data is dispersed storage error encoded in accordance with dispersal parameters to produce a plurality of sets of encoded data slices. For example, the DST execution unit set includes DST execution units 1-5 when the dispersal parameters includes an information dispersal algorithm (IDA) width of n=5. The DSN functions to recover data that has been stored in the DST execution unit set.

In an example of operation of the recovering of the data, the DST processing unit 16 identifies a stored data object for retrieval from the DST execution unit set to produce a data identifier (ID), where the data object is dispersed storage error encoded to produce a plurality of sets of encoded data slices and where the plurality of sets of encoded data slices are stored in the DST execution unit set. Each encoded data slice is associated with a unique slice name and each slice name includes a common source name. The identifying includes at least one of interpreting a request and performing a lookup.

Having identified the stored data object for retrieval, the DST processing unit 16 determines a DSN address that corresponds to the stored data object. The DSN address includes a virtual address associated with the storage of the store data object. The virtual address includes a common source name. As an example of the determining of the DSN address, the DST processing unit 16 interprets an entry of a dispersed hierarchical index based on the data ID to identify the common source name. As another example of the determining of the DSN address, the DST processing unit 16 interprets a DSN directory based on the data ID to identify the common source name.

Having determined the DSN address, the DST processing unit 16 identifies a first subset of DST execution units of the DST execution unit set where an estimated decode threshold number of encoded data slices of each set of encoded data slices are stored. The identifying includes at least one of performing a lookup, interpreting storage unit status, issuing list slice requests, and interpreting received list slice responses. For example, the DST processing unit 16 identifies DST execution units 1, 2, and 4 to include storage of the estimated decode threshold number of encoded data slices of each set of encoded data slices.

Having identified the first subset of DST execution units, the DST processing unit 16 issues one or more of a read source request 522 and a read foreign slice read source request to the identified subset of DST execution units. The issuing includes generating the slice requests and sending, via the network 24, the slice requests to the identified subset of DST execution units. For example, the DST processing unit 16 issues a read source request to the DST execution units 1, 2, and 4.

Having issued the read slice requests, the DST processing unit 16 initiates receiving, via the network 24, one or more read responses 524 from the first subset of DST execution units. Each read response 524 includes a response header 526 and one or more encoded data slices 528. The response header 526 includes one or more of a number of slices field 530 and a slice names field 532 corresponding to the one or more encoded data slices 528. For example, the DST processing unit 16 begins to receive a read response from DST execution unit 1 where the response header of the read response indicates that the read response includes five encoded data slices and the slice names correspond to encoded data slices 1-1 through 1-4 and bundled encoded data slice 3-1. As a continuation of the example, the DST processing unit 16 receives response headers of read responses from the DST execution unit 2 and the DST execution unit 4.

Having initiated receiving of the read responses 524, where response headers have been interpreted, the DST processing unit 16 determines a likelihood level of receiving the decode threshold number of encoded data slices for each of the sets of encoded data slices when remaining portions of the read responses are received in a streaming fashion via the network 24. The interpreting includes interpreting each response header of each read response to estimate which encoded data slices are likely to be received when the read response streams have been completely ingested by the DST processing unit 16. For example, the DST processing unit 16 indicates a high likelihood level when estimating that the decode threshold number of encoded data slices for each set of encoded data slices should be received in accordance with slice names of the response headers.

When the likelihood level is greater than a high likelihood threshold level, the DST processing unit 16 completes the receiving of the read responses 524 to produce the decode threshold number of encoded data slices for each of the sets of encoded data slices. When the likelihood level is less than a low likelihood threshold level, the DST processing unit 16 obtains remaining encoded data slices of the decode threshold number of encoded data slices for each of the sets of encoded data slices from one or more other DST execution units. The obtaining includes issuing one or more further read source requests 522 to an identified second subset of DST execution units and receiving further read responses.

When the decode threshold number of encoded data slices for each of the sets of encoded data slices have been received, the DST processing unit 16, for each set of encoded data slices, dispersed storage error decodes the decode threshold number of encoded data slices to reproduce a data segment corresponding to the set of encoded data slices. Having produced a plurality of reproduced data segments, the DST processing unit 16 aggregates the plurality of reproduced data segments to produce a recovered data object 534.

FIG. 45B is a flowchart illustrating another example of recovering data, which include similar steps to FIG. 43B. The method includes step 476 and 478 of FIG. 43B where a processing module (e.g., of a distributed storage and task (DST) processing unit) identifies a store data object for retrieval from a dispersed storage network (DSN) and determines a DSN address that corresponds to the store data object.

The method continues at step 540 where the processing module identifies a first subset of storage units of a set of storage units of the DSN, where an estimated decode threshold number of encoded data slices of each set of a plurality of sets of encoded data slices is stored. The identifying includes at least one of performing a lookup, initiating a query, and interpreting a query response. The method continues at step 542 where the processing module issues one or more of a read source request and a read foreign slices read source request to the identified first subset of storage units. For example, the processing module generates requests based on estimated encoded data slices stored at each storage unit and sends the requests to the first subset of storage units.

The method continues at step 544 where the processing module initiates receiving one or more read responses from the first subset of storage units. The initiating includes receiving bytes of the stream that includes the read response and identifying a first portion of the received stream that includes a read response header, where the read response header indicates one or more of a number of encoded data slices and slice names of the encoded data slices included in the read response.

The method continues at step 546 where the processing module determines a likelihood level of receiving the decode threshold number of encoded data slices of each set of the plurality of sets of encoded data slices. The determining includes interpreting each response to estimate which encoded data slices should be received when the receiving has been completed. The method branches to step 550 when the processing module determines that the likelihood level is low. The method continues to step 548 when the processing module determines that the likelihood level is high.

When the likelihood level is greater than a high likelihood threshold level, the method continues at step 548 where the processing module completes the receiving of the read responses to produce the decode threshold number of encoded data slices for each of the sets of encoded data slices. The completing includes comparing the likelihood level to the high threshold level, and indicating a high likelihood of receiving the decode threshold number of encoded data slices when the likelihood level is greater than the high likelihood that threshold level. The completing further includes continuing to receive read response streams. When the receiving has completed, the method branches to step 488 of FIG. 43B.

When the likelihood level is less than a low likelihood threshold level, the method continues at step 550 where the processing module obtains remaining encoded data slices of the decode threshold number of encoded data slices for each set of the plurality of sets of encoded data slices from one or more other storage units of the set of storage units. The obtaining includes identifying a second subset of storage units likely to include desired encoded data slices, issuing one or more further read request, receiving additional read responses, and extracting further encoded data slices. Alternatively, or in addition to, the processing module performs a similar process in a recursive manner.

The method continues with the step of FIG. 43B where, for each set of encoded data slices, the processing module dispersed storage error decodes the decode threshold number of encoded data slices for each set of encoded data slices to produce a recovered data object.

FIG. 46A is a schematic block diagram of another embodiment of a dispersed storage network (DSN) that includes the distributed storage and task (DST) processing unit 16 of FIG. 1, the network 24 of FIG. 1, and a DST execution (EX) unit set 554. The DST execution unit set includes a set of DST execution units 1-n. Each DST execution unit may be implemented utilizing the DST execution unit 36 of FIG. 1. The DSN functions to access data for storage in the DST execution unit set, where the data is dispersed storage error encoded utilizing an information dispersal algorithm (IDA) in accordance with dispersal parameters to produce a plurality of sets of encoded data slices for storage in the set of DST execution units 1-n. The dispersal parameters includes an IDA width=n, a write threshold (WT), and the decode threshold=k, where each set of encoded data slices includes n encoded data slices and the data may be recovered when obtaining a decode threshold number of encoded data slices of each set of encoded data slices.

In an example of operation of the accessing of the data, the DST processing unit 16 determines to access a data object in the DST execution unit set. The accessing includes one or more of storing the data object and retrieving a stored data object. The determining includes at least one of receiving a retrieval request, receiving a storage request, and generating the data object for storage.

Having determined to access the data object, the DST processing unit 16 determines a DSN performance level. The DSN performance level includes one or more of access latency, storage availability, and retrieval reliability. The determining includes one or more of interpreting an error message, initiating a test, interpreting test results, initiating a query, interpreting a received query response, performing a lookup, and receiving the DSN performance level.

Having determined the DSN performance level of the DST processing unit 16 obtains a data object size of the data object. The obtaining includes at least one of counting bytes, performing a lookup, estimating, and receiving the data object size. Having obtained the data object size, the DST processing unit 16 determines an expected number of errors when accessing each set of encoded data slices. The determining includes at least one of interpreting historical performance information, receiving the expected number of errors, and interpreting the DSN performance level.

Having determined the expected number of errors, the DST processing unit 16 determines a number of extra encoded data slices for access for each set of encoded data slices based on one or more of the object size of the data object, the dispersal parameters, and expected number of errors when accessing each set of encoded data slices. As a specific example, the DST processing unit 16 sets the number of extra encoded data slices to be substantially the same as the expected number of errors. As another specific example, the DST processing unit 16 sets the number of extra encoded data slices in accordance with a predetermination. As yet another specific example, the DST processing unit sets the number of extra encoded data slices to be greater than the expected number of errors.

For each set of encoded data slices, the DST processing unit 16 accesses, via the network 24, a decode threshold number of encoded data slices and an additional extra number of encoded data slices utilizing a set of access slice requests. The accessing includes selecting a decode threshold number k plus the extra number of encoded data slices E (e.g., k+E number) of DST execution units, generating k+E number of access slice requests 556, and sending, via the network 24, the access slice requests 556 to the selected DST execution units. The access slice requests 556 includes at least one of a write slice request when storing data and a read slice request when retrieving data. For example, the DST processing unit 16 issues k access slice requests 556 to DST execution units 1-k with regards to the decode threshold number of encoded data slices and issues E access slice requests 556 to DST execution units k+1 through k+E with regards to the extra encoded data slices.

Having issued the slice access requests 556, the DST processing unit 16 receives, via the network 24, access slice responses 558 from at least some of the DST execution units. For example, the DST processing unit 16 receives, via the network 24, access slice responses 1 though k+E. Alternatively, or in addition to, the DST processing unit 16 issues further access slice requests to one or more other DST execution units when not receiving at least a decode threshold number of favorable access slice responses for each set of encoded data slices.

FIG. 46B is a flowchart illustrating an example of accessing data. The method includes step 564 where a processing module (e.g., of a distributed storage and task (DST) processing unit) determines to access the data object in a set of storage units of a dispersed storage network (DSN). The determining includes at least one of receiving a request and generating the data object for storage. The method continues at step 566 where the processing module determines a DSN performance level. The determining includes at least one of interpreting an error message, interpreting test results, interpreting a received query response, performing a lookup, and receiving the DSN performance level.

The method continues at step 568 where the processing module obtains a data object size of the data object. The obtaining includes at least one of counting bites of the data object, performing a lookup, receiving, and estimating. The method continues at step 570 where the processing module obtains dispersal parameters associated with the encoding of the data object. The obtaining includes at least one of receiving, performing a lookup, and interpreting system registry information.

The method continues at step 572 where the processing module determines an expected number of errors when accessing each set of encoded data slices. The determining includes at least one of interpreting historical performance information, receiving the expected number of errors, and interpreting the DSN performance level. The method continues at step 574 where the processing module determines a number of extra encoded data slices for access for each set of encoded data slices based on one or more of the object size of the data object, the dispersal parameters, and the expected number of errors when accessing each set of encoded data slices. The determining includes at least one of setting the number of extra encoded data slices to be substantially the same as the expected number of errors, setting the number of extra encoded data slices in accordance with a predetermination, and setting the number of extra encoded data slices to be greater than expected number of errors.

For each set of encoded data slices, the method continues at step 576 where the processing module accesses a decode threshold number of encoded data slices and the extra number of encoded data slices from corresponding storage units. The accessing includes one or more of selecting storage units (e.g., based on a desired level of performance), generating access slice request, and sending the access slice requests to the selected storage units.

The method continues at step 578 where the processing module receives access slice responses from at least some of the storage units. The receiving includes recovering encoded data slices from read slice responses when retrieving data and interpreting a status from write slice responses when storing data. The method continues at step 580 where the processing module processes the received access slice responses. For example, when retrieving the data object, the processing module decodes the recovered encoded data slices to reproduce the data object. As another example, when storing the data object, the processing module aggregates status of the received write slice responses to produce a storage status indicator. The processing of the received access slice responses may further include issuing further access slice requests when an unfavorable number of access slice responses has been received (e.g., when a decode threshold number of favorable access slice responses has not been received within an access time frame). FIGS. 47A-B are schematic block diagrams of another embodiment of a dispersed storage network (DSN) that includes the distributed storage and task (DST) processing unit 16 of FIG. 1, the network 24 of FIG. 1, and a DST execution (EX) unit set 584. The DST execution unit set 584 may be implemented utilizing the DST execution unit set 554 of FIG. 46A. The DST execution unit set 584 includes a set of DST execution units 1-n. Each DST execution unit may be implemented utilizing the DST execution unit 36 of FIG. 1. The DSN functions to store data in the DST execution unit set for subsequent retrieval, where the data is dispersed storage error encoded utilizing an information dispersal algorithm (IDA) in accordance with dispersal parameters to produce a plurality of sets of encoded data slices for storage in the set of DST execution units 1-n. The dispersal parameters includes an IDA width=n, a write threshold (WT), and a decode threshold=k, where each set of encoded data slices includes n encoded data slices and the data may be recovered when obtaining a decode threshold number of encoded data slices of each set of encoded data slices.

FIG. 47A illustrates steps of an example of operation of the storing of the data, where the DST processing unit 16 determines to store a data object in the DST execution unit set. The determining includes at least one of receiving a storage request and generating the data object for storage. Having determined to store the data object, the DST processing unit 16 determines a DSN performance level. The DSN performance level includes one or more of access latency, storage availability, and retrieval reliability. The determining includes one or more of interpreting an error message, initiating a test, interpreting test results, initiating a query, interpreting a received query response, performing a lookup, and receiving the DSN performance level.

Having determined the DSN performance level of the DST processing unit 16 obtains a data object size of the data object. The obtaining includes at least one of counting bytes, performing a lookup, estimating, and receiving the data object size. Having obtained the data object size, the DST processing unit 16 determines an expected number of errors when storing each set of encoded data slices. The determining includes at least one of interpreting historical performance information, receiving the expected number of errors, and interpreting the DSN performance level.

Having determined the expected number of errors, the DST processing unit 16 determines a number of extra encoded data slices for access for each set of encoded data slices based on one or more of the object size of the data object, the dispersal parameters, and the expected number of errors when accessing each set of encoded data slices. As a specific example, the DST processing unit 16 sets the number of extra encoded data slices to be substantially the same as the expected number of errors. As another specific example, the DST processing unit 16 sets the number of extra encoded data slices in accordance with a predetermination. As yet another specific example, the DST processing unit sets the number of extra encoded data slices to be greater than the expected number of errors.

For each set of encoded data slices, the DST processing unit 16 stores, via the network 24, a desired number of encoded data slices and an additional extra number of encoded data slices utilizing a set of write slice requests. The desired number may include at least one of the decode threshold number, the write threshold number (WT), and a target width number when utilizing virtual storage slots in addition to physical DST execution units. The storing includes selecting the desired number plus the extra number of encoded data slices E (e.g., WT+E number) of DST execution units, generating WT+E number of write slice requests 586, and sending, via the network 24, the write slice requests 586 to the selected DST execution units. For example, the DST processing unit 16 issues WT write slice requests 586 to DST execution units 1 through WT with regards to the write threshold number of encoded data slices and issues E write slice requests 586 to DST execution units WT+1 through WT+E with regards to the extra encoded data slices.

Having issued the write slice requests 586, the DST processing unit 16 receives, via the network 24, write slice responses 588 from at least some of the DST execution units. For example, the DST processing unit 16 receives, via the network 24, write slice responses 1 though WT+E. Alternatively, or in addition to, the DST processing unit 16 issues further write slice requests to one or more other DST execution units when not receiving at least a desired number of favorable write slice responses 588 for each set of encoded data slices.

Having received the write slice responses 588, the DST processing unit 16, for each set of encoded data slices, determines a number of favorably stored encoded data slices based on the received write slice responses 588 (e.g., by counting favorable write slice responses).

FIG. 47B illustrates further steps of the example of operation of the storing of the data, where when the DST processing unit 16 determines that the number of favorably stored encoded data slices for each set of encoded data slices is at least the desired number, issues, via the network 24, commit slice requests 590 to a desired number of DST execution units of DST execution units associated with favorable storage. The issuing includes selecting the desired number of DST execution units of the DST execution units associated with a favorable storage (e.g., selecting units associated with most favorable performance levels, using a predetermination, a random selection), generating the commit slice requests 590, and sending the commit slice requests 590 to the selected desired number of DST execution units. As a specific example, the DST processing unit 16 issues, via the network 24, a write threshold number of commit slice requests 590 (e.g., commit slice requests 1 through WT) to DST execution units 1 through WT when the DST execution units 1 through WT are associated with the most favorable performance level. Each DST execution unit receiving a corresponding commit slice request 590 activates visibility (e.g., enables retrieval and listing) of a corresponding encoded data slice to enable subsequent retrieval of the encoded data slice.

Having issued the commit slice requests 590, the DST processing unit 16 issues, via the network 24, rollback slice requests 592 to a remaining extra number of DST execution units. The issuing includes identifying the remaining extra number of DST execution units, generating the rollback slice requests 592, and sending, via the network 24, the rollback slice requests 592 to the identified remaining extra number of DST execution units. As a specific example, the DST processing unit 16 identifies DST execution units WT+1 through WT+E as the remaining extra number E of DST execution units and sends, via the network 24, the rollback slice requests 592 to the DST execution units WT+1 through WT+E. Each DST execution unit receiving a corresponding rollback slice request 592 deletes an associated encoded data slice to provide a storage efficiency improvement.

FIG. 47C is a flowchart illustrating another example of storing data, which include similar steps to FIG. 46B. The method includes step 600 where a processing module (e.g., of a distributed storage and task (DST) processing unit) determines to store a data object and a set of storage units. The determining includes at least one of receiving a storage request and generating the data object for storage. The method continues with steps 566-570 of FIG. 46B where the processing module determines a dispersed storage network (DSN) performance level, obtains a data object size of the data object, and obtains dispersal parameters associated with the encoding of the data object. The method continues at step 602 where the processing module determines an expected number of errors when writing each set of encoded data slices. The determining includes at least one of interpreting historical performance information, receiving the expected number of errors, and interpreting the DSN performance level.

The method continues at step 604 where the processing module determines a number of extra encoded data slices for writing for each set of encoded data slices based on one or more of the object size of the data object, the dispersal parameters, and the expected number of errors when writing each set of encoded data slices. The determining includes at least one of setting the number of extra encoded data slices to be substantially the same as the expected number of errors, setting the number of extra slices to be in accordance with a predetermination, and setting the number of extra encoded data slices to be greater than the expected number of errors.

For each set of encoded data slices, the method continues at step 606 where the processing module stores a desired number of encoded data slices and the extra number of encoded data slices and corresponding storage units. The storing includes selecting the corresponding storage units (e.g., a write threshold number plus the extra number) based on storage unit performance, generating write slice requests, and sending the write slice requests to the selected storage units.

The method continues at step 608 where the processing module receives write slice responses from at least some of the storage units. The receiving includes one or more of interpreting status from the received write slice responses and issuing further write slice requests to one or more other storage units when not receiving at least the desired number of favorable access slice responses for each set of encoded data slices.

For each set of encoded data slices, the method continues at step 610 where the processing module determines a number of favorably stored encoded data slices based on the received write slice responses. The determining includes at least one of interpreting the write slice responses to count the number of favorably stored encoded data slices and receiving an indicator number. When the number of favorably stored encoded data slices for each set of encoded data slices is at least the desired number, the method continues at step 612 where the processing module issues commit slice requests to the desired number of storage units associated with a favorable storage. For example, the processing module selects the desired number of storage units, generates the commit slice request, and sends the commit slice requests to the selected desired number of storage units.

The method continues at step 614 where the processing module issues rollback slice requests to the remaining number of storage units to facilitate deletion of extra encoded data slices. For example, the processing module selects the remaining extra number of storage units, generates the rollback slice request, and sends the rollback slice requests to the selected remaining extra number of storage units.

FIG. 48A is a schematic block diagram of another embodiment of a dispersed storage network (DSN) that includes one or more sites (e.g., 1-4), the network 24 of FIG. 1, and the distributed storage and task (DST) processing unit 16 of FIG. 1. At least one site includes two or more DST execution (EX) units of a set of n DST execution units (e.g., 1-8), where data is encoded utilizing an information dispersal algorithm (IDA) to produce a plurality of sets of n encoded data slices that are stored in the set of DST execution units to produce stored data and where dispersal parameters of the IDA includes one or more of an IDA width=n and a decode threshold=k. For example, the set of DST execution units includes DST execution units 1-8 when the IDA width is 8. As another example, a site 1 includes DST execution units 1-2, a site 2 includes DST execution units 3-4, a site 3 includes DST execution units 5-6, and a site 4 includes DST execution unit 7-8 when the DSN is to include four sites with at least two DST execution units implemented at each site. Each site further includes a local area network (LAN) 620 to provide local communications between DST execution units implemented at the site. For example, the LAN 620 implemented at site 1 provides communications between DST execution units 1-2 etc. The DSN functions to recover the data that is stored in the set of DST execution units.

In an example of operation of the recovering of the data, the DST processing unit 16 selects a threshold number of DST execution units of the set of DST execution units for recovery of the stored data. The selecting includes at least one of interpreting DST execution unit performance levels, interpreting system registry information, a interpreting a predetermination, and interpreting a request. For example, the DST processing unit 16 selects DST execution units 1, 4, 5, 7, and 8 when each of the selected DST execution units is associated with a favorable level of performance and the threshold number is the decode threshold number k=5 when the IDA width=8.

Having selected the threshold number of DST execution units, the DST processing unit 16 generates a threshold number of read slice requests 622. For example, the DST processing unit 16 generates the decode threshold number of read slice requests 622 when the threshold number is substantially the same as a decode threshold number. The DST processing unit 16 generates each read slice request 622 to include one or more of a requested slices portion 624 and an alternative slices portion 626. The requested slices portion 624 may include one or more slice names corresponding to encoded data slices stored at the selected threshold number of DST execution units and identifiers of the selected threshold number of DST execution units. For example, the requested slices portion of 624 includes slice names for encoded data slices 1, 4, 5, 7, and 8 and further includes identifiers for DST execution units 1, 4, 5, 7, and 8. The alternate slices portion 626 may include one or more slice names corresponding to alternate encoded data slices stored at alternate (e.g., remaining) DST execution units and identifiers of the alternate DST execution units. For example, the alternate slices portion 626 includes identifiers for encoded data slices 2, 3, and 6 and further includes identifiers for DST execution units 2, 3, and 6.

Having generated the threshold number of read slice requests 622, the DST processing unit 16 sends, via the network 24, the threshold number of read slice requests 622 to the selected threshold number of DST execution units. For example, the DST processing unit 16 sends a read slice request 1 to the DST execution unit 1, a read slice request 4 to the DST execution unit 4, a read slice request 5 to the DST execution unit 5, a read slice request 7 to the DST execution unit 7, and a read slice request 8 to the DST execution unit 8.

Each DST execution unit receiving a corresponding read slice request 622 interprets the received read slice request 622 to identify an encoded data slice associated with the DST execution unit. The identifying includes matching an identifier of the DST execution unit with an identity of an associated slice name. For example, the DST execution unit 1 receives the read slice request 1 and identifies the slice name 1 as associated with the DST execution unit 1.

Having identified the encoded data slice, the DST execution unit determines whether the identified encoded data slice is available. For example, DST execution unit 1 determines that encoded data slice 1 is unavailable from the DST execution unit 1 by interpreting a slice availability table. As another example, the DST execution unit 1 determines unavailability of the encoded data slice 1 by detecting unfavorable integrity of the encoded data slice 1.

When the identified encoded data slices unavailable, the DST execution unit identifies an alternate DST execution unit that is associated with the DST execution unit (e.g., implemented at a common site). The identifying includes at least one of interpreting system registry information, issuing a query, and interpreting a received query response. For example, the DST execution unit 1 identifies DST execution unit 2 as the alternate DST execution unit when the DST execution unit 1 determines that the DST execution unit 2 and the DST execution unit 1 are implemented at site 1 (e.g., by interpreting the system registry information).

Having identified the alternate DST execution unit, the DST execution unit facilitates issuing, via the network 24, of a read slice response 628 to the DST processing unit 16, where the read slice response 628 includes an alternate encoded data slice recovered from the alternate DST execution unit. As a specific example, the DST execution unit 1 retrieves the encoded data slice 2 from the DST execution unit 2, generates a read slice response 2, where the read slice response 2 includes the encoded data slice 2, and sends the network 24 the read slice response 2 to the DST processing unit 16. As another specific example, the DST execution unit 1 instructs the DST execution unit 2 to issue the read slice response 2 directly to the DST processing unit 16. The DST processing unit 16 decodes a decode threshold number of received encoded data slices from received read slice responses 628 for each set of encoded data slices to produce recovered data 630.

FIG. 48B is a flowchart illustrating another example of recovering data. The method includes step 636 where a processing module (e.g., of a distributed storage and task (DST) processing unit) selects a threshold number of storage units of a set of storage units for recovery of stored data. The selecting may be based on one or more of a storage unit performance level, interpreting an error message, interpreting system registry information, and interpreting a request.

The method continues at step 638 where the processing module generates a threshold number of read slice requests. The generating includes one or more of identifying a threshold number of slice names of a set of slice names associated with the data and identifying remaining slice names of the set of slice names as alternates slice names. The method continues at step 640 where the processing module sends the threshold number of read slice requests to the threshold number of storage units.

The method continues at step 642 where each storage unit receiving a corresponding read slice request interprets the read slice request to identify an encoded data slice associated with the storage unit. For the example, the storage unit receives the corresponding read slice request from the processing module, finds a slice name of an associated local encoded data slice that matches a slice name of the threshold number of slice names, and determines whether the identified encoded data slice is available.

When the storage unit determines that the identified encoded data slices unavailable, the method continues at step 644 where the storage unit identifies an alternate storage unit that is associated with the storage unit. The identifying includes at least one of interpreting system registry information, issuing a query, interpreting a query response, and interpreting a storage unit status.

The method continues at step 646 where the storage unit facilitates issuing a read slice response to the processing module, where the read slice response includes an alternate encoded data slice recovered from the alternate storage unit. The facilitating includes at least one of recovering the alternate encoded data slice from the alternate storage unit, issuing the read slice response that includes the recovered alternate encoded data slice and issuing a request to the alternate storage unit to send the alternate encoded data slice directly to the processing module. The method continues at step 648 where the processing module decodes a threshold number of received encoded data slices to produce recovered data. For example, the processing module performs an information dispersal algorithm on a decode threshold number of encoded data slices for each set of encoded data slices to produce the recovered data.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method for execution by one or more computing devices of a storage network, the method comprises:
   error encoding data into a set of encoded data slices;
   storing the set of encoded data slices in first storage units of a first vault in accordance with first error encoding parameters;
   initiating storage of the set of encoded data slices in second storage units of a second vault in accordance with second error encoding parameters; and
   when a decode threshold number of encoded data slices of the set of encoded data slices are stored in the second vault, deleting one or more encoded data slices of the set of encoded data slices stored in the first vault.

2. The method of claim 1 further comprises:
   receiving, from a requesting computing device, a request for the data;
   facilitating retrieval of the data by:
      obtaining at least some of encoded data slices of the set of encoded data slices in the first vault; and when a first number of the at least some of the encoded data slices is less than the decode threshold number, obtaining a threshold number of other encoded data slices of the set of encoded data slices stored in the second vault, wherein the threshold number is greater than or equal to a difference between the decode threshold number and the first number.

3. The method of claim 2 further comprises:
decoding the obtained encoded data slices to recover the data; and
sending the data to the requesting computing device.

4. The method of claim 1, wherein the first vault includes memory of a first memory type and the second vault includes memory of a second memory type.

5. The method of claim 4, wherein a memory type of the first and second memory types comprises one of:
a solid state memory; and
a magnetic disk memory.

6. The method of claim 4, wherein the memory type comprises one of:
a local memory; and
a geographically diverse memory.

7. The method of claim 1, wherein the first storage units are affiliated with first storage characteristics and the second storage units are affiliated with second storage characteristics.

8. The method of claim 7, wherein a storage characteristic of the first and second storage characteristics comprises a memory type.

9. The method of claim 7, wherein a storage characteristic of the first and second storage characteristics comprises a storage performance level.

10. The method of claim 7, wherein a storage characteristic of the first and second storage characteristics comprises a storage reliability level.

11. The method of claim 7, wherein a storage characteristic of the first and second storage characteristics comprises a storage availability level.

12. The method of claim 7, wherein a storage characteristic of the first and second storage characteristics comprises a communication link data rate.

13. The method of claim 1, wherein an error encoding parameter of the first and second error encoded parameters comprises an information dispersal algorithm width.

14. The method of claim 1, wherein an error encoding parameter of the first and second error encoded parameters comprises an encoding matrix.

15. The method of claim 1, wherein an error encoding parameter of the first and second error encoded parameters comprises an error coding function identifier.

16. The method of claim 1, wherein an error encoding parameter of the first and second error encoded parameters comprises a write threshold number.

17. A non-transitory computer readable storage medium comprises:
at least one memory section for storing operational instructions that, when executed by one or more computing devices of a storage network, cause the one or more computing devices to:
error encode data into a set of encoded data slices;
store the set of encoded data slices in first storage units of a first vault in accordance with first error encoding parameters;
initiate storage of the set of encoded data slices in second storage units of a second vault in accordance with second error encoding parameters; and
when a decode threshold number of encoded data slices of the set of encoded data slices are stored in the second vault, delete one or more encoded data slices of the set of encoded data slices stored in the first vault.

18. The non-transitory computer readable storage medium of claim 17, wherein the at least one memory section stores further operational instructions that, when executed by the one or more computing devices, cause the one or more computing devices to:
receive, from a requesting computing device, a request for the data; and
facilitate retrieval of the data by:
obtaining at least some of encoded data slices of the set of encoded data slices in the first vault; and
when a first number of the at least some of the encoded data slices is less than the decode threshold number, obtaining a threshold number of other encoded data slices of the set of encoded data slices stored in the second vault, wherein the threshold number is greater than or equal to a difference between the decode threshold number and the first number.

19. The non-transitory computer readable storage medium of claim 18, wherein the at least one memory section stores further operational instructions that, when executed by the one or more computing devices, cause the one or more computing devices to:
decode the obtained encoded data slices to recover the data; and
send the data to the requesting computing device.

20. The non-transitory computer readable storage medium of claim 17, wherein the at least one memory section stores further operational instructions that, when executed by the one or more computing devices, cause the one or more computing devices to:
determine the first vault includes memory of a first memory type and the second vault includes memory of a second memory type.

* * * * *